(12) United States Patent
Kurriss

(10) Patent No.: US 7,104,711 B2
(45) Date of Patent: Sep. 12, 2006

(54) KEYBOARD CONFIGURATION SYSTEM

(76) Inventor: Francis Kurriss, 6180 Canterbury Dr., Culver City, CA (US) 90230

( * ) Notice: Subject to any disclaimer, the term of this patent is extended or adjusted under 35 U.S.C. 154(b) by 0 days.

(21) Appl. No.: 11/364,231

(22) Filed: Feb. 27, 2006

(65) Prior Publication Data

US 2006/0147239 A1    Jul. 6, 2006

Related U.S. Application Data

(63) Continuation-in-part of application No. 10/901,402, filed on Jul. 27, 2004, now Pat. No. 7,008,127, which is a continuation-in-part of application No. 10/405,120, filed on Mar. 31, 2003, now Pat. No. 6,830,396.

(51) Int. Cl.
*B41J 5/08* (2006.01)

(52) U.S. Cl. .................. 400/486; 400/489; 400/414

(58) Field of Classification Search ........ 400/472–474, 400/479–479.2, 477, 480, 486, 489, 100, 400/414, 663; 345/168, 172; 341/20–23
See application file for complete search history.

(56) References Cited

U.S. PATENT DOCUMENTS

| | | | |
|---|---|---|---|
| 185,714 A | 12/1876 | Allen | 400/393 |
| 2,040,248 A | 5/1936 | Dvorak et al. | 400/486 |
| 3,847,263 A | 11/1974 | X | 197/100 |
| 4,519,721 A | 5/1985 | Gardner | 400/472 |
| 4,613,247 A | 9/1986 | McGunnigle | 400/486 |
| 4,633,227 A | 12/1986 | Menn | 340/365 |
| 4,715,736 A | 12/1987 | McGunnigle | 400/484 |
| 4,824,268 A | 4/1989 | Diernisse | 400/486 |
| 4,927,279 A | 5/1990 | Morgan | 400/486 |
| 5,003,301 A | 3/1991 | Romberg | 345/168 |
| 5,387,042 A | 2/1995 | Brown | 400/477 |
| D368,708 S | 4/1996 | Maynard et al. | D14/115 |
| 5,584,588 A | 12/1996 | Harbaugh | 400/486 |
| 5,836,705 A | 11/1998 | Choate | 400/486 |
| 5,879,089 A | 3/1999 | Armel | 400/489 |
| 6,053,647 A | 4/2000 | Parkinson | 400/486 |
| 6,632,038 B1 | 10/2003 | Trotman | 400/489 |

FOREIGN PATENT DOCUMENTS

| | | |
|---|---|---|
| GB | 0066991 | 5/1982 |
| WO | WO 2004/040429 A2 | 5/2004 |

*Primary Examiner*—Minh Chau
(74) *Attorney, Agent, or Firm*—Cislo & Thomas LLP; Andrew S. Jordan, Esq

(57) ABSTRACT

A system for configuring keyboards using both frequency and alphabetical bases, as well as the resulting keyboards. The Keyboard Configuration System uses alphabetized and frequency-based sets of keys. The relevant alphabet is analyzed for letter use on a frequency basis. For maximum-fingers configurations, the frequency-ranked list is broken into rows. Letters are alphabetized horizontally within each row. For minimum-fingers configurations (Personal Digital Assistant keyboards), the frequency-ranked list is broken into columns. Letters are alphabetized vertically within each column. For dominant-fingers configurations, the frequency-ranked list is first broken into rows across six columns. These letters are alphabetized horizontally within each row. The remainder of the frequency-ranked list is then broken into columns. These letters are alphabetized vertically within each column. The resulting keyboards are then evaluated for alphabetical succession relative to the alphabetical direction. The system set forth herein may be adaptable to any written language.

4 Claims, 25 Drawing Sheets

FIG. 1
CONFIGURATION: I

```
              ┌─┬─┬─┬─┬─┬─┬─┬─┬─┬─┐
MID (26%)    │Y│W│U│P│M│L│F│D│C│B│  10 COLUMNS
             ├─┼─┼─┼─┼─┼─┼─┼─┼─┼─┤
HI (70%)     │T│S│R│O│N│I│H│E│A│    9 COLUMNS
             ├─┼─┼─┼─┼─┼─┼─┤ └─┴─┘
LO (4%)      │Z│X│V│Q│K│J│G│        7 COLUMNS
             └─┴─┴─┴─┴─┴─┴─┘
            LH (51%) ▲ RH (49%)
```

{ DESCENDING ALPHABET WITHIN FREQUENCY (MID/HI/LO) SET }   { APPROPRIATE FOR SWITCHING LETTERS IN A <u>QWERTY</u> LAYOUT }

FIG. 2
CONFIGURATION: II

```
                  ┌─┬─┬─┬─┬─┬─┐
7 COLUMNS        │G│J│K│Q│V│X│Z│           LO (4%)
           ┌─┬─┬─┼─┼─┼─┼─┼─┼─┤
10 COLUMNS │B│C│D│F│L│M│P│U│W│Y│           MID (26%)
           ├─┼─┼─┼─┼─┼─┼─┼─┼─┤
9 COLUMNS  │A│E│H│I│N│O│R│S│T│             HI (70%)
           └─┴─┴─┴─┴─┴─┴─┴─┴─┘
            LH (49%) ▲ RH (51%)
```

{ ASCENDING ALPHABET WITHIN FREQUENCY (LO/MID/HI) SETS }   { APPROPRIATE FOR SWITCHING LETTERS IN A TWO-HAND <u>DVORAK</u> LAYOUT }

FIG. 3
CONFIGURATION: III

```
              ┌─┬─┬─┬─┬─┬─┬─┐
LO (4%)      │Z│X│V│Q│K│J│G│            7 COLUMNS
             ├─┼─┼─┼─┼─┼─┼─┼─┬─┐
MID (26%)    │Y│W│U│P│M│L│F│D│C│B│     10 COLUMNS
             ├─┼─┼─┼─┼─┼─┼─┼─┼─┤
HI (70%)     │T│S│R│O│N│I│H│E│A│        9 COLUMNS
             └─┴─┴─┴─┴─┴─┴─┴─┴─┘
            LH (51%) ▲ RH (49%)
```

{ DESCENDING ALPHABET WITHIN FREQUENCY (LO/MID/HI) SETS }   { APPLICABLE FOR LAYOUTS WITH MAXIMUM OF 10 COLUMNS }

CONFIGURATION: IV

CONFIGURATION: V

CONFIGURATION: VI

FIG. 7
CONFIGURATION: VII

| | | | | | | | | | | |
|---|---|---|---|---|---|---|---|---|---|---|
| LO (4%) | | Z | X | V | Q | K | J | G | | 7 COLUMNS |
| HI (70%) | T | S | R | O | N | I | H | E | A | 9 COLUMNS |
| MID (26%) | Y | W | U | P | M | L | F | D | C | B | 10 COLUMNS |

LH (51%) ▲ RH (49%)

{ DESCENDING ALPHABET WITHIN FREQUENCY (LO/HI/MID) SETS

{ APPLICABLE FOR LAYOUTS WITH MAXIMUM OF 10 COLUMNS

FIG. 8
CONFIGURATION: VIII

| | | | | | | | | | | |
|---|---|---|---|---|---|---|---|---|---|---|
| 9 COLUMNS | A | E | H | I | N | O | R | S | T | | HI (70%) |
| 10 COLUMNS | B | C | D | F | L | M | P | U | W | Y | MID (26%) |
| 7 COLUMNS | | | G | J | K | Q | V | X | Z | | LO (4%) |

LH (49%) ▲ RH (51%)

{ ASCENDING ALPHABET WITHIN FREQUENCY (HI/MID/LO) SETS

{ APPLICABLE FOR LAYOUTS WITH MAXIMUM OF 10 COLUMNS

FIG. 9
CONFIGURATION: IX

| | | | | | | | | | |
|---|---|---|---|---|---|---|---|---|---|
| MID (25%) | Y | W | U | P | M | L | F | D | C | 9 COLUMNS |
| HI (70%) | T | S | R | O | N | I | H | E | A | 9 COLUMNS |
| LO (5%) | Z | X | V | Q | K | J | G | B | | 8 COLUMNS |

LH (51%) ▲ RH (49%)

{ DESCENDING ALPHABET WITHIN FREQUENCY (MID/HI/LO) SETS

{ APPLICABLE FOR LAYOUTS WITH MAXIMUM OF 9 COLUMNS

CONFIGURATION: X

CONFIGURATION: XI

CONFIGURATION: XII

FIG. 13
CONFIGURATION: XIII

| | | | | | | | | | | |
|---|---|---|---|---|---|---|---|---|---|---|
| HI (70%) | T | S | R | O | N | I | H | E | A | 9 COLUMNS |
| MID (25%) | Y | W | U | P | M | L | F | D | C | 9 COLUMNS |
| LO (5%) | Z | X | V | Q | K | J | G | B | | 8 COLUMNS |

LH (51%) ▲ RH (49%)

{ DESCENDING ALPHABET WITHIN FREQUENCY (HI/MID/LO) SETS }   { APPLICABLE FOR LAYOUTS WITH MAXIMUM OF 9 COLUMNS }

FIG. 14
CONFIGURATION: XIV

| | | | | | | | | | | |
|---|---|---|---|---|---|---|---|---|---|---|
| 8 COLUMNS | | B | G | J | K | Q | V | X | Z | LO (5%) |
| 9 COLUMNS | A | E | H | I | N | O | R | S | T | HI (70%) |
| 9 COLUMNS | C | D | F | L | M | P | U | W | Y | MID (25%) |

LH (49%) ▲ RH (51%)

{ ASCENDING ALPHABET WITHIN FREQUENCY (LO/HI/MID) SETS }   { APPLICABLE FOR LAYOUTS WITH MAXIMUM OF 9 COLUMNS }

FIG. 15
CONFIGURATION: XV

| | | | | | | | | | | |
|---|---|---|---|---|---|---|---|---|---|---|
| LO (5%) | Z | X | V | Q | K | J | G | B | | 8 COLUMNS |
| HI (70%) | T | S | R | O | N | I | H | E | A | 9 COLUMNS |
| MID (25%) | Y | W | U | P | M | L | F | D | C | 9 COLUMNS |

LH (51%) ▲ RH (49%)

{ DESCENDING ALPHABET WITHIN FREQUENCY (LO/HI/MID) SETS }   { APPLICABLE FOR LAYOUTS WITH MAXIMUM OF 9 COLUMNS }

FIG. 16
CONFIGURATION: XVI

| | A | E | H | I | N | O | R | S | T | HI (70%) |
|---|---|---|---|---|---|---|---|---|---|---|
| 9 COLUMNS | | | | | | | | | | |
| 9 COLUMNS | C | D | F | L | M | P | U | W | Y | MID (25%) |
| 8 COLUMNS | B | G | J | K | Q | V | X | Z | | LO (5%) |

LH (49%) ▲ RH (51%)

{ ASCENDING ALPHABET WITHIN FREQUENCY (HI/MID/LO) SETS

{ APPLICABLE FOR LAYOUTS WITH MAXIMUM OF 9 COLUMNS

FIG. 17
CONFIGURATION: XXV

| | Y | W | U | P | M | L | G | F | C | B | |
|---|---|---|---|---|---|---|---|---|---|---|---|
| MID (23%) | | | | | | | | | | | 10 COLUMNS |
| HI (74%) | T | S | R | O | N | I | H | E | D | A | 10 COLUMNS |
| LO (3%) | Z | X | V | Q | K | J | | | | | 6 COLUMNS |

LH (51%) ▲ RH (49%)

{ DESCENDING ALPHABET WITHIN FREQUENCY (MID/HI/LO) SETS

{ APPLICABLE TO OVERLAY OF QWERTY LETTERS AND SEMICOLON COLON KEY

FIG. 18
CONFIGURATION: XXVI

| | | | | | J | K | Q | V | X | Z | LO (3%) |
|---|---|---|---|---|---|---|---|---|---|---|---|
| 6 COLUMNS | | | | | | | | | | | |
| 10 COLUMNS | A | D | E | H | I | N | O | R | S | T | HI (74%) |
| 10 COLUMNS | B | C | F | G | L | M | P | U | W | Y | MID (23%) |

LH (49%) ▲ RH (51%)

{ ASCENDING ALPHABET WITHIN FREQUENCY (LO/HI/MID) SETS

{ APPLICABLE TO OVERLAY OF TWO-HAND DVORAK LETTERS AND SEMICOLON COLON KEY

FIG. 19
CONFIGURATION: XXVII

| | | | | | | | | | |
|---|---|---|---|---|---|---|---|---|---|
| HI (74%) | T | S | R | O | N | I | H | E | D | A | 10 COLUMNS |
| MID (23%) | Y | W | U | P | M | L | G | F | C | B | 10 COLUMNS |
| LO (3%) | Z | X | V | Q | K | J | | | | | 6 COLUMNS |

LH (51%) ▲ RH (49%)

{ DESCENDING ALPHABET WITHIN FREQUENCY (HI/MID/LO) SETS

{ APPLICABLE TO OVERLAY OF QWERTY LETTERS AND SEMICOLON COLON KEY

FIG. 20
CONFIGURATION: XXVIII

| | | | | | | | | | | |
|---|---|---|---|---|---|---|---|---|---|---|
| 6 COLUMNS | | | | | J | K | Q | V | X | Z | LO (3%) |
| 10 COLUMNS | B | C | F | G | L | M | P | U | W | Y | MID (23%) |
| 10 COLUMNS | A | D | E | H | I | N | O | R | S | T | HI (74%) |

LH (49%) ▲ RH (51%)

{ ASCENDING ALPHABET WITHIN FREQUENCY (LO/MID/HI) SETS

{ APPLICABLE TO OVERLAY OF TWO-HAND DVORAK LETTERS AND SEMICOLON COLON KEY

FIG. 21
CONFIGURATION: XXIX

| | | | | | | | | | |
|---|---|---|---|---|---|---|---|---|---|
| LO (3%) | Z | X | V | Q | K | J | | | | | 6 COLUMNS |
| MID (23%) | Y | W | U | P | M | L | G | F | C | B | 10 COLUMNS |
| HI (74%) | T | S | R | O | N | I | H | E | D | A | 10 COLUMNS |

LH (51%) ▲ RH (49%)

{ DESCENDING ALPHABET WITHIN FREQUENCY (LO/MID/HI) SETS

{ APPROPRIATE FOR 10-COLUMN MAXIMUM

FIG. 22

CONFIGURATION: XXX

| | | | | | | | | | | |
|---|---|---|---|---|---|---|---|---|---|---|
| 10 COLUMNS | A | D | E | H | I | N | O | R | S | T | HI (74%) |
| 10 COLUMNS | B | C | F | G | L | M | P | U | W | Y | MID (23%) |
| 6 COLUMNS | | | | | J | K | Q | V | X | Z | LO (3%) |

LH (49%) ▲ RH (51%)

{ ASCENDING ALPHABET WITHIN FREQUENCY (HI/MID/LO) SETS

{ APPROPRIATE FOR 10-COLUMN MAXIMUM

FIG. 23

CONFIGURATION: XXXI

| LO (3%) | Z | X | V | Q | K | J | | | | | 6 COLUMNS |
| HI (74%) | T | S | R | O | N | I | H | E | D | A | 10 COLUMNS |
| MID (23%) | Y | W | U | P | M | L | G | F | C | B | 10 COLUMNS |

LH (51%) ▲ RH (49%)

{ DESCENDING ALPHABET WITHIN FREQUENCY (LO/HI/MID) SETS

{ APPROPRIATE FOR 10-COLUMN MAXIMUM

FIG. 24

CONFIGURATION: XXXII

| 10 COLUMNS | B | C | F | G | L | M | P | U | W | Y | MID (23%) |
| 10 COLUMNS | A | D | E | H | I | N | O | R | S | T | HI (74%) |
| 6 COLUMNS | | | | | J | K | Q | V | X | Z | LO (3%) |

LH (49%) ▲ RH (51%)

{ ASCENDING ALPHABET WITHIN FREQUENCY (MID/HI/LO) SETS

{ APPROPRIATE FOR 10-COLUMN MAXIMUM

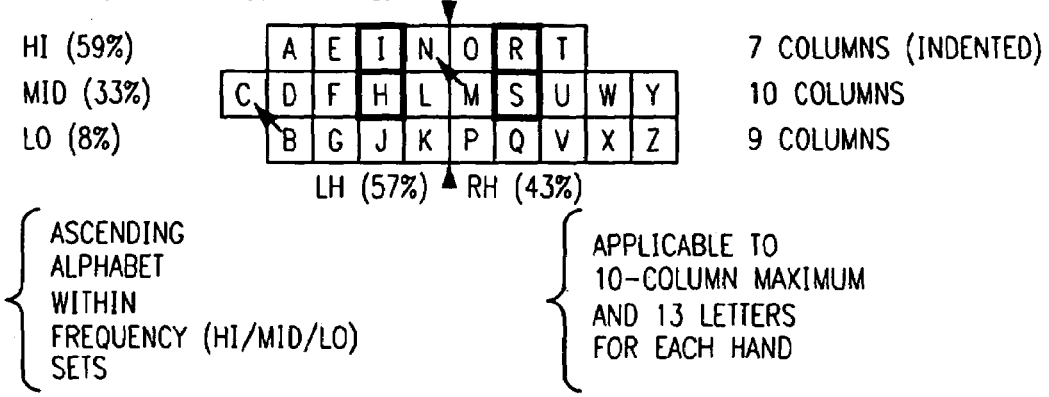

FIG. 25
CONFIGURATION: XXXVII

HI (59%) MID (33%) LO (8%)

7 COLUMNS (INDENTED)
10 COLUMNS
9 COLUMNS

LH (57%) ▲ RH (43%)

{ ASCENDING ALPHABET WITHIN FREQUENCY (HI/MID/LO) SETS

{ APPLICABLE TO 10-COLUMN MAXIMUM AND 13 LETTERS FOR EACH HAND

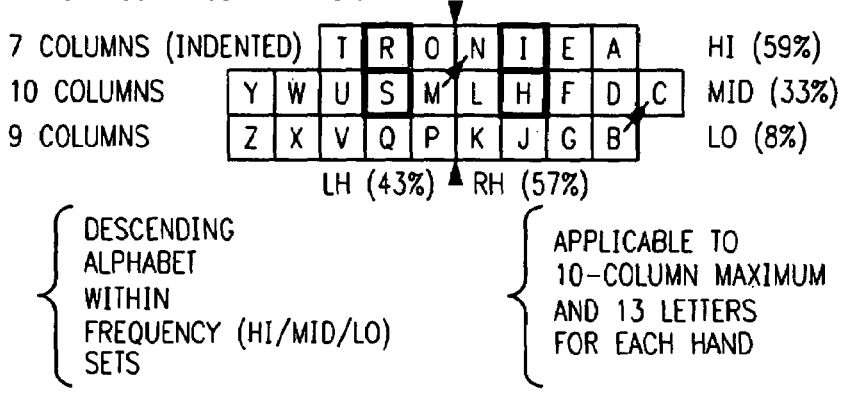

FIG. 26
CONFIGURATION: XXXVIII

7 COLUMNS (INDENTED)
10 COLUMNS
9 COLUMNS

HI (59%) MID (33%) LO (8%)

LH (43%) ▲ RH (57%)

{ DESCENDING ALPHABET WITHIN FREQUENCY (HI/MID/LO) SETS

{ APPLICABLE TO 10-COLUMN MAXIMUM AND 13 LETTERS FOR EACH HAND

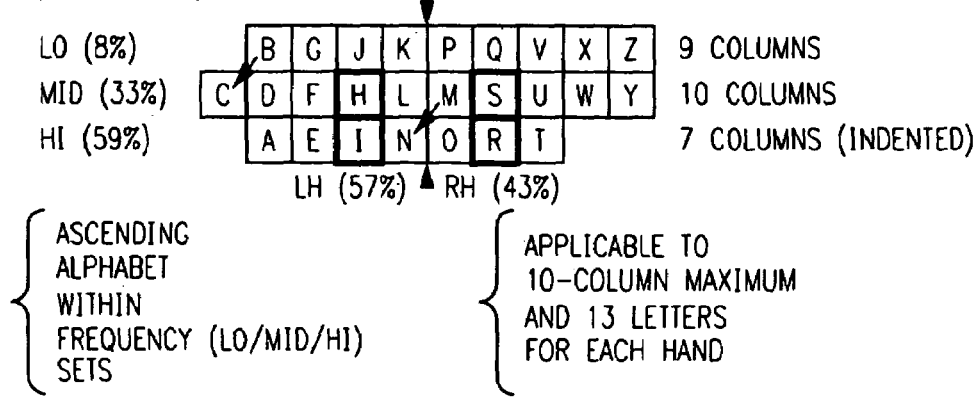

FIG. 27
CONFIGURATION: XXXIX

LO (8%) MID (33%) HI (59%)

9 COLUMNS
10 COLUMNS
7 COLUMNS (INDENTED)

LH (57%) ▲ RH (43%)

{ ASCENDING ALPHABET WITHIN FREQUENCY (LO/MID/HI) SETS

{ APPLICABLE TO 10-COLUMN MAXIMUM AND 13 LETTERS FOR EACH HAND

FIG. 28

CONFIGURATION: XL

| | | | | | | | | | | |
|---|---|---|---|---|---|---|---|---|---|---|
| 9 COLUMNS | Z | X | V | Q | P | K | J | G | B | LO (8%) |
| 10 COLUMNS | Y | W | U | S | M | L | H | F | D | C | MID (33%) |
| 7 COLUMNS (INDENTED) | | T | R | O | N | I | E | A | | HI (59%) |

LH (43%) ▲ RH (57%)

{ DESCENDING ALPHABET WITHIN FREQUENCY (LO/MID/HI) SETS

{ APPLICABLE TO 10-COLUMN MAXIMUM AND 13 LETTERS FOR EACH HAND

FIG. 29

CONFIGURATION: XLI

| | | | | | | | | | | |
|---|---|---|---|---|---|---|---|---|---|---|
| MID (33%) | C | D | F | H | L | M | S | U | W | Y | 10 COLUMNS |
| HI (59%) | | A | E | I | N | O | R | T | | 7 COLUMNS (INDENTED) |
| LO (8%) | B | G | J | K | P | Q | V | X | Z | 9 COLUMNS |

LH (57%) ▲ RH (43%)

{ ASCENDING ALPHABET WITHIN FREQUENCY (MID/HI/LO) SETS

{ APPLICABLE TO 10-COLUMN MAXIMUM AND 13 LETTERS FOR EACH HAND

FIG. 30

CONFIGURATION: XLII

| | | | | | | | | | | |
|---|---|---|---|---|---|---|---|---|---|---|
| 10 COLUMNS | Y | W | U | S | M | L | H | F | D | C | MID (33%) |
| 7 COLUMNS (INDENTED) | | T | R | O | N | I | E | A | | HI (59%) |
| 9 COLUMNS | Z | X | V | Q | P | K | J | G | B | LO (8%) |

LH (43%) ▲ RH (57%)

{ DESCENDING ALPHABET WITHIN FREQUENCY (MID/HI/LO) SETS

{ APPLICABLE TO 10-COLUMN MAXIMUM AND 13 LETTERS FOR EACH HAND

FIG. 31

CONFIGURATION: XLIII

| | | | | | | | | | | |
|---|---|---|---|---|---|---|---|---|---|---|
| LO (8%) | B | G | J | K | P | Q | V | X | Z | 9 COLUMNS |
| HI (59%) | | A | E | I | N | O | R | T | | 7 COLUMNS (INDENTED) |
| MID (33%) | C | D | F | H | L | M | S | U | W | Y | 10 COLUMNS |

LH (57%) ▲ RH (43%)

{ ASCENDING ALPHABET WITHIN FREQUENCY (LO/HI/MID) SETS

{ APPLICABLE TO 10-COLUMN MAXIMUM AND 13 LETTERS FOR EACH HAND

FIG. 32

CONFIGURATION: XLIV

| | | | | | | | | | | |
|---|---|---|---|---|---|---|---|---|---|---|
| 9 COLUMNS | Z | X | V | Q | P | K | J | G | B | LO (8%) |
| 7 COLUMNS (INDENTED) | T | R | O | N | I | E | A | | | HI (59%) |
| 10 COLUMNS | Y | W | U | S | M | L | H | F | D | C | MID (33%) |

LH (43%) ▲ RH (57%)

{ DESCENDING ALPHABET WITHIN FREQUENCY (LO/HI/MID) SETS

{ APPLICABLE TO 10-COLUMN MAXIMUM AND 13 LETTERS FOR EACH HAND

FIG. 35
CONFIGURATION IL

| | | | | | | | | | | |
|---|---|---|---|---|---|---|---|---|---|---|
| 9 COLUMNS | | B | G | J | K | Q | V | X | Y | Z | LO (7%) |
| 9 COLUMNS | A | E | H | I | N | O | R | S | T | | HI (70%) |
| 8 COLUMNS | C | D | F | L | M | P | U | W | | | MID (23%) |

LH (59%) ▲ RH (41%)

{ ASCENDING ALPHABET WITHIN FREQUENCY (LO/HI/MID) SETS

{ APPLICABLE TO 10-COLUMN RANGE AND 14 OR 12 LETTERS PER HAND

FIG. 36
CONFIGURATION L

| | | | | | | | | | | |
|---|---|---|---|---|---|---|---|---|---|---|
| 9 COLUMNS | Z | Y | X | V | Q | K | J | G | B | | LO (7%) |
| 9 COLUMNS | | T | S | R | O | N | I | H | E | A | HI (70%) |
| 8 COLUMNS | | W | U | P | M | L | F | D | C | | MID (23%) |

LH (41%) ▲ RH (59%)

{ DESCENDING ALPHABET WITHIN FREQUENCY (LO/HI/MID) SETS

{ APPLICABLE TO 10-COLUMN RANGE AND 14 OR 12 LETTERS PER HAND

FIG. 37
CONFIGURATION LI

| | | | | | | | | | | |
|---|---|---|---|---|---|---|---|---|---|---|
| 9 COLUMNS | | B | G | J | K | Q | V | X | Y | Z | LO (7%) |
| 8 COLUMNS | C | D | F | L | M | P | U | W | | | MID (23%) |
| 9 COLUMNS | A | E | H | I | N | O | R | S | T | | HI (70%) |

LH (59%) ▲ RH (41%)

{ ASCENDING ALPHABET WITHIN FREQUENCY (LO/MID/HI) SETS

{ APPLICABLE TO 10-COLUMN RANGE AND 14 OR 12 LETTERS PER HAND

FIG. 38
CONFIGURATION LII

9 COLUMNS | Z | Y | X | V | Q | K | J | G | B | LO (7%)
8 COLUMNS |   | W | U | P | M | L | F | D | C |   MID (23%)
9 COLUMNS | T | S | R | O | N | I | H | E | A | HI (70%)

LH (41%)  RH (59%)

{ DESCENDING ALPHABET WITHIN FREQUENCY (LO/MID/HI) SETS }   { APPLICABLE TO 10-COLUMN RANGE AND 14 OR 12 LETTERS PER HAND }

FIG. 39
CONFIGURATION LIII

9 COLUMNS | A | E | H | I | N | O | R | S | T | HI (70%)
8 COLUMNS | C | D | F | L | M | P | U | W |   | MID (23%)
9 COLUMNS |   | B | G | J | K | Q | V | X | Y | Z | LO (7%)

LH (59%)  RH (41%)

{ ASCENDING ALPHABET WITHIN FREQUENCY (HI/MID/LO) SETS }   { APPLICABLE TO 10-COLUMN RANGE AND 14 OR 12 LETTERS PER HAND }

FIG. 40
CONFIGURATION LIV

9 COLUMNS | T | S | R | O | N | I | H | E | A | HI (70%)
8 COLUMNS |   | W | U | P | M | L | F | D | C |   MID (23%)
9 COLUMNS | Z | Y | X | V | Q | K | J | G | B | LO (7%)

LH (41%)  RH (59%)

{ DESCENDING ALPHABET WITHIN FREQUENCY (HI/MID/LO) SETS }   { APPLICABLE TO 10-COLUMN RANGE AND 14 OR 12 LETTERS PER HAND }

FIG. 41
CONFIGURATION LV

| | | | | | | | | | |
|---|---|---|---|---|---|---|---|---|---|
| 8 COLUMNS | C | D | F | L | M | P | U | W | | MID (23%) |
| 9 COLUMNS | A | E | H | I | N | O | R | S | T | HI (70%) |
| 9 COLUMNS | B | G | J | K | Q | V | X | Y | Z | LO (7%) |

LH (59%) ▲ RH (41%)

{ ASCENDING ALPHABET WITHIN FREQUENCY (MID/HI/LO) SETS }   { APPLICABLE TO 10-COLUMN RANGE AND 14 OR 12 LETTERS PER HAND }

FIG. 42
CONFIGURATION LVI

| | | | | | | | | | |
|---|---|---|---|---|---|---|---|---|---|
| 8 COLUMNS | W | U | P | M | L | F | D | C | | MID (23%) |
| 9 COLUMNS | T | S | R | O | N | I | H | E | A | HI (70%) |
| 9 COLUMNS | Z | Y | X | V | Q | K | J | G | B | LO (7%) |

LH (41%) ▲ RH (59%)

{ DESCENDING ALPHABET WITHIN FREQUENCY (MID/HI/LO) SETS }   { APPLICABLE TO 10-COLUMN RANGE AND 14 OR 12 LETTERS PER HAND }

FIG. 43
CONFIGURATION LXI

97%

| | | | | | | | | | |
|---|---|---|---|---|---|---|---|---|---|
| 9 COLUMNS | B | G | J | K | P | Q | V | X | Z | LO (7%) |
| 8 COLUMNS | A | E | I | N | O | R | S | T | | HI (65%) |
| 9 COLUMNS | C | D | F | H | L | M | U | W | Y | MID (28%) |

LH (57%) ▲ RH (43%)

{ ASCENDING ALPHABET WITHIN FREQUENCY (LO/HI/MID) SETS }   { APPLICABLE TO 10-COLUMN RANGE AND 13 LETTERS FOR EACH HAND }

FIG. 53
CONFIGURATION LXXV

| | | | | | | | | | | |
|---|---|---|---|---|---|---|---|---|---|---|
| 9 COLUMNS | | B | G | J | K | Q | V | W | X | Z | LO (7%) |
| 8 COLUMNS | | C | F | H | L | M | P | U | Y | | MID (24%) |
| 9 COLUMNS | A | D | E | I | N | O | R | S | T | | HI (69%) |

LH (57%) ▲ RH (43%)

{ ASCENDING ALPHABET WITHIN FREQUENCY (LO/MID/HI) SETS

{ APPLICABLE TO 10-COLUMN RANGE AND 13 LETTERS FOR EACH HAND

FIG. 54
CONFIGURATION LXXVI

| | | | | | | | | | | |
|---|---|---|---|---|---|---|---|---|---|---|
| 9 COLUMNS | Z | X | W | V | Q | K | J | G | B | | LO (7%) |
| 8 COLUMNS | | Y | U | P | M | L | H | F | C | | MID (24%) |
| 9 COLUMNS | | T | S | R | O | N | I | E | D | A | HI (69%) |

LH (43%) ▲ RH (57%)

{ DESCENDING ALPHABET WITHIN FREQUENCY (LO/MID/HI) SETS

{ APPLICABLE TO 10-COLUMN RANGE AND 13 LETTERS FOR EACH HAND

FIG. 55
CONFIGURATION LXXVII

| | | | | | | | | | | |
|---|---|---|---|---|---|---|---|---|---|---|
| 9 COLUMNS | A | D | E | I | N | O | R | S | T | | HI (69%) |
| 8 COLUMNS | | C | F | H | L | M | P | U | Y | | MID (24%) |
| 9 COLUMNS | | B | G | J | K | Q | V | W | X | Z | LO (7%) |

LH (57%) ▲ RH (43%)

{ ASCENDING ALPHABET WITHIN FREQUENCY (HI/MID/LO) SETS

{ APPLICABLE TO 10-COLUMN RANGE AND 13 LETTERS FOR EACH HAND

FIG. 56
CONFIGURATION LXXVIII

| | | | | | | | | | | |
|---|---|---|---|---|---|---|---|---|---|---|
| 9 COLUMNS | | T | S | R | O | N | I | E | D | A | HI (69%) |
| 8 COLUMNS | | | Y | U | P | M | L | H | F | C | MID (24%) |
| 9 COLUMNS | Z | X | W | V | Q | K | J | G | B | | LO (7%) |

LH (43%) ▲ RH (57%)

{ DESCENDING ALPHABET WITHIN FREQUENCY (HI/MID/LO) SETS

{ APPLICABLE TO 10-COLUMN RANGE AND 13 LETTERS FOR EACH HAND

FIG. 57
CONFIGURATION LXXIX

| | | | | | | | | | | |
|---|---|---|---|---|---|---|---|---|---|---|
| 8 COLUMNS | | C | F | H | L | M | P | U | Y | | MID (24%) |
| 9 COLUMNS | A | D | E | I | N | O | R | S | T | | HI (69%) |
| 9 COLUMNS | | B | G | J | K | Q | V | W | X | Z | LO (7%) |

LH (57%) ▲ RH (43%)

{ ASCENDING ALPHABET WITHIN FREQUENCY (MID/HI/LO) SETS

{ APPLICABLE TO 10-COLUMN RANGE AND 13 LETTERS FOR EACH HAND

FIG. 58
CONFIGURATION LXXX

| | | | | | | | | | | |
|---|---|---|---|---|---|---|---|---|---|---|
| 8 COLUMNS | | Y | U | P | M | L | H | F | C | | MID (24%) |
| 9 COLUMNS | | T | S | R | O | N | I | E | D | A | HI (69%) |
| 9 COLUMNS | Z | X | W | V | Q | K | J | G | B | | LO (7%) |

LH (43%) ▲ RH (57%)

{ DESCENDING ALPHABET WITHIN FREQUENCY (MID/HI/LO) SETS

{ APPLICABLE TO 10-COLUMN RANGE AND 13 LETTERS FOR EACH HAND

CONFIGURATION LXXXIX

CONFIGURATION XC

CONFIGURATION XCI

{ RIGHT HAND TOP/BOTTOM ROWS EXCHANGED IN BASIC PDA SOLUTION

{ APPLICABLE TO 10-COLUMN RANGE AND 13 LETTERS FOR EACH HAND

CONFIGURATION XCII

{ MIRROR IMAGE WITH RIGHT HAND TOP/BOTTOM ROWS EXCHANGED IN BASIC PDA SOLUTION

{ APPLICABLE TO 10-COLUMN RANGE AND 13 LETTERS FOR EACH HAND

KEYBOARD CONFIGURATION SYSTEM

CROSS-REFERENCES TO RELATED APPLICATIONS

This patent application is a continuation-in-part of U.S. patent application Ser. No. 10/901,402 filed Jul. 27, 2004 entitled Keyboard Configuration System which issued as U.S. Pat. No. 7,008,127 on Mar. 7, 2006, which application is a continuation-in-part of U.S. patent application Ser. No. 10/405,120 filed Mar. 31, 2003 entitled Keyboard Configuration System which issued as U.S. Pat. No. 6,830,396 on Dec. 14, 2004, which applications are incorporated herein by this reference thereto.

COPYRIGHT AUTHORIZATION

Portions of the disclosure of this patent document may contain material which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

BACKGROUND OF THE INVENTION

1. Field of the Invention

This invention relates to keyboards such as used for typewriting and computer data entry and the like, and more particularly to a system for configuring a keyboard so that it is more easily learned and used by typists and users.

2. Description of the Related Art

With the advent of the typewriter, keyboards having keys corresponding to particular letters have been widely used for many years. Such keyboards are well established in the art.

Initially, typewriters often jammed because the keyboard used for the typewriters enabled the typist to go faster than the typewriter could type. This would cause the typewriter arms with the upraised letters to jam, causing the typewriting process to stop and forcing the typist to stop and clear the jam before proceeding.

This problem with initial keyboards or key sequences for typewriters was resolved by the implementation of the standard QWERTY keyboard. The QWERTY keyboard gets its name from the first six letters on the upper left hand side of the keyboard. The QWERTY keyboard was designed to actually slow the typist down so that the keys would not become jammed. Certain other accommodations or alignments may have taken place so that, for example, the two most frequently used keys would not cause each other to jam when typed in quick succession.

An alternative to the QWERTY keyboard is the DVORAK keyboard. The DVORAK keyboard is also well established and known in the art and was basically designed to provide a more ergonomic keyboard, placing the keys most used adjacent those fingers which are more able to use them. As people often use the letters E and T, these letters may be disposed adjacent the fingers that are more apt or able to use them.

Both of these keyboards suffer from the drawback that they are difficult to learn. They are difficult to learn conceptually because the keys are not disposed in any well-known organized sequence. They are also difficult to learn because the keys that are most used are not located in any regular location that easily conforms to a person's digital/finger anatomy or the mind's concept of the regular structure a keyboard often provides.

Many people may be hesitant to use a computer, typewriter, or other device due to the keyboard involved. Not knowing where the needed keys are leads to doubt that the proper key will be quickly found and fear that it will be a time-consuming process. Consequently, there may be some, if not many, individuals who consider a keyboard to be an imposition that is difficult to overcome due to its daunting nature and the fact that keyboard entry can be a slow and tedious process.

It would be an addition to the art to provide a means by which keyboards could be provided that are easy to use for beginners, but also allow established or experienced users to type quickly. The Keyboard Configuration System set forth herein satisfies both these criteria.

Some segment of the world's population has to perpetually learn or relearn the locations of keyboard letters. The existing QWERTY and the two-hand DVORAK keyboard layouts are well-known examples of keyboards used for typewriters, computers, and the like. These keyboard designs or structures may exclude that untutored population segment from knowledge-based society due to their design and complexity. Simplified layouts developed by the Keyboard Configuration System set forth herein serve as a means for inclusion of that population segment and make easier the learning and assimilation of such keyboards. The size of that population segment and the consequent future popularity of simplified keyboard layouts should not be underestimated. Furthermore, experienced typists can benefit from the System, as frequently used keys are readily available to the typist's fingertips.

Several prior attempts have been made in the art with respect to keyboards, keyboard configurations, and the like as reflected by the indication of background art, below, which may be regarded as useful for the understanding, searching and examination of the invention set forth and claimed herein. Brief descriptions of such prior attempts are set forth below. While the descriptions are believed to be accurate, no admission is made by them regarding their subject matter which is solely defined by the patent or reference involved. Unless otherwise indicated, the references are U.S. patents.

| PATENT NUMBER | INVENTOR | DATE OF ISSUE |
| --- | --- | --- |
| 6,053,647 | Parkinson | Apr. 25, 2000 |
| 5,879,089 | Armel | Mar. 9, 1999 |
| 5,836,705 | Choate | Nov. 17, 1998 |
| 5,584,588 | Harbaugh | Dec. 17, 1996 |
| Des. 368,708 | Maynard et al. | Apr. 9, 1996 |
| 4,519,721 | Gardner | May 28, 1995 |
| 5,387,042 | Brown | Feb. 7, 1995 |
| 4,927,279 | Morgan | May 22, 1990 |
| 4,824,268 | Diernisse H. V. | Apr. 25, 1989 |
| 4,715,736 | McGunnigle | Dec. 29, 1987 |
| 4,633,227 | Menn | Dec. 30, 1986 |
| 4,613,247 | MeGunnigle | Sep. 23, 1986 |
| EP 0 066 991 | Rushforth et al. | May 21, 1982 |
| 3,847,263 | X | Nov. 12, 1974 |
| 185,714 | Allen, R. T. P. | Dec. 26, 1876 |

The McGunnigle '736 and '247 patent references disclose a keyboard that can have different letter formats wherein the assigning of the letters to specific keys is based on the frequency of use of each letter in a given language.

In the '736 patent, the relative ease of accessibility of each key member to the fingers of the user's hands is given as an additional criteria for constructing the keyboard. This relative ease of accessibility is not necessarily linked or associated with the "adjacency" present in the Applicant's claimed keyboard system. In the '247 patent, the same relative ease of accessibility is used as a criteria as is a certain relative sloping of the keys between the left and right hands. In both of these patents, certain keyboard configurations are set forth that generally do not resemble the ones achieved by Applicant's system as claimed, nor is Applicant's claimed method used.

The Choate '705 patent reference discloses a keyboard arrangement that is based on the frequency of use of each letter. By concentrating work on a home row, finger extension, flexion, and travel is reduced to increase speed, accuracy, and safety. Yet, while reducing finger extension, flexion, and travel, the adjacency of the letters are not taken into account as does Applicant's claimed system.

The Brown '042 patent reference discloses a keyboard system that can be remapped by using software and template overlays. This system is directed towards a multilingual keyboard system that can incorporate a selectable key-mapping scheme according to user or other preferences. Such a keyboard system can support multiple character sets which provides significant advantages in countries such as India having several alphabets.

No disclosure is made to a keyboard system that is configured according to both frequency of use as well as adjacency. Consequently, this reference does not approach the subject matter set forth herein and in Applicant's claims.

In the Parkinson '647 patent reference, the user friendly and efficient keyboard is set forth where the letters are in alphabetical order so that they are easy to find and the locations are easy to learn and retain. No indication of arrangement according to frequency of use of the letters is set forth in the Parkinson '647 patent. Consequently, Applicant's system and claims far surpass the subject matter set forth in the Parkinson '647 patent.

In the Armel '089 patent reference, a keyboard arrangement is set forth with a specific arrangement of keys. No indication of the use of a simultaneous application of frequency and adjacency requirements is set forth, criteria which are needed with respect to Applicant's system and claims.

In the Harbaugh '588 patent reference, a computer keyboard layout is set forth that takes into account only the alphabetical arrangement of the keys. No consideration of frequency of use or alphabetical adjacency is taken into account. Consequently, this patent reference does not approach Applicant's system claims.

In the Maynard et al. '708 design patent reference, an alphabetical keyboard arrangement is set forth that does not take into account a frequency of use or alphabetical adjacency.

In the Morgan '279 patent reference, keyboards for homes are disclosed where the vowels are separated from the consonants. While the alphabet is in its natural sequential order, no frequency of use criteria or alphabetical adjacency criteria are used in order to determine the keyboard layout.

In the Diernisse H. V. '268 patent reference, an ergonomic keyboard is disclosed which is designed to take maximum advantage of the shape, dexterity, and strength of the hands and fingers. No frequency of use or alphabetical adjacency in a spatial sense are used as criteria in order to achieve the ergonomic keyboard set forth in the reference.

In the Menn '227 patent reference, a programmable keyboard for a typewriter or similar device is set forth that allows the user to select from a number of predetermined different keyboard arrangements such as QWERTY or Dvorak arrangements. This is in distinction to Applicant's system and claims which set forth a method of designing keyboards and resulting keyboard designs from the method that take into account frequency of use as well as alphabetical adjacency. These criteria are absent from the Menn '227 patent reference.

In the Gardner '721 patent reference, a typewriter keyboard layout is set forth that has a keyboard divided into three substantially horizontal rows and provides a keyboard that is alphabetical in left to right order. Frequency of use criteria is not used in determining the typewriter keyboard layout of the Gardner '721 patent reference, nor is alphabetical adjacency, something which goes beyond mere alphabetical order. Applicant's system of claims require both frequency of use and alphabetical adjacency, making the Gardner '721 patent reference a disclosure which does not bear closely upon Applicant's claims.

In the European patent application publication number 006699182, a character keyboard is set forth that has distinct zones and keys of varying sizes with the central keys generally smaller than the larger outlying keys. No disclosure with respect to the arrangement of the keyboard arising from frequency of use and alphabetical adjacency is set forth in the European patent application publication.

In the X '263 patent reference, an English keyboard scheme is set forth that provides a spatial arrangement for the letter keys on the keyboard which can be balanced for either dextral or sinistral typists hands and fingers to place the greater portion of the typing on the home row and distributing the remainder to upper and lower rows. This in distinction to Applicant's system and claims which are based upon the arrangement and achievement of a keyboard based upon frequency of use and alphabetical adjacency.

In the Allen '714 patent reference, an improvement in typewriters is set forth which does not deal directly with the keyboards for such a typewriter. Moreover, no selection or design of a keyboard based upon frequency of use and alphabetical adjacency is set forth.

The remaining references may have one or more elements in common with the invention of the present case. However, none of them are believed to be any more pertinent to patentability than those discussed above.

Such concerns may also be extended to keyboards for languages other than English as well as keyboards designed for alternative department configurations (for example, where only the thumbs are used predominately, or just the fingers, etc.).

SUMMARY OF THE INVENTION

In view of the foregoing disadvantages inherent in the known types of means by which keyboards can be configured, and now present in the prior art, the present invention provides a new keyboard configuration system wherein it can be used to efficiently and methodically provide a keyboard that is easier to use for both beginners and those who are familiar with the keyboard.

The general purpose of the present invention, as described below in greater detail, is to provide a keyboard configuration system by which alphabets of almost any, if not all, phonetic written languages can be applied to a keyboard structure in an efficient, predictable, and easy-to-learn manner. The Keyboard Configuration System set forth herein results in not only a new method by which keyboards can be achieved, but also new keyboards which are not anticipated, rendered obvious, suggested, taught, or even implied by any of the prior art keyboards or keyboard construction systems, either alone or taken in any reasonable combination thereof.

The Keyboard Configuration System set forth herein provides a new system for configuring keyboards using both frequency and alphabetical bases. The Keyboard Configuration System uses alphabetized frequency-based sets of keys in rows in order to fulfill the requirement that the keyboard must provide a key for each letter of the alphabet. The alphabet is analyzed for letter use on a frequency basis. The frequency-ranked list is then broken into rows according to the number of rows needed for the keyboard. Each row resulting from the frequency-ranked list is then alphabetized independently so that each resulting key row represents a certain segment of the frequency-ranked list. Each key row is alphabetized separately. Each key row may be of different length and the resulting keyboard may have a number of configurations depending upon the relative shift between each of the independently arranged key rows. Generally, the longest key row determines the number of key row shifts, or cases, as left or right justification rules generally apply. The resulting keyboards are then evaluated for demerits according to motion (for example, as in alphabetical succession) that is backward relative to the alphabetical direction as well as motion and/or succession that is excess forward of zero or one key columns relative to the alphabetical direction. The resulting demerit tallies for all available keyboard candidates are evaluated with those keyboard configurations or cases having the lowest number of demerits being prime candidates for implementation as an actual keyboard. The system set forth here may be adaptable to any written language, especially those based upon phonetic alphabets. Further embodiments include keyboards for PDAs (Personal Digital Assistants).

The Keyboard Configuration System set forth herein initially ranks the letters of the pertinent alphabet, for example the English alphabet, in the order in which the letter is most frequently used in the language. This is a ranking that is generally different from that of the alphabetical rank. For example, in the English language, the letters E and T are the most often used, while the letters A and B are the first letters in alphabetical sequence.

Once the frequency ranking is established, certain rules are imposed as far as the keyboard is concerned. Generally, there are a limited number of rows for the keyboard, the number of rows generally being three. Additionally, there may be a limit to the length of a row, approximately ten. Additionally, a third rule can be applied in that the resulting key row sets are aligned at either their left side or their right side (left and right justification, respectively). Within these general operating parameters, the Keyboard Configuration System sets forth different rows comprising different frequency levels of the letters of the pertinent alphabet.

For a three row keyboard, a high frequency row, middle frequency row, and low frequency row are established to span and present the entire alphabet and are generally referred to herein as key row sets or key sets. The length of each of these rows may be different and may be shifted with respect to one another.

Prior to the association of individual frequency-ranked letters to keys on a keyboard, each of the selected row sets are placed in alphabetical order such that the high frequency, middle frequency, and low frequency key sets are all in alphabetical order from either left to right or right to left. The resulting alphabetized and frequency-biased key row sets are then applied to the keyboard in question.

Due to the variable number of keys in each row and the ability to shift key rows within the left or right limits of the longest key row, a variety of different keyboard configurations arise as candidates for a best or preferred keyboard or keyboards. For example, in the English language, 120 keyboard candidates arise for evaluation.

In order to evaluate such keyboard candidates, a demerit system is used. A demerit is assessed to the keyboard if there is backward travel from the alphabetical direction (left to right or right to left) going from the beginning of the alphabet to the end of the alphabet. Backward travel is considered to be backward when it either departs from such left to right or right to left travel. This generally means that, for example, if the alphabetical direction is left to right, in going from a letter to its next alphabetically-adjacent letter, the backward travel is in the right to left direction. A demerit is assessed for each column the next letter is physically away from the current letter. For example, in going from J to K, if the K key is three columns to the left of the J key and the alphabetical direction of travel is left to right, three demerits would be assessed to the keyboard.

Demerits are also assessed for excess forward travel. In the example above, one demerit only would be assessed for the K key if the K key were two columns to the right away from the J key. Alphabetical travel in the same column, or the next adjacent column in the alphabetical direction, is not assessed any demerits. In this way, forward travel is acknowledged, but excess forward travel is subject to a demerit for each column of excess forward travel experienced.

Once all of the keyboard candidates have been assessed for demerits, those with the fewest demerits are considered to be the best or preferred modes as they have been both frequency biased by the row selection and are more alphabetical in order than any of the other keyboards due to their minimal demerit tally.

The Keyboard Configuration System of the present invention results in keyboards that are easily used and understood, making them advantageous for both the experienced and novice user. While the English language has been used here as an example, any phonetically based language which has an alphabet (and apparently all such languages do) is susceptible to the Keyboard Configuration System set forth herein. Written language that is not based on phonetic alphabets, such as Asian languages, may be susceptible to the present System with minor changes, so long as there is a frequency-based discrimination that can be made as well as a standard linear progression for rearranging the frequency-biased rows. Other alphabets may also be susceptible to the present invention.

Certain attempts to resolve and address certain foreign languages are set forth herein. Also, useful keyboard configurations for PDA's (Personal Digital Assistants) are provided.

In one embodiment, the present invention includes a keyboard having a first sequence consecutively and in order of the English letters B, D, H, L, R, S, U, and Q, a second sequence consecutively and in order of the English letters G, A, E, I, N, O, T, and V, and a third sequence consecutively and in order of the English letters K, J, C, F, M, P, W, Y, X, and Z. A further elaboration of this embodiment includes these first, second, and third sequences each being a separate row.

Another embodiment of the invention set forth herein includes a keyboard having a first sequence consecutively and in order of the Cyrillic letters Ё, Б, В, К, Л, П, Р, с, х, ц, Щ, and Ъ, a second sequence consecutively and in order of the Cyrillic letters Ж, Г, А, Е, И, Н, О, Т, Ч, Ш, and Э, and a third sequence consecutively and in order of the Cyrillic letters Ф, й, Д, З, М, У, Ы, Я, Ь, and Ю. A further elaboration of this embodiment includes these first, second, and third sequences each being a separate row.

Other, additional embodiments of the present invention are also set forth, below.

In one embodiment, a frequency-based alphabetical list is set forth in a table having six rows. The table is split in half and rotated to place the two parts of the high-frequency column together in the center. These two center columns, each having three letters, are flanked by three-letter columns of decreasing frequency until the outer edges have only letters of the lowest frequency.

In one embodiment, a keyboard configuration is determined by a method for efficiently configuring a keyboard representing letters of an alphabet of a language. The method used comprising includes determining a frequency for each letter of the alphabet as used in the language to provide a frequency-ordered list as well as applying the frequency-ordered list to a keyboard where each letter is represented by a key to provide a keyboard configuration. The keyboard configuration is evaluated for departures from alphabetical adjacency and the evaluating step is repeated for all possible keyboard configurations available through the step of applying the frequency-ordered list. A keyboard configuration is selected having a minimal number of departures from alphabetical adjacency so that a keyboard configuration is achieved maximizing frequency of use in the language and alphabetical adjacency.

In another embodiment, a method is provided for efficiently configuring a keyboard for a personal digital assistant (PDA) representing letters of an alphabet of a language. The method determines a frequency for each letter of the alphabet as used in the language to provide a frequency-ordered list and applies the frequency-ordered list to a keyboard where each letter is represented by a key to provide a keyboard configuration. The method evaluates the keyboard configuration for departures from alphabetical adjacency with respect to left and right thumbs of normal users of the PDA where higher frequency letters are generally positioned at a central location proximate a default position for the left and right thumbs and lower frequency letters are generally positioned away from the central location according to a degree of frequency. The evaluating step is repeated for all possible keyboard configurations available through the step of applying the frequency-ordered list and a keyboard configuration is selected having a minimal number of departures from alphabetical adjacency such that a keyboard configuration is achieved maximizing frequency of use in the language and alphabetical adjacency. Adjacency may be determined in a number of different ways with the goal of providing easier keyboard entry for a person using a PDA or other keyboard that relies upon the thumbs for data entry and the like.

In another embodiment, a keyboard configuration is provided that arises from the PDA keyboard method, above.

OBJECTS OF THE INVENTION

The objects set forth herein are exemplary only and in no way limit the extent of the protection afforded by the present patent, which is solely determined by the accompanying claims.

It is an object of the present invention to provide a system for obtaining keyboards that are efficient and useful.

It is another object of the present invention to provide a system to determine such keyboards that are reliable and predictable.

It is yet another object of the present invention to provide keyboards that are more useful as they are biased on both a frequency and alphabetical basis.

It is yet another object of the present invention to make more useful and efficient keyboards that are easier to learn.

These and other objects and advantages of the present invention will be apparent from a review of the following specification and accompanying drawings. The foregoing objects are some of but a few of the goals sought to be attained by the present invention and are set forth for the purposes of example only and not those of limitation.

BRIEF DESCRIPTION OF THE DRAWINGS

FIGS. 1–8 are various arrangements of case 61, a particularly advantageous case as set forth herein.

FIGS. 9–16 show respectively eight configurations for cases 53 and 153 as set forth herein, and for case 553 of the Abridged Supplemental Appendix.

FIGS. 17–24 show respectively eight configurations for cases 196, 296, and 396 as set forth herein, and for case 596 of the Abridged Supplemental Appendix.

FIGS. 25–32 are eight configurations for the layout arising from case 317, a particularly advantageous case having a low number of demerits.

FIGS. 35–42 are eight configurations arising from case 051E of the Continuation Appendix.

FIGS. 43–50 are eight configurations arising from case 332F of the Continuation Appendix.

FIGS. 51–58 are eight configurations arising from case 451F of the Continuation Appendix.

FIG. 67 shows a dominant-finger keyboard for the English alphabet while FIG. 68 shows a dominant-finger keyboard for the Cyrillic alphabet

BRIEF DESCRIPTION OF THE APPENDICES

Figure 4:
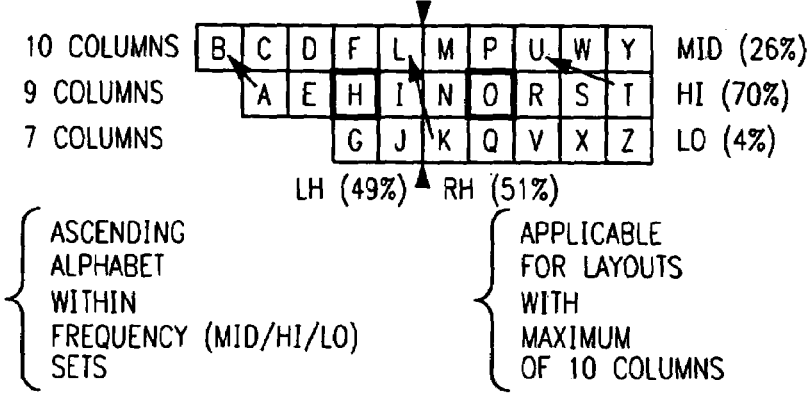

The following appendices are incorporated herein by this reference thereto.

The Appendix Index indicates the case numbers available by shift according to the key row sets used to obtain the alphabet string. The Appendix is a listing of the first 96 cases for a Gaines/Meaker letter frequency basis as well as additional cases of interest. Cases 101–196, 201–296, 301–396, and 401–496, are based upon other letter frequency determinations as indicated herein. These cases have been analyzed, resulting in the identification of 4 competitive keyboard solutions. These cases are expanded into 48 configurations. The most useful configurations are illustrated in 32 figures, namely FIGS. 1–32.

Certain case numbers are missing as redundant in that they are achieved by one of the first 96 cases (1–96) or otherwise. For example, cases 255–261 are missing as identical to cases 155–161. This is noted in case 254 with an indication of its being the same as case 154. As both cases 154 and 254 are identical, their shifts (shift 2–shift 8) are also identical. Consequently, cases 255–261 are identical to cases 155–161. More explanation is given in detail, below.

The Continuation Appendix contains numerical equivalent tables arising from an expansion of available key positions for each row with there being considered ten (10) key positions instead of nine (9). These new cases have been analyzed, resulting in the identification of 3 new competitive keyboard solutions. These cases are expanded into 36 new configurations. The most useful configurations are illustrated in 24 new figures, namely FIGS. 35–58.

The Abridged Supplemental Appendix contains only a sample of many numerical equivalent tables that were analyzed arising from additional probability distributions for English and several foreign languages. No new competitive keyboard solutions are identified.

The PDA Rotation Appendix contains alphabet letter tables that were analyzed regarding a thumb-based keyboard implementation, resulting in the identification of 1 new competitive keyboard solution. This case is expanded into 8 new configurations. All of these configurations are illustrated in 8 new figures, namely FIGS. 59–66.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention resides in a new keyboard system and method therefor that enables keyboards to be configured that address both the frequency of letter use in a language as well as the alphabetic sequence generally used in that language. Particularly, keyboards such as those shown in FIGS. 67 and 68 may be achieved that deliver the most-used letters to the typist where such letters may be most convenient.

The Keyboard Configuration System set forth herein provides many advantages over those know previously, not the least of which are faster learning of the keyboard as well as faster typing and use of the keyboard.

The Keyboard Configuration System is an iterative numerical process of both synthesis and evaluation that facilitates discovery of the most beneficial location of letters on keyboards. The Keyboard Configuration System may result in a keyboard that is in both alphabetical and frequency-of-use ("frequency") order. Generally, this location of letters follows the alphabet for the language in question. For English, it is seen as beneficial to have the letters on the keyboard in alphabetical, A–Z, order.

The System uses the same alphabetical collating sequences that index dictionaries. The System is adaptable to all alphabets and to almost all written languages. Letters may be converted for convenience to numerical equivalents beginning with 01 for the first letter. The System uses available percentages indicating frequency of occurrence by letter in the relevant language. Percentages may be converted for convenience to numerical rankings beginning with number 01 for the most used letter.

Each letter may be linked or associated to both a numerical equivalent and a numerical ranking. All of the numerical rankings are then rearranged from 01 and up. The numerical rankings are then subdivided into several sets that reflect major categories varying from highest to lowest frequencies. The minimum quantity of sets is governed by the actual or planned count of keyboard rows in a field of keyboard letters. Typically, three keyboard rows are used leading to three sets. The quantity of numerical rankings in a set is governed by the actual or planned counts of columns per row in a field of keyboard letters. The quantity of sets may be increased by variations in the counts of columns per row, across all rows. Planned variations could be essential to finding suitable or "best" alternative keyboard layouts.

Once a keyboard row set is established, the numerical rankings by frequency may be ignored, and the focus may be on the numerical equivalents of the letters. These numerical equivalents are then rearranged from 01 and up (that is, ascending or descending alphabetical order) within each keyboard row set. The same numerical equivalent values may reappear in several sets. Analysis is performed individually on strings of sets with each string accounting for each letter once and only once.

Evaluation is performed as if all sets within a string were positioned side by side. Tallies of demerits may be accumulated during evaluation when the numerical equivalent of a letter is incremented by 01 and the result is necessarily found in one of the sets (rows) within a string. Demerits are counted for every position, in a column wise (or horizontal) sense, of movement that retreats from the nominal forward direction, generally considered as one column forward of the currently selected key. Demerits are also counted for every position (column) of movement that advances in the nominal forward direction that is in excess of 01 position (column) of change.

The system may cycle at least once for each string, and the two different demerit tallies (backward-type demerits and excess-forward type demerits) are reported for each string. Additional cycling is needed if there are variations in set lengths (columns per row) within a string. For example, a set length of nine has two degrees of freedom with respect to a set length limit of 10 within a string, as there are two ways a nine key set can be disposed within a 10 key row. A set length of seven would then have four degrees of freedom.

Planned displacements beyond the boundaries of maximum set length for a string could also be essential or useful to finding suitable alternative keyboard layouts.

The following case study illustrates an exemplary application of the Keyboard Configuration System to the English language and alphabet commonly used in the United States. The tables set forth herein track this alphabet through all the steps of the System. Specific keyboard configurations are developed by the process. The overall visual effect from new configurations is that of a braided alphabet, achieved by interlacing letters from all rows within an optimized column-by-column progression.

Table 1 is established by creating 26 records. The key value in each record is called the "numerical equivalent." These values are integers varying from 01 through 26. One "letter" of the alphabet is assigned to each of the 26 records. The alphabet letters are: A, B, C, D, E, F, G, H, I, J, K, L, M, N, O, P, Q, R, S, T, U, V, W, X, Y, Z. This alphabetical sequence is used to assign the letters, starting with letter A and numerical equivalent 01. The last letter Z is paired with numerical equivalent 26. The assigned letters are then used as a link in establishing "ranking" values in all 26 records. Consequently, this part of the process ranks the letters according to alphabetical order. By using sets indicating alphabetical order, the System is more easily generalized to other alphabets.

TABLE 1

Arranged by Numerical Equivalent

| LETTER | ALPHABETICAL NUMERICAL EQUIVALENT | FREQUENCY RANKING |
|---|---|---|
| A | 01 | 03 |
| B | 02 | 19 |
| C | 03 | 12 |
| D | 04 | 11 |
| E | 05 | 01 |
| F | 06 | 15 |
| G | 07 | 20 |
| H | 08 | 09 |
| I | 09 | 06 |
| J | 10 | 25 |
| K | 11 | 22 |
| L | 12 | 10 |
| M | 13 | 16 |
| N | 14 | 05 |
| O | 15 | 04 |
| P | 16 | 14 |
| Q | 17 | 23 |
| R | 18 | 08 |
| S | 19 | 07 |
| T | 20 | 02 |
| U | 21 | 13 |
| V | 22 | 21 |
| W | 23 | 17 |
| X | 24 | 24 |
| Y | 25 | 18 |
| Z | 26 | 26 |

The Keyboard Configuration System also requires the letters to be ranked in terms of frequency of use in the relevant language. This is a statistical evaluation as reflected generally by the actual use of the language.

The book Cryptanalysis by H. F. Gaines lists one order and frequency of single letters. This list was compiled from a chart showing frequencies of English diagrams, prepared by G. P. Meaker. This chart sums the actual count made on 10,000 letters of literary text. These sums by letter are easily converted to percentages by inserting a decimal point. The letters were placed in order by sorting on the frequency (percentage) values with the following result:

| | |
|---|---|
| Z and 0.09% | J and 0.10% |
| X and 0.20% | Q and 0.20% |
| K and 0.52% | V and 0.93% |
| G and 1.61% | B and 1.62% |
| Y and 1.88% | W and 2.03% |
| M and 2.25% | F and 2.28% |
| P and 2.29% | U and 3.10% |
| C and 3.20% | D and 3.65% |
| L and 4.03% | H and 5.14% |
| R and 6.03% | S and 6.59% |
| I and 7.18% | N and 7.19% |
| O and 7.94% | A and 8.05% |
| T and 9.59% | E and 12.31% |

The frequency ranking values in Table 1 are integers varying from 26 through 01. The frequency (percentage) order is used to assign the rankings, starting with letter Z and ranking 26, then letter J and ranking 25. The next to last letter T is paired with ranking 02, then letter E is paired with ranking 01. This concludes the loading of both alphabetical and frequency ranking values into Table 1 (arranged by numerical equivalents).

Table 2 (rearranged by numerical ranking) is achieved by sorting Table 1 on the frequency ranking values in ascending order. The key value in each record is now its "numerical ranking." These values are integers varying from 01 through 26 with one number uniquely corresponding to each letter of the relevant alphabet. Finally, Table 2 is verified by matching the displayed letters against the frequency order: E, T, A, O, N, I, S, R, H, L, D, C, U, P, F, M, W, Y, B, G, V, K, Q, X, J, Z. (from Gaines/Meaker)

TABLE 2

Arranged by Numerical Ranking

| LETTER | ALPHABETICAL NUMERICAL EQUIVALENT | FREQUENCY RANKING |
|---|---|---|
| E | 05 | 01 |
| T | 20 | 02 |
| A | 01 | 03 |
| O | 15 | 04 |
| N | 14 | 05 |
| I | 09 | 06 |
| S | 19 | 07 |
| R | 18 | 08 |
| H | 08 | 09 |
| L | 12 | 10 |
| D | 04 | 11 |
| C | 03 | 12 |
| U | 21 | 13 |
| P | 16 | 14 |
| F | 06 | 15 |
| M | 13 | 16 |
| W | 23 | 17 |
| Y | 25 | 18 |
| B | 02 | 19 |
| G | 07 | 20 |
| V | 22 | 21 |
| K | 11 | 22 |
| Q | 17 | 23 |
| X | 24 | 24 |
| J | 10 | 25 |
| Z | 26 | 26 |

The 25 key row sets are set forth in Table 3 where the sets are arranged by ranking range. The sets have a hyphenated key that is the ranking range with a key frequency ranking start value followed by a key frequency ranking end value. Each row set has a set length value for the number of keys in the row, which is also one greater than the difference calculated by subtracting ranking start value from ranking end value. The minimum set length is determined by imposing the arbitrary condition that there are three rows of letters (three sets) and a maximum of 10 columns of letters in a row on the keyboard. If two rows have 10 columns each, then the third row has six columns so that the total is 26 letters (the number of letters in the presently-selected alphabet). Therefore, the set lengths in Table 3 are either 06, 07, 08, 09 or 10, and the possible groupings are then limited to rows having at least six keys, but no more than ten keys.

TABLE 3

Sets by Ranking Range

| RANKING RANGE | SET LENGTH | NUMERICAL EQUIVALENTS |
|---|---|---|
| 01–06 | 06 | 05,20,01,15,14,09 |
| 01–07 | 07 | 05,20,01,15,14,09,19 |

TABLE 3-continued

Sets by Ranking Range

| RANKING RANGE | SET LENGTH | NUMERICAL EQUIVALENTS |
|---|---|---|
| 01–08 | 08 | 05,20,01,15,14,09,19,18 |
| 01–09 | 09 | 05,20,01,15,14,09,19,18,08 |
| 01–10 | 10 | 05,20,01,15,14,09,19,18,08,12 |
| 07–16 | 10 | 19,18,08,12,04,03,21,16,06,13 |
| 08–16 | 09 | 18,08,12,04,03,21,16,06,13 |
| 08–17 | 10 | 18,08,12,04,03,21,16,06,13,23 |
| 09–16 | 08 | 08,12,04,03,21,16,06,13 |
| 09–17 | 09 | 08,12,04,03,21,16,06,13,23 |
| 09–18 | 10 | 08,12,04,03,21,16,06,13,23,25 |
| 10–16 | 07 | 12,04,03,21,16,06,13 |
| 10–17 | 08 | 12,04,03,21,16,06,13,23 |
| 10–18 | 09 | 12,04,03,21,16,06,13,23,25 |
| 10–19 | 10 | 12,04,03,21,16,06,13,23,25,02 |
| 11–16 | 06 | 04,03,21,16,06,13 |
| 11–17 | 07 | 04,03,21,16,06,13,23 |
| 11–18 | 08 | 04,03,21,16,06,13,23,25 |
| 11–19 | 09 | 04,03,21,16,06,13,23,25,02 |
| 11–20 | 10 | 04,03,21,16,06,13,23,25,02,07 |
| 17–26 | 10 | 23,25,02,07,22,11,17,24,10,26 |
| 18–26 | 09 | 25,02,07,22,11,17,24,10,26 |
| 19–26 | 08 | 02,07,22,11,17,24,10,26 |
| 20–26 | 07 | 07,22,11,17,24,10,26 |
| 21–26 | 06 | 22,11,17,24,10,26 |

The first group of key row sets ("sets") has a frequency ranking start value 01 and set lengths 06, 07, 08, 09 and 10. The second group has a frequency ranking start value 07 (as the first group has at least six letters) and set length 10 (the maximum). No other sets are needed for the second group as a smaller set would require a third group having more than ten letters, the limit in this example. The third group has ranking start value 08 and set lengths 09 and 10. The fourth group has ranking start value 09 and set lengths 08, 09 and 10. The fifth group has ranking start value 10 and set lengths 07, 08, 09 and 10. The sixth group has ranking start value 11 and set lengths 06, 07, 08, 09 and 10. The seventh group of sets has ranking end value 26 and set lengths 10, 09, 08, 07 and 06.

Each set in Table 3 has room for up to 10 numerical equivalent values, or key frequency numerical equivalent values. The set length value controls the actual number of numerical equivalent values in each record. These numerical equivalent values are fetched from Table 2, as follows. The first ranking range 01–06, for example, isolates the first six sets in Table 2 and numerical equivalent values 05, 20, 01, 15, 14 and 09 are transferred. This process is repeated until all 25 sets are prepared. However, the last ranking range 21–26, for example, isolates the last six sets, or letters, in Table 2, and numerical equivalent values 22, 11, 17, 24, 10 and 26 are transferred. The same is similarly true for the other four sets ending with "Z", numerical equivalent 26.

Table 4 (rearranged equivalents by set) is very similar to Table 3. The total number of sets is also 25. The key ranking range values are identical, as are the set length values. The only difference is the horizontal order of the numerical equivalent values. The horizontal order is changed from ascending frequency ranking to ascending alphabetical ranking. Each of the 25 sets is manipulated independently, as follows. The first record places values 01, 05, 09, 14, 15 and 20 in alphabetical ascending sequence. This process is repeated until all 25 sets are prepared. The last set places values 10, 11, 17, 22, 24 and 26 in alphabetically ascending sequence, for example.

TABLE 4

Alphabetically Rearranged Equivalents by Set

| RANKING RANGE | SET LENGTH | ALPHABETIZED NUMERICAL EQUIVALENTS |
|---|---|---|
| 01–06 | 06 | 01,05,09,14,15,20 |
| 01–07 | 07 | 01,05,09,14,15,19,20 |
| 01–08 | 08 | 01,05,09,14,15,18,19,20 |
| 01–09 | 09 | 01,05,08,09,14,15,18,19,20 |
| 01–10 | 10 | 01,05,08,09,12,14,15,18,19,20 |
| 07–16 | 10 | 03,04,06,08,12,13,16,18,19,21 |
| 08–16 | 09 | 03,04,06,08,12,13,16,18,21 |
| 08–17 | 10 | 03,04,06,08,12,13,16,18,21,23 |
| 09–16 | 08 | 03,04,06,08,12,13,16,21 |
| 09–17 | 09 | 03,04,06,08,12,13,16,21,23 |
| 09–18 | 10 | 03,04,06,08,12,13,16,21,23,25 |
| 10–16 | 07 | 03,04,06,12,13,16,21 |
| 10–17 | 08 | 03,04,06,12,13,16,21,23 |
| 10–18 | 09 | 03,04,06,12,13,16,21,23,25 |
| 10–19 | 10 | 02,03,04,06,12,13,16,21,23,25 |
| 11–16 | 06 | 03,04,06,13,16,21 |
| 11–17 | 07 | 03,04,06,13,16,21,23 |
| 11–18 | 08 | 03,04,06,13,16,21,23,25 |
| 11–19 | 09 | 02,03,04,06,13,16,21,23,25 |
| 11–20 | 10 | 02,03,04,06,07,13,16,21,23,25 |
| 17–26 | 10 | 02,07,10,11,17,22,23,24,25,26 |
| 18–26 | 09 | 02,07,10,11,17,22,24,25,26 |
| 19–26 | 08 | 02,07,10,11,17,22,24,26 |
| 20–26 | 07 | 07,10,11,17,22,24,26 |
| 21–26 | 06 | 10,11,17,22,24,26 |

The five sets in Table 4 with ranking start value 01 identify those letters with high frequency of usage. The five sets with ranking end value 26 identify those letters with low frequency of usage. It appears to be mere coincidence that the last letter in the alphabet is also used least. The 15 remaining sets identify those letters with frequency of usage that is not high and not low.

The ranking range of each of the 15 middle frequency sets generally govern the construction of ranking range strings making up an entire and restructured alphabet. Each string is composed of key row sets that are selected or configured to provide each letter in the selected alphabet. As used herein, the term "string" generally refers to such a reconfigured alphabet or keyboard sequence made up of appropriately selected key sets.

Each middle ranking range is preceded by a high-ranking range and followed by a low ranking range. The high and low ranking ranges are selected appropriately so that the numerical equivalents of the selected alphabet's 26 letters are used once and only once per string. The 15 strings (that are the 15 middle ranking ranges) are summarized in an Appendix Index, which immediately precedes the Appendix of case studies set forth herewith. Each of these 15 key/letter strings is associated with a specific count, or number, of cases. Three of the 15 strings (9–17; 10–17; 10–18) use two cases per string for a subtotal of six cases. Three of the 15 strings (7–16; 11–16; 11–20) use five cases of a keyboard layout per string for a subtotal of 15 cases. Six strings (8–16; 8–17; 10–16; 10–19; 11–17; 11–19) use eight cases per string for a subtotal of 48 cases. Finally, three strings (9–16; 9–18; 11–18) use nine cases per string for a subtotal of 27 cases. In some cases, the additional requirement of left side or right side alignment is also imposed (e.g., cases 31 and 32).

The lowest case number associated with each string correlates with either shift 1 of 2, shift 1 of 5, shift 1 of 8 or shift 1 of 9, respectively. The highest case number associated with each string correlates with either shift 2 of 2, shift 5 of 5, shift 8 of 8 or shift 9 of 9, respectively. The number of shifts per string is a function of the degrees of freedom afforded short set lengths with respect to the maximum set length for each string. Generally, the longest set in a string defines the left and right boundaries for justification purposes.

The two case numbers 31 and 32 illustrate alignments for a combination of set lengths 8, 9, and 9. The three ranking ranges of the strings are separately used to access Table 4, and the numerical equivalent values are transferred to three lists in all two case exhibits.

In this case, the key strings are of length 8, 9, and 9, which result in three sets of ranking ranges. Set 1 is 01–08, 09–17, and 18–26, which begins with case 31. Set 2 is 01–09, 10–17, and 18–26, which begins with case 50. Set 3 is 01–09, 10–18, and 19–26, which begins with case 52. These three sets correspond respectively to key set lengths of 8, 9, 9; 9, 8, 9; and 9, 9, 8, respectively, and are the three permutations of key string lengths 8, 9, 9 for the ranking ranges available in Table 4 that cover the entire 26 letter English alphabet.

In case 31, shift 1 of 2 initializes all lists in position 01. In case 32, shift 2 of 2 starts the short list in position 02. Both lists end in position 09.

The five case numbers 01 through 05 illustrate alignments for a combination of set lengths 6, 10, and 10. The unique three ranking ranges of the string are separately used to access, or are used in reference to, Table 4, and the numerical equivalent values are used as the key sets in all five case exhibits. Shift 1 of 5 initializes all lists in position 01. Shifts 2 of 5, 3 of 5, and 4 of 5 start the short list in positions 02, 03 and 04, respectively. Shift 5 of 5 starts the short list in position 05, and all lists end in position 10. There are five shifts, or degrees of freedom, available for a 26-letter keyboard with set lengths of 6, 10, and 10 as there are five different positionings for the six-key string with respect to the other two ten-key strings. For efficiency and convenience, the two ten-key strings are configured with their ends aligned.

The eight case numbers 06 through 13 illustrate alignments for a combination of set lengths 7, 9, and 10. The eight case numbers arise from the four positions available for the seven-key string times the two positions available for the nine-key string. The three key set ranking ranges of the string are separately used to access Table 4, and the numerical equivalent values are used in the three key sets in all eight case exhibits. Shift 1 of 8 initializes all lists in position 01. Shifts 2 of 8, 3 of 8 and 4 of 8 start the shortest list, the seven-key string, in positions 02, 03 and 04, respectively. Shift 5 of 8 restarts the shortest list in position 01 and starts the other short list, the nine-key string, in position 02. Shifts 6 of 8 and 7 of 8 restart the shortest list in positions 02 and 03, respectively. Shift 8 of 8 restarts the shortest list in position 04, and all lists end in position 10.

The nine case numbers 22 through 30 illustrate alignments for a combination of set lengths 8, 8, and 10. The three ranking ranges of the string are separately used to access Table 4, and the numerical equivalent values are used in the three key set lists in all nine case exhibits. Shift 1 of 9 initializes all lists in position 01. Shifts 2 of 9 and 3 of 9 start one chosen short list in positions 02 and 03, respectively. Shift 4 of 9 restarts the chosen short list in position 01 and starts the other short list in position 02. Shifts 5 of 9 and 6 of 9 restart the chosen short list in positions 02 and 03, respectively. Shift 7 of 9 restarts the chosen short list in position 01 and starts the other short list in position 03. Shift 8 of 9 restarts the chosen short list in position 02. Shift 9 of 9 restarts the chosen short list in position 03, and all lists end in position 10.

Similarly, the process is repeated for the remaining cases, cases 31–96, for set lengths 8, 9, 9 (2 cases); 8, 10, 8 (9 cases); 9, 7, 10 (8 cases); 9, 8, 9 (2 cases); 9, 9, 8 (2 cases); 9; 10, 7 (8 cases); 10, 6, 10 (5 cases); 10, 7, 9 (8 cases); 10, 8, 8, (9 cases); 10, 9, 7 (8 cases); and 10, 10, 6 (5 cases). All of these cases, as indicated above, are generated from Table 4 with the construction rule that that no key string has greater than ten keys and that the entire (26 letter English) alphabet is covered.

Case number 92 is the least optimized of the 96 cases. Evaluation is performed on 25 pairs of successive numerical equivalent values, which results in a gauge of the case's optimization or lack thereof. Demerit scores are displayed in the case exhibit next to the higher of successive values for a pair. In case number 92, the pairs 01 to 02 (A to B), 13 to 14 (M to N), and 15 to 16 (O to P) receive no demerits for lateral movement in the same position. The pairs 02 to 03 (B to C), 03 to 04 (C to D), 06 to 07 (F to G), 08 to 09 (H to I), 10 to 11 (J to K), 12 to 13 (L to M), 14 to 15 (N to 0), 18 to 19 (R to S), and 19 to 20 (S to T) receive no demerits for forward movement of one position. The pair 04 to 05 (D to E) receives one demerit for backward movement of one position. The pairs 07 to 08 (G to H) and 20 to 21 (T to U) receive two demerits for backward movement of two positions. The pair 09 to 10 (I to J) receives three demerits for backward movement of three positions. The pairs 16 to 17 (P to Q), 21 to 22 (U to V), 23 to 24 (W to X), and 25 to 26 (Y to Z) receive four demerits for backward movement of four positions. There are a total of 24 demerits for backward movement for the entire case of case number 92.

The pair 05 to 06 (E to F) receives one demerit for forward movement of two positions (one column excess forward). The pair 11 to 12 (K to L) receives two demerits for forward movement of three positions. The pairs 17 to 18 (Q to R), 22 to 23 (V to W), and 24 to 25 (X to Y) receive four demerits for forward movement of five positions. There are a total of 15 demerits for excess forward movement.

As indicated above, demerits are given for any backward motion or any excess forward motion that is two or more columns away from the first key. No demerits are given for forward motion of one column from the first key or motion in the same column as the first key.

Case numbers 53 and 61 are tied for the most optimized of the 96 cases. Each case has no demerits for excess forward movement. Each case has a total of four demerits for backward movement. In both cases, the pair 20 to 21 receives two demerits for backward movement. In both cases, the pair 11 to 12 receives one demerit for backward movement. In case 53 all lists end in position 09, and the pair 02 to 03 receives one demerit for backward movement. In case 61 all lists end in position 10, and the pair 01 to 02 receives one demerit for backward movement.

Table 5 (case numbers by total demerits) has a one line record for each of the 96 cases. Backward demerits and excess forward demerits are displayed. These two demerit values are summed, and the total demerits result is displayed for each case. All 96 sets in Table 5 are sorted by case number within total demerits value. Case number 92 is listed at the end of Table 5. The largest total demerits value of 39 is the sum of 24 backward demerits and 15 excess forward demerits. Only three cases have no excess forward demerits. Case numbers 53, 61 and 40 are listed in that sequence at the beginning of Table 5. Case number 40 is not the most optimized, because five backward demerits were contributed by four pairs of numerical equivalent values. Both case numbers 53 and 61 are the most optimized, because in each case four backward demerits were contributed by only three pairs of numerical equivalent values. For these three leading cases, the total demerits equal backward demerits.

TABLE 5

Case Numbers by Total Demerits

| TOTAL DEMERITS | CASE NUMBER | BACKWARD DEMERITS | EXCESS FORWARD DEMERITS |
|---|---|---|---|
| 4 | 53 | 4 | 0 |
| 4 | 61 | 4 | 0 |
| 5 | 40 | 5 | 0 |
| 6 | 57 | 5 | 1 |
| 7 | 41 | 6 | 1 |
| 7 | 42 | 6 | 1 |
| 7 | 96 | 6 | 1 |
| 8 | 72 | 6 | 2 |
| 8 | 79 | 6 | 2 |
| 8 | 86 | 6 | 2 |
| 8 | 87 | 7 | 1 |
| 9 | 37 | 7 | 2 |
| 9 | 50 | 7 | 2 |
| 9 | 91 | 7 | 2 |
| 10 | 22 | 8 | 2 |
| 10 | 39 | 7 | 3 |
| 10 | 71 | 8 | 2 |
| 10 | 76 | 8 | 2 |
| 10 | 80 | 8 | 2 |
| 10 | 83 | 7 | 3 |
| 11 | 19 | 8 | 3 |
| 11 | 25 | 9 | 2 |
| 11 | 36 | 8 | 3 |
| 11 | 52 | 8 | 3 |
| 11 | 56 | 8 | 3 |
| 12 | 43 | 10 | 2 |
| 12 | 60 | 9 | 3 |
| 12 | 62 | 9 | 3 |
| 12 | 67 | 9 | 3 |
| 12 | 75 | 9 | 3 |
| 13 | 07 | 10 | 3 |
| 13 | 20 | 9 | 4 |
| 13 | 46 | 10 | 3 |
| 13 | 63 | 10 | 3 |
| 13 | 73 | 9 | 4 |
| 13 | 95 | 9 | 4 |
| 14 | 31 | 10 | 4 |
| 14 | 38 | 10 | 4 |
| 14 | 47 | 11 | 3 |
| 15 | 08 | 11 | 4 |
| 15 | 32 | 11 | 4 |
| 15 | 68 | 11 | 4 |
| 15 | 82 | 10 | 5 |
| 15 | 90 | 10 | 5 |
| 16 | 06 | 11 | 5 |
| 16 | 18 | 11 | 5 |
| 16 | 28 | 12 | 4 |
| 16 | 51 | 12 | 4 |
| 17 | 02 | 12 | 5 |
| 17 | 64 | 12 | 5 |
| 17 | 78 | 12 | 5 |
| 17 | 85 | 12 | 5 |
| 18 | 03 | 13 | 5 |
| 18 | 26 | 13 | 5 |
| 18 | 33 | 12 | 6 |
| 19 | 15 | 13 | 6 |
| 19 | 29 | 14 | 5 |
| 19 | 34 | 13 | 6 |
| 19 | 77 | 13 | 6 |
| 20 | 01 | 13 | 7 |
| 20 | 21 | 14 | 6 |
| 20 | 23 | 14 | 6 |
| 20 | 44 | 14 | 6 |
| 20 | 55 | 14 | 6 |
| 21 | 12 | 15 | 6 |
| 21 | 16 | 14 | 7 |

TABLE 5-continued

Case Numbers by Total Demerits

| TOTAL DEMERITS | CASE NUMBER | BACKWARD DEMERITS | EXCESS FORWARD DEMERITS |
|---|---|---|---|
| 21 | 48 | 15 | 6 |
| 21 | 69 | 14 | 7 |
| 21 | 94 | 14 | 7 |
| 22 | 04 | 16 | 6 |
| 22 | 09 | 16 | 6 |
| 22 | 14 | 14 | 8 |
| 22 | 59 | 15 | 7 |
| 22 | 74 | 14 | 8 |
| 23 | 13 | 16 | 7 |
| 24 | 11 | 16 | 8 |
| 24 | 35 | 16 | 8 |
| 24 | 65 | 16 | 8 |
| 24 | 89 | 16 | 8 |
| 25 | 81 | 16 | 9 |
| 27 | 30 | 18 | 9 |
| 28 | 17 | 19 | 9 |
| 28 | 84 | 18 | 10 |
| 29 | 05 | 20 | 9 |
| 29 | 10 | 18 | 11 |
| 29 | 27 | 19 | 10 |
| 29 | 45 | 19 | 10 |
| 29 | 49 | 19 | 10 |
| 30 | 70 | 19 | 11 |
| 30 | 93 | 19 | 11 |
| 31 | 54 | 20 | 11 |
| 32 | 24 | 20 | 12 |
| 32 | 66 | 20 | 12 |
| 33 | 58 | 21 | 12 |
| 35 | 88 | 22 | 13 |
| 39 | 92 | 24 | 15 |

The two most optimized cases (53 and 61) are consolidated in Table 6 (the numerical equivalent solutions normalized, or rearranged, for comparison). The three key set lists (high, middle, and low ranking rows) of numerical equivalents in each case are inverted so that the greatest value in each list is relocated to the top. The relocations are identical for numerical equivalents 01 (A) and the entire sequence from 03 through 26 (C–Z). The sole exception is numerical equivalent 02 (B), which is depicted in two locations. Parentheses are used to suggest that both locations do not occur simultaneously. In the 10-column solution (case 61), value 02 is at the bottom of the list for the middle ranking row. In the 9-column solution (case 53), value 02 is at the bottom of the list for the low ranking row. The high-ranking row remains constant for both 10-column and 9-column solutions.

TABLE 6

Numerical Equivalent Solutions Normalized for Comparison
Cases 53 (9-column) and 61 (10-column)

| COLUMN | HIGH RANKING ROW | MIDDLE RANKING ROW | LOW RANKING ROW |
|---|---|---|---|
| 01 | 20 | 25 | 26 |
| 02 | 19 | 23 | 24 |
| 03 | 18 | 21 | 22 |
| 04 | 15 | 16 | 17 |
| 05 | 14 | 13 | 11 |
| 06 | 09 | 12 | 10 |
| 07 | 08 | 06 | 07 |
| 08 | 05 | 04 | (02) |
| 09 | 01 | 03 | |
| 10 | | (02) | |

The basic pattern of the twin solutions in Table 6 can be manipulated into a variety of keyboard layouts. Table 7 (24 configurations defined by two solutions) sets forth the variables that contribute to configurations. The location of numerical equivalent 02 (Letter B) determines maximum 10-letter or 9-letter rows for this configuration. The left-to-right sequence of descending alphabet (from Z to A) locates numerical equivalents 20, 25 and 26 (letters T, Y and Z) in a left side column justification. Ascending alphabet (from A to Z) locates letters T, Y and Z in a right side column justification.

TABLE 7

Cases 53 and 61
24 Configurations Defined by 2 Solutions

| NUMBER OF CONFIGURATIONS | OPTIONS |
| --- | --- |
| 6 | High/Middle/Low Frequency Sets versus Top/Center/Bottom Rows |
| 2 | Left Side Column Justification versus Right Side Column Justification |
| 2 | Maximum 10-Letter Row Solution versus Maximum 9-Letter Row Solution |
| 24 | Multiplication Product |

The high, middle and low frequency sets of letters are independently located on top, center or bottom rows of keys. When the high and middle frequency sets are not separated, there are four ways to locate sets on rows; the low frequency set is on the top or bottom row, and the high frequency set is directly above or directly below the middle frequency set. When the high and middle frequency sets are separated, there are two ways to locate sets on rows; the low frequency set is on the center row, and the high frequency set is two rows above or two rows below the middle frequency set. The 24 configurations covered by this application are defined by exploring all of the possible outcomes of each of the three types of variables noted in Table 7.

Several examples of realized keyboards using configurations/Cases 53 and 61 are shown in FIGS. 1–16. FIGS. 1–8 correspond to case 61 and FIGS. 9–16 correspond to case 53.

Figure 33:
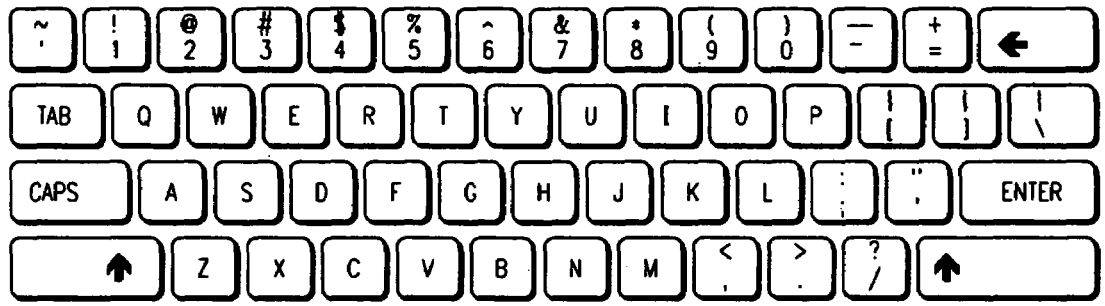
FIGS. 33 and 34 are keyboard layouts for the QWERTY keyboard and the DVORAK keyboard, respectively, both keyboard layouts previously known in the art.
Figure 34:
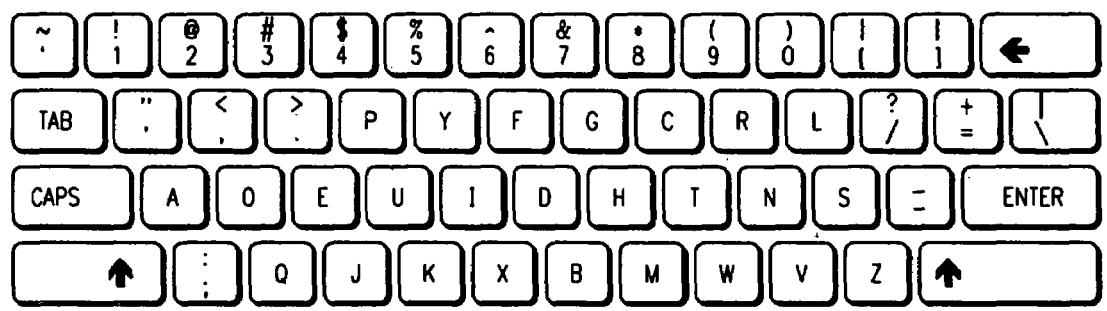

The achieved improvements of the Keyboard Configuration System are compared to two popular examples of prior art: the QWERTY layout (FIG. 33) and the two-hand DVORAK layout (FIG. 34). Table 8 (competitive activity metrics) quantifies three categories of activity: demerits evaluated by the case method, percentages per row by frequency, percentages per hand. The displayed percents are rounded to integers.

The excess forward demerits and backward demerits for the Keyboard Configuration System are taken directly from the leading sets of Table 5, which are, as indicated above, cases 53 and 61. Corresponding values for the QWERTY layout are developed as follows: The pairs C to D, D to E and W to X receive no demerits for lateral movement. The pairs E to F, F to G, G to H, J to K, K to L and O to P receive no demerits for forward movement of one position. The pairs H to I and T to U receive one demerit for excess forward movement of two positions. The pairs N to O, Q to R and S to T receive two demerits for excess forward movement of three positions. The pairs A to B and X to Y receive three demerits for excess forward movement of four positions. There are a total of 14 demerits for excess forward movement. The pairs I to J and M to N receive one demerit for backward movement. The pairs B to C, L to M, R to S and V to W receive two demerits for backward movement. The pair U to V receives three demerits for backward movement. The pair Y to Z receives five demerits for backward movement. The pair P to Q receives nine demerits for backward movement. There are a total of 27 demerits for backward movement. There are a grand total of 41 demerits for the QWERTY layout.

Corresponding values for the two-hand DVORAK layout are developed as follows: The pairs G to H and X to Y receive no demerits for lateral movement. The pairs F to G, J to K and R to S receive no demerits for forward movement of one position. The pairs B to C, M to N and O to P receives one demerit for excess forward movement of two positions. The pair E to F receives two demerits for excess forward movement of three positions. The pairs A to B, U to V and Y to Z receive four demerits for excess forward movement of five positions. The pair K to L receives five demerits for excess forward movement of six positions. The pair Q to R receives six demerits for excess forward movement of seven positions. There are a total of 28 demerits for excess forward movement. The pair V to W receives one demerit for backward movement. The pairs C to D, H to I, I to J, P to Q and S to T receive two demerits for backward movement. The pairs D to E, L to M and W to X receive three demerits for backward movement. The pair T to U receives four demerits for backward movement. The pair N to O receives seven demerits for backward movement. There are a total of 31 demerits for backward movement. There are a grand total of 59 demerits for the two-hand DVORAK layout.

All three competing layouts have 11 letter keys operated by one hand and 15 letter keys operated by the other hand. The maximum 10-letter row layout of the Keyboard Configuration System Case 61 has six component frequency percentages (the percent frequency of use for letter) as follows. The high frequency row of the 11-letter side contains A and 8.05%, E and 12.31%, H and 5.14%, 1 and 7.18% for a subtotal of 32.68%. The middle frequency row of the 11-letter side contains B and 1.62%, C and 3.20%, D and 3.65%, F and 2.28%, L and 4.03% for a subtotal of 14.78%. The low frequency row of the 11-letter side contains G and 1.61%, J and 0.10% for a subtotal of 1.71%. The high frequency row of the 15-letter side contains N and 7.19%, O and 7.94%, R and 6.03%, S and 6.59%, T and 9.59% for a subtotal of 37.34%. The middle frequency row of the 15-letter side contains M and 2.25%, P and 2.29%, U and 3.10%, W and 2.03%, Y and 1.88% for a subtotal of 11.55%. The low frequency row of the 15-letter side contains K and 0.52%, Q and 0.20%, V and 0.93%, X and 0.20%, Z and 0.09% for a subtotal of 1.94%.

The sum of the two high frequency row components 32.68% plus 37.34% yields a grand total of 70.02%, the High Frequency Row percentage shown in Table 8. The sum of the two middle frequency row components 14.78% plus 11.55% yields a grand total 26.33%. The sum of the two low frequency row components 1.71% plus 1.94% yields a grand total of 3.65%. The sum of the three 11-letter side components 32.68% plus 14.78% plus 1.71% yields a grand total 49.17%. The sum of the three 15-letter side components 37.34% plus 11.55% plus 1.94% yields a grand total 50.83%. These 11-letter side and 15-letter side grand totals apply to both right and left hands. These grand total percentages are shown in the "Keyboard Configuration System" column of Table 8.

TABLE 8

Cases 53 and 61
Competitive Activity Metrics

| KEYBOARD CONFIGURATION SYSTEM Case 61/53 | QWERTY LAYOUT | TWO-HAND DVORAK LAYOUT | ACTIVITY |
|---|---|---|---|
| 0 | 14 | 28 | Excess Forward Demerits |
| 4 | 27 | 31 | Backward Demerits |
| 70% | 53% | 71% | High Frequency Row |
| 26%/25% | 32% | 21% | Middle Frequency Row |
| 4%/5% | 15% | 8% | Low Frequency Row |
| 49% (R & L) | 42% (R) | 44% (L) | 11-Letter Hand |
| 51% (L & R) | 58% (L) | 56% (R) | 15-Letter Hand |

The maximum 9-letter row layout of the Keyboard Configuration System Case 53 has two alternate component percentages as follows. The middle frequency row of the 11-letter side contains C and 3.20%, D and 3.65%, F and 2.28%, L and 4.03% for a subtotal of 13.16%. The low frequency row of the 11-letter side contains B and 1.62%, G and 1.61%, J and 0.10% for a subtotal of 3.33%. The alternate sum of the two middle frequency row components 13.16% plus 11.55% yields a grand total 24.71%. The alternate sum of the two low frequency row components 3.33% plus 1.94% yields a grand total of 5.27%. These two alternate grand totals are displayed in the first column of Table 8 to the right of the slash symbols. The alternate component percentages do not affect grand totals for high frequency row, right hand or left hand activity.

The QWERTY layout has six component percentages as follows. The top row with high frequency usage on the left side contains Q and 0.20%, W and 2.03%, E and 12.31%, R and 6.03%, T and 9.59% for a subtotal of 30.16%. The center row with middle frequency usage on the left side contains A and 8.05%, S and 6.59%, D and 3.65%, F and 2.28%, G and 1.61% for a subtotal of 22.18%. The bottom row with low frequency usage on the left side contains Z and 0.09%, X and 0.20%, C and 3.20%, V and 0.93%, B and 1.62% for a subtotal of 6.04%. The top row with high frequency usage on the right side contains Y and 1.88%, U and 3.10%, 1 and 7.18%, O and 7.94%, P and 2.29% for a subtotal of 22.39%. The center row with middle frequency usage on the right side contains H and 5.14%, J and 0.10%, K and 0.52%, L and 4.03% for a subtotal of 9.79%. The bottom row with low frequency usage on the right side contains N and 7.19%, M and 2.25% for a subtotal of 9.44%.

The sum of the two top row with high frequency usage components 30.16% plus 22.39% yields a grand total 52.55%. The sum of the two center row with middle frequency usage components 22.18% plus 9.79% yields a grand total 31.97%. The sum of the two bottom row with low frequency usage components 6.04% plus 9.44% yields a grand total 15.48%. The sum of the three left side components 30.16% plus 22.18% plus 6.04% yields a grand total 58.38%. The sum of the three right side components 22.39% plus 9.79% plus 9.44% yields a grand total 41.62%. These grand totals are shown in the QWERTY layout column of Table 8.

The two-hand DVORAK layout has six component percentages as follows. The center 10 row with high frequency usage on the left side contains A and 8.05%, O and 7.94%, E and 12.31%, U and 3.10%, 1 and 7.18% for a subtotal of 38.58%. The top row with middle frequency usage on the left side contains P and 2.29%, Y and 1.88% for a subtotal of 4.17%. The bottom row with low frequency usage on the left side contains Q and 0.20%, J and 0.10%, K and 0.52%, X and 0.20% for a subtotal of 1.02%. The center row with high frequency usage on the right side contains D and 3.65%, H and 5.14%, T and 9.59%, N and 7.19%, S and 6.59% for a subtotal of 32.16%. The top row with middle frequency usage on the right side contains F and 2.28%, G and 1.61%, C and 3.20%, R and 6.03%, L and 4.03% for a subtotal of 17.15%. The bottom row with low frequency usage on the right side contains B and 1.62%, M and 2.25%, W and 2.03%, V and 0.93%, Z and 0.09% for a subtotal of 6.92%.

The sum of the two center rows with high frequency usage components 38.58% plus 32.16% yields a grand total of 70.74%. The sum of the two top rows with middle frequency usage components 4.17% plus 17.15% yields a grand total of 21.32%. The sum of the two bottom rows with low frequency usage components 1.02% plus 6.92% yields a grand total of 7.94%. The sum of the three left side components 38.58% plus 4.17% plus 1.02% yields a grand total of 43.77%. The sum of the three right side components 32.16% plus 17.15% plus 6.92% yields a grand total 56.23%. These grand totals are shown in the Two Hand Dvorak Layout column of Table 8.

From the above, one can see the advantages and efficiencies of the Keyboard Configuration System set forth herein. The resulting keyboard string is generally alphabetical in progression with frequently used keys placed in position (by row segregation) for easy access and use by the typist/user.

Table 9 (Keyboard Configuration System overlay of QWERTY letters) shows that case 61 precisely matches the dimensions of letters in the QWERTY layout with 10 letters on the top row, nine letters on the center row, seven letters on the bottom row and with letters on all three rows left justified into column 01. For retrofitting purposes, this keyboard configuration may be particularly advantageous as when a QWERTY keyboard is replaced with a Keyboard Configuration System keyboard. The descending alphabet is required in order to achieve left justification for the Keyboard Configuration System. The 10 letters with middle frequency usage exactly fit on the top row without disturbing special symbols. The numerical equivalent values 25, 23, 21, 16, 13, 12, 06, 04, 03, 02 are converted respectively to letters Y, W, U, P. M, L, F, D, C, B. The nine letters with high frequency usage exactly fit on the center row without disturbing special symbols. The numerical equivalent values 20, 19, 18, 15, 14, 09, 08, 05, 01 are converted respectively to letters T, S, R, O, N, I, H, E, A. The seven letters with low frequency usage exactly fit on the bottom row without disturbing special symbols. The numerical equivalent values 26, 24, 22, 17, 11, 10, 07 are converted respectively to letters Z, X, V, Q, K, J, G. Of course, the overlay of Table 9 may be reversed to provide left-to-right progression for ascending alphabetical sequence.

TABLE 9

Keyboard Configuration System Overlay of QWERTY Letters - Case 61

| COLUMN LEFT | BOTTOM ROW | CENTER ROW | TOP ROW |
|---|---|---|---|
| 01 | Z | T | Y |
| 02 | X | S | W |
| 03 | V | R | U |
| 04 | Q | O | P |

TABLE 9-continued

Keyboard Configuration System Overlay of
QWERTY Letters - Case 61

| COLUMN LEFT | BOTTOM ROW | CENTER ROW | TOP ROW |
|---|---|---|---|
| 05 | K | N | M |
| 06 | J | I | L |
| 07 | G | H | F |
| 08 |   | E | D |
| 09 |   | A | C |
| 10 RIGHT |   |   | B |

Table 10 (translation of QWERTY letters) contains 26 letter-to-letter relationships. For example, the three left justified letters from top to bottom rows in the QWERTY layout are Q, A, Z. Letter Q converts to Y, letter A converts to T, and letter Z remains the same as before. Therefore, the three left justified letters from top to bottom rows in the comparable Keyboard Configuration System layout are Y, T, Z. The three letters S, W, X also remain the same as before. The four unchanging letters are flagged in Table 10 by equal signs.

TABLE 10

Case 61
Translation of QWERTY Letters

| QWERTY | KEYBOARD CONFIGURATION SYSTEM |
|---|---|
| A | T |
| B | K |
| C | V |
| D | R |
| E | U |
| F | O |
| G | N |
| H | I |
| I | D |
| J | H |
| K | E |
| L | A |
| M | G |
| N | J |
| O | C |
| P | B |
| Q | Y |
| R | P |
| S | =S |
| T | M |
| U | F |
| V | Q |
| W | =W |
| X | =X |
| Y | L |
| Z | =Z |

Table 11 (Keyboard Configuration System overlay of two-hand DVORAK letters) shows that case 61 precisely matches the dimensions of letters in the two-hand DVORAK layout with seven letters on the top row, 10 letters on the center row, nine letters on the bottom row and with letters on all three rows right justified into column 10. This configuration provides an easy retrofit to the two-hand Dvorak keyboards by the present system. The ascending alphabet is required in order to achieve right justification for the Keyboard Configuration System. The seven letters G, J, K, Q, V, X, Z with low frequency usage exactly fit on the top row without disturbing special symbols. The 10 letters B, C, D, F, L, M, P, U, W, Y with middle frequency usage exactly fit on the center row without disturbing special symbols. The nine letters A, E, H, I, N, O, R, S, T with high frequency usage exactly fit on the bottom row without disturbing special symbols.

TABLE 11

Keyboard Configuration System Overlay of
Two-Hand DVORAK Letters - Case 61

| COLUMN LEFT | BOTTOM ROW | CENTER ROW | TOP ROW |
|---|---|---|---|
| 01 |   | B |   |
| 02 | A | C |   |
| 03 | E | D |   |
| 04 | H | F | G |
| 05 | I | L | J |
| 06 | N | M | K |
| 07 | O | P | Q |
| 08 | R | U | V |
| 09 | S | W | X |
| 10 RIGHT | T | Y | Z |

Table 12 (translation of DVORAK letters) contains 26 letter-to-letter relationships. For example, the three right justified letters from top to bottom rows in the DVORAK layout are L, S, and Z. Letter L converts to Z, letter S converts to Y, letter Z converts to T. Therefore, the three right justified letters from top to bottom rows in the comparable Keyboard Configuration System layout are Z, Y, T. There were no letters that remained the same as before, and so there was no opportunity for unchanging letters to be flagged in Table 12 by equal signs.

TABLE 12

Case 61
Translation of DVORAK Letters

| TWO-HAND DVORAK | KEYBOARD CONFIGURATION SYSTEM- Case 61 |
|---|---|
| A | B |
| B | N |
| C | V |
| D | M |
| E | D |
| F | K |
| G | Q |
| H | P |
| I | L |
| J | E |
| K | H |
| L | Z |
| M | O |
| N | W |
| O | C |
| P | G |
| Q | A |
| R | X |
| S | Y |
| T | U |
| U | F |
| V | S |
| W | R |
| X | I |
| Y | J |
| Z | T |

Table 13 (one example of a left-justified maximum nine letter row solution such as those shown in FIGS. 9–16) illustrates eight letters on the top row, nine letters on both center and bottom rows, and letters on all three rows left justified into column 01. No letters extend into column 10. The descending alphabet is required in order to achieve left justification for the Keyboard Configuration System and avoid any demerit-causing shifts. The eight letters with low frequency usage are located on the top row. The numerical equivalent values 26, 24, 23, 17, 11, 10, 07, 02 are converted respectively to letters Z, X, V, Q, K, J, G, B. The nine letters T, S, R, O, N, I, H, E, A with high frequency usage are located on the center row. The nine letters with middle frequency usage are located on the bottom row. The numerical equivalent values 25, 23, 21, 16, 13, 12, 06, 04, 03 are converted respectively to letters Y, W, U, P, M, L, F, D, C. In this illustration the high and middle frequency usage letters are not separated by the top row of low frequency usage letters.

TABLE 13

Case 53
One Example of Left Justified Maximum 9-Letter Row Solution

| COLUMN LEFT | BOTTOM ROW | CENTER ROW | TOP ROW |
|---|---|---|---|
| 01 | Y | T | Z |
| 02 | W | S | X |
| 03 | U | R | V |
| 04 | P | O | Q |
| 05 | M | N | K |
| 06 | L | I | J |
| 07 | F | H | G |
| 08 | D | E | B |
| 09 | C | A | |
| RIGHT | | | |

Table 14 (one example of a right-justified maximum nine letter row solution such as those shown in FIGS. 9–16) illustrates nine letters on both top and center rows, eight letters on the bottom row, and letters on all three rows right justified into column 10. No letters extend into column 01. The ascending alphabet is required in order to achieve right justification for the Keyboard Configuration System. The nine letters A, E, H, I, N, O, R, S, T with high frequency usage are located on the top row. The nine letters C, D, F, L, M, P, U, W, Y with middle frequency usage are located on the center row. The eight letters B, G, J, K, Q, V, X, Z with low frequency usage are located on the bottom row. In this illustration, the high and middle frequency usage letters are not separated by the bottom row of low frequency usage letters.

TABLE 14

Case 53
One Example of Right Justified Maximum 9-Letter Row Solution

| COLUMN LEFT | BOTTOM ROW | CENTER ROW | TOP ROW |
|---|---|---|---|
| 02 | | C | A |
| 03 | B | D | E |
| 04 | G | F | H |
| 05 | J | L | I |
| 06 | K | M | N |
| 07 | Q | P | O |
| 08 | V | U | R |
| 09 | X | W | S |
| 10 | Z | Y | T |
| RIGHT | | | |

Numerical equivalent values have been converted to letters in the Keyboard Configuration System results that are presented in Table 9, Table 11, Table 13 and Table 14. In these four tables, the letters are listed vertically with a "left" notation at the head of the three lists and with a "right" notation at the foot of the three lists. Consequently, all letters in the lists are turned 90 degrees counterclockwise from their intended orientation in a real keyboard. This problem is resolved in a series of 16 figures, FIGS. 1–16. Letters are distributed horizontally across the top, center and bottom rows. For each row in these 16 figures, the number of columns is cited, and the high, middle, or low frequency is cited with the corresponding percent usage. Each of these 16 figures cites the descending or ascending alphabetical sequence, which respectively determines the left or right justification of the layout. All 16 of these figures have high and middle frequency usage rows that are not separated by the low frequency usage row. Eight configurations are not shown (but are easily determined) that have the high and middle frequency usage rows separable. The first group of eight figures has a 10-column maximum. A second group of eight figures has a 9-column maximum. In addition, there is a third group of eight defined configurations for which no illustrated figures are presented here.

FIG. 1, for configuration I, shows a 10-column maximum, descending alphabet, and middle over high over low frequency usage sets. This configuration has dimensions that overlay all letters in a QWERTY layout without disturbing special symbols, such as punctuation marks. The bolded squares may be used as "home" keys for touch-typing and the like. FIG. 2, for configuration II, shows a 10-column maximum, ascending alphabet, and low over middle over high frequency usage sets. This configuration has dimensions that overlay all letters in a two-hand DVORAK layout without disturbing special symbols. FIG. 3, for configuration III, shows a 10-column maximum, descending alphabet, and low over middle over high frequency usage sets. FIG. 4, for configuration IV, shows a 10-column maximum, ascending alphabet, and middle over high over low frequency usage sets.

Figure 5:
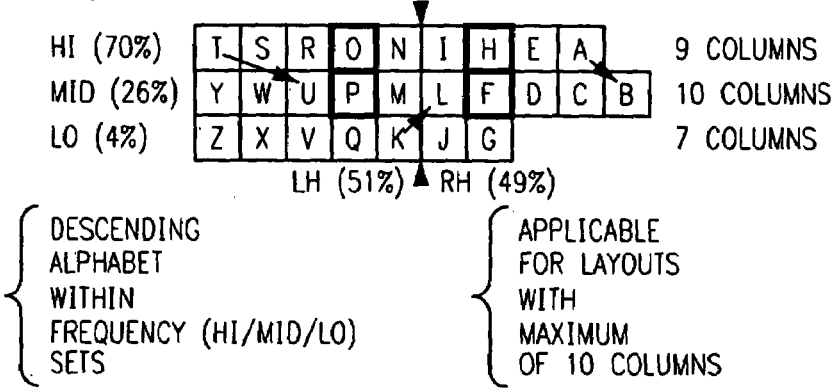
Figure 6:
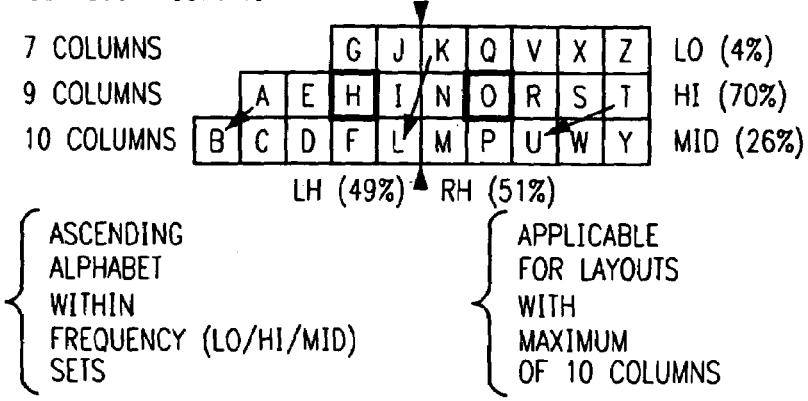
Figure 10:
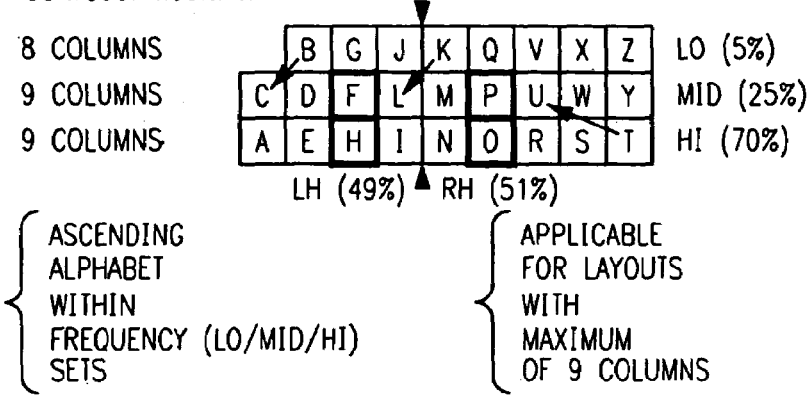
Figure 11:
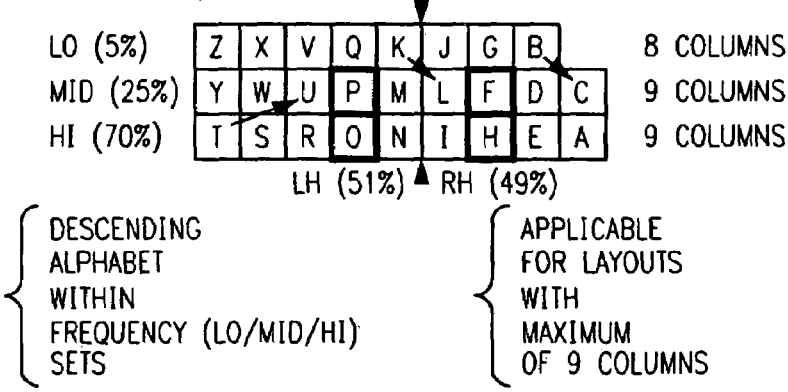
Figure 12:
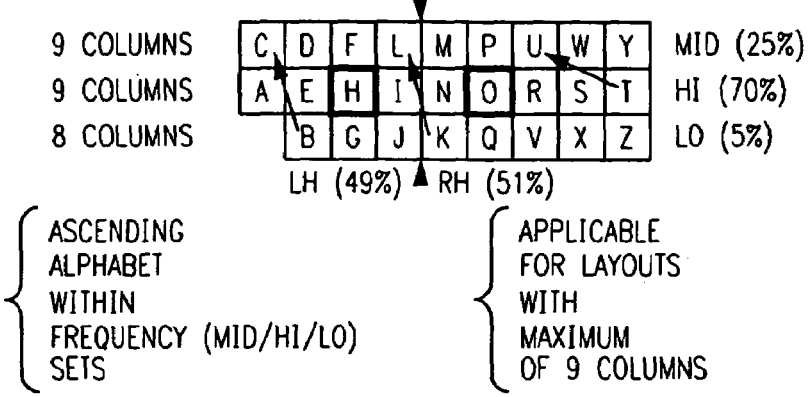

FIG. 5, for configuration V, shows a 10-column maximum, descending alphabet, and high over middle over low frequency usage sets. FIG. 6, for configuration VI shows a 10-column maximum, ascending alphabet, and low over high over middle frequency usage sets. FIG. 7, for configuration VII, shows a 10-column maximum, descending alphabet, and low over high over middle frequency usage sets. FIG. 8, for configuration VIII, shows a 10-column maximum, ascending alphabet, and high over middle over low frequency usage sets. FIG. 9, for configuration IX, shows a 9-column maximum, descending alphabet, and middle over high over low frequency usage sets. FIG. 10, for configuration X, shows a 9-column maximum, ascending alphabet, and low over middle over high frequency usage sets. FIG. 11, for configuration XI, shows a 9-column maximum, descending alphabet, and low over middle over high frequency usage sets. FIG. 12, for configuration XII, shows a 9-column maximum, ascending alphabet, and middle over high over low frequency usage sets.

FIG. 13, for configuration XIII, shows a 9-column maximum, descending alphabet, and high over middle over low frequency usage sets. FIG. 14, for configuration XIV, shows a 9-column maximum, ascending alphabet, and low over high over middle frequency usage sets. FIG. 15, for configuration XV, shows a 9-column maximum, descending alphabet, and low over high over middle frequency usage sets. FIG. 16, for configuration XVI, shows a 9-column maximum, ascending alphabet, and high over middle over low frequency usage sets.

Configurations XVII–XXIV are not shown in the Figures, but are readily obtained. Configuration XVII, has a 10-column maximum, descending alphabet, and middle over low over high frequency usage sets. Configuration XVIII, has a 10-column maximum, ascending alphabet, and middle over low over high frequency usage sets. Configuration XIX, has a 10-column maximum, descending alphabet, and high over low over middle frequency usage sets. Configuration XX has a 10-column maximum, ascending alphabet, and high over low over middle frequency usage sets.

Configuration XXI has a 9-column maximum, descending alphabet, and middle over low over high frequency usage sets. Configuration XXII has a 9-column maximum, ascending alphabet, and middle over low over high frequency usage sets. Configuration XXIII has a 9-column maximum, descending alphabet, and high over low over middle frequency usage sets. Configuration XXIV has a 9-column maximum, ascending alphabet, and high over low over middle frequency usage sets.

The application of the Keyboard Configuration System to the 26 letters of the English language alphabet provides results that are both interesting and useful. The three row parameter is used in conjunction with the 10 column maximum parameter and the six column minimum parameter, as indicated above. The set lengths of 6, 7, 8, 9, and 10 columns are thereby defined. The 15 resulting strings of ranking value ranges (key sets) are subsequently defined, as are the four patterns of two, five, eight and nine shifts. Consequently all 96 initial case numbers are specified in the Appendix Index document. The Appendix Index, and all the information contained in it, is rigid, or static, and therefore reusable for second and subsequent applications to the 26 letters of the English language alphabet. Case number values are incremented herein progressively by 100 for each additional application or variation, as indicated below.

Case numbers 101 through 496 cover four additional applications, which correspond to different letter-usage frequencies that have been determined for the English alphabet and language.

The 96 case numbers 101 through 196 for the second application use data from the book "The Code Breakers" by David Kahn. The letter frequency order from this source in descending sequence E, T, A, O, N, I, R, S, H, D, L, U, C, M, P, F, Y, W, G, B, V, J, K, Q, X, Z. This is a different frequency sequence than the ones used for Cases 1–96 arising from Gaines/Meaker.

The 96 case numbers 201 through 296 for the third application use data from the book "Secret And Urgent: The Story Of Codes And Ciphers" by Fletcher Pratt. The letter frequency order from this source in descending sequence: E, T, A, O, N, R, I, S, H, D, L, F, C, M, U, G, Y, P, W, B, V, K, X, J, Q, Z.

The 96 case numbers 301 through 396 for the fourth application use data from the book "Cryptography" by Laurence D. Smith. The letter frequency order from this source in descending sequence: E, T, O, A, N, I, R, S, H, D, L, C, W, U, M, F, Y, G, P, B, V, K, X, Q, J, Z.

The 96 case numbers 401 through 496 for the fifth application use data from the book "Elementary Cryptography and Cryptanalysis" by Donald Milliken. The letter frequency order from this source in descending sequence E, T, N, R, O, I, A, S, D, H, L, C, F, U, P, M, Y, G, W, V, B, X, K, Q, J, Z.

Identical outstanding results are achieved by processing the last (96th) case number in the second, third and fourth applications. Case numbers 196, 296 and 396 have set lengths for 10, 10 and 6 for the respective high, middle and low frequency letter groups. In addition, a maximum shift 5 of 5 is in effect for the low frequency letter group. Improved keyboard configurations are revealed despite differences in source data, namely, the letter frequency order for each application.

The first 10 letters of the frequency order for the second application are: E, T, A, O, N, I, R, S, H, D. Their respective numerical equivalent values are: 05, 20, 01, 15, 14, 09, 18, 19, 08, 04. The first 10 letters of the frequency order for the third application are: E, T, A, O, N, R, I, S, H, D. Their respective numerical equivalent values are: 05, 20, 01, 15, 14, 18, 09, 19, 08, 04. The first ten letters of the frequency order for the fourth application are: E, T, O, A, N, I, R, S, H, D. Their respective equivalent values are: 05, 20, 15, 01, 14, 09, 18, 19, 08, 04. When the above three sets are sorted separately, an identical set results: 01, 04, 05, 08, 09, 14, 15, 18, 19, 20. This sorted set of values is entered into the high frequency list for case numbers 196, 296 and 396.

The second 10 letters of the frequency order for the second application are: L, U, C, M, P, F, Y, W, G, B. Their respective numerical equivalent values are: 12, 21, 03, 13, 16, 06, 25, 23, 07, 02. The second 10 letters of the frequency order for the third application are: L, F C, M, U, G, Y, P, W, B. Their respective numerical equivalent values are: 12, 06, 03, 13, 21, 07, 25, 16, 23, 02. The second 10 letters of the frequency order for the fourth application are: L, C, W, U, M, F, Y, G, P, B. Their respective numerical equivalent values are: 12, 03, 23, 21, 13, 06, 25, 07, 16, 02. When the above three sets are sorted separately, an identical set results: 02, 03, 06, 07, 12, 13, 16, 21, 23, 25. This sorted set of values is entered into the middle frequency list for case numbers 196, 296 and 396.

The last six letters of the frequency order for the second application are: V, J, K, Q, X, Z. Their respective numerical equivalent values are: 22, 10, 11, 17, 24, 26. The last six letters of the frequency order for the third application are: V, K, X, J, Q, Z. Their respective numerical equivalent values are: 22, 11, 24, 10, 17, 26. The last six letters of the frequency order for the fourth application are: V, K, X, Q, J, Z. Their respective numerical equivalent values are: 22, 11, 24, 17, 10, 26. When the above three sets are sorted separately, an identical set results: 10, 11, 17, 22, 24, 26. This sorted set of values is entered into the low frequency list for case numbers 196, 296 and 396. Shift 5 of 5 is in force for these case numbers, and so the six values locate from positions 05 through 10.

Case numbers 196, 296 and 396 are evaluated separately for demerits but, of course, the results are identical. The excess forward tallies are all 0. There are only two events that accumulate backward demerits. The movement between numerical equivalents 11 (letter K) and 12 (letter L) scores one backward demerit. The movement between numerical equivalents 20 (letter T) and 21 (letter U) scores two backward demerits. The backward tallies are all 3. Each total demerit tally is the sum of 0 excess forward demerits plus three backward demerits equals three demerits.

The second, third and fourth applications independently find the solution that is depicted in Table 15 (numerical equivalent solution normalized for comparison). The high, middle and low frequency lists from case numbers 196, 296 and 396 are inverted during their transfer to Table 15. Turning these three lists upside down facilitates the inevitable comparison to Table 6, which portrays the dual solutions developed earlier by the first application of the Keyboard Configuration System. At a minimum, there are 21 letter locations that are the same in Tables 6 and 15. If all 10 columns in the middle ranking row of Table 6 are candidates for comparison, then numerical equivalent 02 (letter B) is pre-moved within Table 6. On that basis, there are 22 letter locations that are the same in Tables 6 and 15.

TABLE 15

Case 196
Numerical Equivalent Solution Normalized for Comparison

| COLUMN | HIGH RANKING ROW | MIDDLE RANKING ROW | LOW RANKING ROW |
|---|---|---|---|
| 01 | 20 | 25 | 26 |
| 02 | 19 | 23 | 24 |
| 03 | 18 | 21 | 22 |
| 04 | 15 | 16 | 17 |
| 05 | 14 | 13 | 11 |
| 06 | 09 | 12 | 10 |
| 07 | 08 | 07 | |
| 08 | 05 | 06 | |
| 09 | 04 | 03 | |
| 10 | 01 | 02 | |

An analysis of the relocation of four remaining letters follows in sequence. Numerical equivalent 01 (letter A) remains in the high ranking row, but moves from column 09 in Table 6 to column 10 in Table 15. Numerical equivalent 04 (letter D) in column 08 of the middle ranking row in Table 6 moves to column 09 of the high ranking row in Table 15. Numerical equivalent 06 (letter F) remains in the middle ranking row, but moves from column 07 in Table 6 to column 08 in Table 15. Numerical equivalent 07 (letter G) in column 07 of the low ranking row in Table 6 moves to column 07 of the middle ranking row in Table 15.

One of the solutions in Table 6 with set lengths 10, 9 and 7 columns exactly accommodates overlays of both the QWERTY and the two-hand DVORAK layouts. The solution in Table 15 with set lengths 10, 10 and 6 columns can closely approximate overlays of both the QWERTY and the two-hand DVORAK layouts, but a minimum of one special symbol key is necessarily impacted. It is interesting that the same special symbol key is affected in both layouts. The nine letters on the center row of the QWERTY layout are adjacent to the key with lower case semicolon and upper case colon. The nine letters on the bottom row of the two-hand DVORAK layout are also adjacent to the key with lower case semicolon and upper case colon. The problems arise when the solution is Table 15 is implemented, and 10 letters are imposed upon the center row of the QWERTY layout and the bottom row of the two-hand DVORAK layout. The focus here on identical special symbol keys is a prelude to a uniform outcome.

Table 16 (12 configurations defined by one solution) describes the two components that differentiate the configurations. The 10-letter versus 9-letter maximum shown in Table 7 is absent from Table 16, because the latter is based on a solution with twin 10 letter rows. Eight of the configurations have low frequency sets on top or bottom rows. Four of the configurations have low frequency sets on the center row.

TABLE 16

Case 196
12 Configurations Defined by 1 Solution

| NUMBER OF CONFIGURATIONS | OPTIONS |
|---|---|
| 6 | High/Middle/Low Frequency Sets Versus Top/Center/Bottom Rows |

TABLE 16-continued

Case 196
12 Configurations Defined by 1 Solution

| NUMBER OF CONFIGURATIONS | OPTIONS |
|---|---|
| 2 | Left Side Column Justification Versus Right Side Column Justification |
| 12 | Multiplication Product |

Table 17 (competitive activity metrics) shows improved performance figures for the Keyboard Configuration System (cases 196, 296 and 396) when compared to prior results of the first application reported in Table 8 (for cases 61 and 53). The 0 excess forward demerits tally and the lower three backward demerits tally are reported. Source data from the first, second, third and fifth applications was used to calculate percentage utilization for the high, middle and low frequency rows. Percentage data was not available from the fourth application. The 10 letters A, D, E, H, I, N, O, R, S, and T were used in four applications to calculate high frequency row percentage utilization. The respective figures for the first, second, third and fifth applications are 73.67%, 74%, 75.142% and 74.1% with a higher average 74.2% reported. The 10 letters B, C, F, G, L, M, P, U, W and Y were used in four applications to calculate middle frequency row percentage utilization. The respective figures for the first, second, third and fifth applications are 24.29%, 23%, 23.003% and 23.2% with a lower average 23.4% reported. The six letters J, K, Q, V, X and Z were used in four applications to calculate low frequency row percentage utilization. The respective figures for the first, second, third and fifth applications are 2.04%, 3%, 1.836% and 2.7% with a lower average 2.4% reported. These three average percentages mean that roughly three out of four letter keystrokes are on the high frequency row, roughly one out of four letter key strokes are on the middle frequency row and roughly one out of 40 letter key strokes are on the low frequency row. Percentage utilization for the 11-letter hand and the 15-letter hand remained constant, because the relocated letters A, B, D, F and G are all on the 11-letter hand side.

TABLE 17

Case 196
Competitive Activity Metrics

| KEYBOARD CONFIGURATION SYSTEM | ACTIVITY |
|---|---|
| 0 | Excess Forward Demerits |
| 3 | Backward Demerits |
| 74.2% Av. | High Frequency Row |
| 23.4% Av. | Middle Frequency Row |
| 2.4% Av. | Low Frequency Row |
| 49% (R & L) | 11-Letter Hand |
| 51% (L & R) | 15-Letter Hand |

Table 18, one Keyboard Configuration System overlay of QWERTY letters and semicolon/colon key (corresponding to cases 196, 296 and 396 associated with Table 15), has one more letter on the center row and one less letter on the bottom row than the QWERTY layout. The high frequency letter A on the center row has displaced the semicolon/colon key in column 10. The minimum 1-step relocation places the semicolon/colon key on the bottom row in column 07 next to low frequency letter J. For example, a 3-step relocation places the semicolon/colon key on the bottom row in column 09, displacing the period/greater-than key. The next step places the period/greater-than key on the bottom row in column 08, displacing the comma/less-than key. The last step places the comma/less-than key on the bottom row in column 07 next to low frequency letter J.

TABLE 18

Case 196
One Keyboard Configuration System Overlay of
QWERTY Letters and Semicolon Colon Key

| COLUMN LEFT | BOTTOM ROW | CENTER ROW | TOP ROW |
|---|---|---|---|
| 01 | Z | T | Y |
| 02 | X | S | W |
| 03 | V | R | U |
| 04 | Q | O | P |
| 05 | K | N | M |
| 06 | J | I | L |
| 07 | Two symbols | H | G |
| 08 |  | E | F |
| 09 |  | D | C |
| 10 RIGHT |  | A | B |

Table 19 (one translation of QWERTY letters and semicolon/colon symbols) lists corresponding values between the QWERTY layout and the Keyboard Configuration System overlay of Table 18. The four letters S, W, X, Z remain in the same locations, and are highlighted in the listing with equal signs. The semicolon/colon key is replaced by the letter A. The letter M is replaced by the semicolon/colon key or a key with a different pair of special symbols, depending upon the number of steps in the chain relocation for special symbol keys.

TABLE 19

Case 196
One Translation of QWERTY Letters and
Semicolon Colon Symbols

| QWERTY | KEYBOARD CONFIGURATION SYSTEM - Case 196 |
|---|---|
| A | T |
| B | K |
| C | V |
| D | R |
| E | U |
| F | O |
| G | N |
| H | I |
| I | F |
| J | H |
| K | E |
| L | D |
| M | Two Symbols |
| N | J |
| O | C |
| P | B |
| Q | Y |
| R | P |
| S | =S |
| T | M |
| U | G |
| V | Q |
| W | =W |
| X | =X |
| Y | L |

TABLE 19-continued

Case 196
One Translation of QWERTY Letters and
Semicolon Colon Symbols

| QWERTY | KEYBOARD CONFIGURATION SYSTEM - Case 196 |
|---|---|
| Z | =Z |
| Colon/Semicolon | A |

Table 20 shows the Keyboard Configuration System overlay of two-hand DVORAK letters and semicolon/colon key per Table 15 and has one more letter on the bottom row and one less letter on the top row than the two-hand DVORAK layout. The middle frequency letter B on the bottom row has displaced the semicolon/colon key in column 01. The minimum 1-step relocation places the semicolon/colon key on the top row in column 04 next to low frequency letter J. For example, a 3-step relocation places the semicolon/colon key on the top row in column 02, displacing the comma/less than key. The next step places the comma/less than key on the top row in column 03, displacing the period/greater than key. The last step places the period/greater than key on the top row in column 04 next to low frequency letter J.

TABLE 20

Case 196
One Keyboard Configuration System Overlay of
Two-Hand DVORAK Letters and Semicolon Colon Key

| COLUMN LEFT | BOTTOM ROW | CENTER ROW | TOP ROW |
|---|---|---|---|
| 01 | B | A |  |
| 02 | C | D |  |
| 03 | F | E |  |
| 04 | G | H | Two symbols |
| 05 | L | I | J |
| 06 | M | N | K |
| 07 | P | O | Q |
| 08 | U | R | V |
| 09 | W | S | X |
| 10 RIGHT | Y | T | Z |

Table 21 lists corresponding values between the two-hand DVORAK layout and the Keyboard Configuration System overlay of Table 20. The three letters A, E, I remain in the same locations, and are highlighted in the listing with equal signs. The semicolon/colon key is replaced by the letter B. The letter P is replaced by the semicolon/colon key or a key with a different pair of special symbols, depending upon the number of steps in the chain of relocation for special symbol keys.

TABLE 21

Case 196
One Translation of Two-Hand DVORAK
Letters and Semicolon Colon Symbols

| TWO-HAND DVORAK | KEYBOARD CONFIGURATION SYSTEM |
|---|---|
| A | =A |
| B | M |
| C | V |

TABLE 21-continued

Case 196
One Translation of Two-Hand DVORAK
Letters and Semicolon Colon Symbols

| TWO-HAND DVORAK | KEYBOARD CONFIGURATION SYSTEM |
|---|---|
| D | N |
| E | =E |
| F | K |
| G | Q |
| H | O |
| I | =I |
| J | F |
| K | G |
| L | Z |
| M | P |
| N | S |
| O | D |
| P | Two Symbols |
| Q | C |
| R | X |
| S | T |
| T | R |
| U | H |
| V | W |
| W | U |
| X | L |
| Y | J |
| Z | Y |
| Colon/Semicolon | B |

Table 22 shows the Keyboard Configuration System overlay of QWERTY letters and semicolon/colon key along the lines of Table 18 and has one more letter on the center row and one less letter on the bottom row than the QWERTY layout. The middle frequency letter B on the center row has displaced the semicolon/colon key in column 10. The minimum 1-step relocation places the semicolon/colon key on the bottom row in column 07 next to low frequency letter J. For example, a 3-step relocation places the semicolon/colon key on the bottom row in column 09, displacing the period/greater than key. The next step places the period/greater than key on the bottom row in column 08, displacing the comma/less than key. The last step places the comma/less than key on the bottom row in column 07 next to low frequency letter J.

TABLE 22

Case 196
Another Keyboard Configuration System Overlay
of QWERTY Letters and Semicolon Colon Key

| COLUMN LEFT | BOTTOM ROW | CENTER ROW | TOP ROW |
|---|---|---|---|
| 01 | Z | Y | T |
| 02 | X | W | S |
| 03 | V | U | R |
| 04 | Q | P | O |
| 05 | K | M | N |
| 06 | J | L | I |
| 07 | Two Symbols | G | H |
| 08 |  | F | E |
| 09 |  | C | D |
| 10 RIGHT |  | B | A |

Table 23 lists corresponding values between the QWERTY layout and the Keyboard Configuration System overlay of Table 22. The two letters X, Z remain in the same locations, and are highlighted in the listing with equal signs. The semicolon/colon key is replaced by the letter B. The letter M is replaced by the semicolon/colon key or a key with a different pair of special symbols, depending upon the number of steps in the chain of relocation for special symbol keys.

TABLE 23

Case 196
Another Translation of QWERTY Letters
and Semicolon Colon Symbols

| QWERTY | KEYBOARD CONFIGURATION SYSTEM - Case 196 |
|---|---|
| A | Y |
| B | K |
| C | V |
| D | U |
| E | R |
| F | P |
| G | M |
| H | L |
| I | E |
| J | G |
| K | F |
| L | C |
| M | Two symbols |
| N | J |
| O | D |
| P | A |
| Q | T |
| R | O |
| S | W |
| T | N |
| U | H |
| V | Q |
| W | S |
| X | =X |
| Y | I |
| Z | =Z |
| Colon, Semicolon | B |

Table 24 shows the Keyboard Configuration System overlay of two-hand DVORAK letters and semicolon/colon key along the lines of Table 20 and has one more letter on the bottom row and one less letter on the top row than the two-hand DVORAK layout. The high frequency letter A on the bottom row has displaced the semicolon/colon key in column 01. The minimum 1-step relocation places the semicolon/colon key on the top row in column 04 next to low frequency letter J. For example, a 3-step relocation places the semicolon/colon key on the top row in column 02, displacing the comma/less than key. The next step places the comma/less than key on the top row in column 03, displacing the period/greater than key. The last step places the period/greater than key on the top row in column 04 next to low frequency letter J.

TABLE 24

Case 196
Another Keyboard Configuration System Overlay of
Two-Hand DVORAK Letters and Semicolon Colon Key

| COLUMN LEFT | BOTTOM ROW | CENTER ROW | TOP ROW |
|---|---|---|---|
| 01 | A | B |  |
| 02 | D | C |  |
| 03 | E | F |  |
| 04 | H | G | Two Symbols |
| 05 | I | L | J |
| 06 | N | M | K |

TABLE 24-continued

Case 196
Another Keyboard Configuration System Overlay of
Two-Hand DVORAK Letters and Semicolon Colon Key

| COLUMN LEFT | BOTTOM ROW | CENTER ROW | TOP ROW |
|---|---|---|---|
| 07 | O | P | Q |
| 08 | R | U | V |
| 09 | S | W | X |
| 10 RIGHT | T | Y | Z |

Table 25 lists corresponding values between the two-hand DVORAK layout and the Keyboard Configuration System overlay of Table 24. None of the 26 letters remain in the same locations, and therefore none are highlighted in the listing with equal signs. The semicolon/colon key is replaced by the letter A. The letter P is replaced by the semicolon/colon key or a key with a different pair of special symbols, depending upon the number of steps in the chain of relocation for special symbol keys.

TABLE 25

Case 196
Another Translation of
Two-Hand DVORAK Letters and Semicolon Colon Symbols

| TWO-HAND DVORAK | KEYBOARD CONFIGURATION SYSTEM - Case 196 |
|---|---|
| A | B |
| B | N |
| C | V |
| D | M |
| E | F |
| F | K |
| G | Q |
| H | P |
| I | L |
| J | E |
| K | H |
| L | Z |
| M | O |
| N | W |
| O | C |
| P | Two Symbols |
| Q | D |
| R | X |
| S | Y |
| T | U |
| U | G |
| V | S |
| W | R |
| X | I |
| Y | J |
| Z | T |
| Colon/Semicolon | A |

Eight configurations for cases 196, 296, and 396 with the twin 10-column rows have the middle frequency letters located either directly above or directly below the high frequency letters. These are shown in FIGS. 17–24. FIG. 17, for configuration XXV, shows a 10-column maximum, descending alphabet and middle, high and low frequency letters located on top, center and bottom rows, respectively. This configuration overlays the letters and the semicolon/colon key of the QWERTY layout.

FIG. 18, for configuration XXVI, shows a 10-column maximum, ascending alphabet, and low, high, and middle frequency letters located on top, center, and bottom rows, respectively. This configuration overlays the letters and the semicolon/colon key of the two-hand DVORAK layout. FIG. 19, for configuration XXVII, shows a 10-column maximum, descending alphabet and high, middle and low frequency letters located on top, center and bottom rows, respectively. This configuration overlays the letters and the semicolon/colon key of the QWERTY layout.

FIG. 20, for configuration XXVIII, shows a 10-column maximum, ascending alphabet and low, middle and high frequency letters located on top, center and bottom rows, respectively. This configuration overlays the letters and the semicolon/colon key of the two-hand DVORAK layout. FIG. 21, for configuration XXIX, shows a 10-column maximum, descending alphabet and low, middle and high frequency letters located on top, center and bottom rows, respectively. FIG. 22, for configuration XXX, shows a 10-column maximum, ascending alphabet and high, middle and low frequency letters located on top, center and bottom rows, respectively. FIG. 23, for configuration XXXI shows a 10-column maximum, descending alphabet and low, high and middle frequency letters located on top, center and bottom rows, respectively. FIG. 24, for configuration XXXII, shows a 10-column maximum, ascending alphabet and middle, high and low frequency letters located on top, center and bottom rows, respectively.

Four configurations with the twin 10-column rows have the low frequency letters separating the middle frequency letters from the high frequency letters. Configuration XXXIII has a 10-column maximum, descending alphabet and middle, low and high frequency letters located on top, center and bottom rows, respectively. Configuration XXXIV has a 10-column maximum, ascending alphabet and high, low and middle frequency letters located on top, center and bottom rows, respectively. Configuration XXXV has a 10-column maximum, descending alphabet and high, low and middle frequency letters located on top, center and bottom rows, respectively. Configuration XXXVI has a 10-column maximum, and ascending alphabet and middle, low and high frequency letters located on top, center and bottom rows, respectively.

One additional solution of interest is present in case 317 in the fourth application of the Keyboard Configuration System. One backward demerit is measured between numerical equivalent values 02 and 03 (letters B and C). One backward demerit is measured between numerical equivalent values 13 and 14 (letters M and N). The total of backward demerits is 2. There are no excess forward demerits. The total of all demerits is therefore also 2. This is the lowest demerit total value measured to date and may be a preferred embodiment. The shift of case 317 is neither at the minimum (1 of 8) nor at the maximum (8 of 8). The shift (4 of 8) for this solution positioned the high frequency set in a location that is indented from both the initial position (01) and the other extreme position (10). This somewhat centered location contributed to an equal division of 13 letters per hand.

Table 26 (Final Numerical Equivalent Solution Normalized for Comparison) portrays case 317 by showing an embodiment where only two of three string sets are justified into column 01. The high frequency set is indented into column 03. Numerical equivalent values 20 and 21 (letters T and U) are in the same column 03. This alignment eliminates the two backward demerits measured between letters T and U in all prior solutions. The low frequency set with nine entries is larger than the low frequency sets in all prior solutions. The newest numerical equivalent 16 (letter P) in the low frequency set together with numerical equivalents 02 and 07 (letters B and G) vacate three positions from the middle frequency set of a prior solution. These three vacancies are filled by numerical equivalents 04, 08, and 19 (letters D, H, and S), which in turn vacate three positions from the high frequency set of a prior solution. The current high frequency set consists of just seven letters, which extend across columns 03 through 09. After the new middle frequency set is rearranged, the relocated numerical equivalents 04, 08 and 19 (letters D, H and S) are respectively positioned in columns 09, 07 and 04. These three columns are aligned respectively with high frequency numerical equivalents 01, 09 and 18 (letters A, I and R). It is a benefit of this solution that formerly high frequency letters D, H and S are somewhat centered columnwise albeit on the middle frequency row. Location of letters D, H and S is compatible with the centering of seven high frequency letters by means of the shifting process.

TABLE 26

FINAL NUMERICAL EQUIVALENT SOLUTION
NORMALIZED FOR COMPARISON
CASE 317

| COLUMN | HIGH RANKING ROW | MIDDLE RANKING ROW | LOW RANKING ROW |
|---|---|---|---|
| 01 |    | 25 | 26 |
| 02 |    | 23 | 24 |
| 03 | 20 | 21 | 22 |
| 04 | 18 | 19 | 17 |
| 05 | 15 | 13 | 16 |
| 06 | 14 | 12 | 11 |
| 07 | 09 | 08 | 10 |
| 08 | 05 | 06 | 07 |
| 09 | 01 | 04 | 02 |
| 10 |    | 03 |    |

Table 27 (Final Competitive Activity Metrics) displays quantities that describe the solution of case 317 from the fourth application of the Keyboard Configuration System. The column by column alphabetic progression is excellent with 0 excess forward demerits and merely two backward demerits. There are two backward events with the minimum of one demerit per event. Compared to 41 total demerits for the QWERTY layout and 59 total demerits for the two-hand DVORAK layout, the two total demerits for this Keyboard Configuration System solution represents at least a 95% reduction in the out of alphabetical sequence conditions of prior art. A reduction of 39 demerits is 95.1% of 41 QWERTY demerits. A reduction of 57 demerits is 96.6% of 59 two-hand DVORAK demerits.

TABLE 27

FINAL COMPETITIVE ACTIVITY METRICS
CASE 317

| KEYBOARD CONFIGURATION SYSTEM | ACTIVITY |
|---|---|
| 0 | Excess Forward Demerits |
| 2 | Backward Demerits |
| 59.0% Av. | High Frequency Row |
| 33.3% Av. | Middle Frequency Row |
| 7.7% Av. | Low Frequency Row |
| 56.6% Av. (R&L) | One 13-Letter Hand (Letter "A" Side) |
| 43.4% Av. (L&R) | Other 13-Letter Hand (Letter "Z" Side) |

The last five of the listed activities in Table 27 are measured by percentages. However no source percentages by letter are available from the fourth application of the Keyboard Configuration System. Consequently, the average percentage values displayed are developed using source percentages by letter from the first, second, third and fifth applications. The seven letters on the high frequency row are A, E, I, N, O, R, T. Their subtotal percentages from the first, second, third and fifth applications respectively are 58.29%, 58%, 59.994% and 59.9% with a displayed average 59.0%. The 10 letters on the middle frequency row are C, D, F, H, L, M, S, U, W, Y. Their subtotal from the first, second, third and fifth applications respectively are 34.15%, 34%, 32.735% and 32.2% with a displayed average 33.3%. The nine letters on the low frequency row are B, G, J, K, P, Q, V, X, Z. Their subtotal percentages from the first, second, third and fifth applications respectively are 7.56%, 8%, 7.252% and 7.9% with a displayed average 7.7%. The 13 letters on one hand (letter "A" side) are A consecutively through L inclusive plus N. Their subtotal percentages from the first, second, third and fifth applications respectively are 56.88%, 57%, 56.803% and 55.7% with a displayed average 56.6%. The 13 letters on the other hand (letter "Z" side) are M plus O consecutively through Z inclusive. Their subtotal percentages from the first, second, third and fifth applications respectively are 43.12%, 43%, 43.178% and 44.3% with a displayed average 43.4%.

Table 28 (Final Keyboard Configuration System Letters Layout) is but one embodiment of the case 317 solution. There are 12 possible justified configurations of this solution. The options contributing to these configurations are identical to those previously cited in Table 16 (12 configurations defined by one solution) and therefore are not restated here. Table 28 illustrates a left to right ascending alphabet sequence. The sets of letters justified right on both the center and bottom rows do overlay four special symbol keys of the QWERTY layout. These special keys were located in column 10 of the center row and in columns 08, 09 and 10 of the bottom row. Table 28 shows that keys are available for relocated special symbols in positions 01, 09 and 10 of the top row and in position 01 of the bottom row.

TABLE 28

FINAL KEYBOARD CONFIGURATION SYSTEM
LETTERS LAYOUT
CASE 317

| COLUMN LEFT | BOTTOM ROW | CENTER ROW | TOP ROW |
|---|---|---|---|
| 01 |   | C |   |
| 02 | B | D | A |
| 03 | G | F | E |
| 04 | J | H | I |
| 05 | K | L | N |
| 06 | P | M | O |
| 07 | Q | S | R |
| 08 | V | U | T |
| 09 | X | W |   |
| 10 | Z | Y |   |
| RIGHT |   |   |   |

Table 29 (Final Translation of QWERTY Letters and four Special Symbol Keys) lists the before and after condition of 30 keys for case 317. The letter E is the only key that is not relocated, and this situation is emphasized by an equal sign. There are 21 letters that convert to different letters. There are four special symbol keys that convert to letters. There are four letters that convert to special symbol keys. The choice of special symbol keys for the after condition is an elective action as follows. The comma/less than and period/greater than special symbol keys are treated as a side-by-side pair for relocation to the top row. The slash question special symbol key is also relocated to the top row, while the semicolon/colon special symbol key is relocated to the bottom row.

TABLE 29

FINAL TRANSLATION OF QWERTY
LETTERS AND 4 SPECIAL SYMBOL KEYS
CASE 317

| QWERTY | KEYBOARD CONFIGURATION SYSTEM |
|---|---|
| A | C |
| B | K |
| C | G |
| D | F |
| E | =E |
| F | H |
| G | L |
| H | M |
| I | T |
| J | S |
| K | U |
| L | W |
| M | Q |
| N | P |
| O | Comma Less |
| P | Period Greater |
| Q | Slash Question |
| R | I |
| S | D |
| T | N |
| U | R |
| V | J |
| W | A |
| X | B |
| Y | O |
| Z | Semicolon Colon |
| Comma Less | V |
| Period Greater | X |
| Slash Question | Z |
| Semicolon Colon | Y |

Table 30 shows a comparison table for the various different frequency ranking alphabets.

TABLE 30

SUMMARY ANALYSIS OF 480 (96 × 5) CASES
Crossindexing Competitive Case Numbers By Solution
And Source Of Letter Frequency Distribution

| | Author | | | | |
|---|---|---|---|---|---|
| Solution | Gaines | Kahn | Pratt | Smith | Milliken |
| 4 Demerits (10 column max.) | Case #061 | No Case | No Case | No Case | No Case |
| 4 Demerits (9 column max.) | Case #053 | Case #153 | No Case | No Case | No Case |
| 3 Demerits (10 column max.) | No Case | Case #196 | Case #296 | Case #396 | No Case |
| 2 Demerits (10 column max.) | No Case | No Case | No Case | Case #317 | No Case |

Figures are provided for eight configurations of the final layout arising from case 317 as FIGS. 25–32. In these figures the high frequency row is either adjacent the middle frequency row by being directly above or directly below the middle frequency row. FIG. 25 shows that configuration XXXVII has a 10-column maximum, ascending alphabet, within high, middle and low frequency sets, and 13 letters for each hand. FIG. 26 shows that configuration XXXVIII has a 10-column maximum, descending alphabet within high, middle and low frequency sets, and 13 letters for each hand. FIG. 27 shows that configuration XXXIX has a 10-column maximum, and ascending alphabet, within low, middle and high frequency sets, and 13 letters for each hand. FIG. 28 shows that configuration XL has a 10-column maximum, descending alphabet, within low, middle and high frequency sets, and 13 letters for each hand.

FIG. 29 shows that configuration XLI has a 10-column maximum, ascending alphabet within middle, high and low frequency sets, and 13 letters for each hand. FIG. 30 shows that configuration XLII has a 10-column maximum, descending alphabet, within middle, high and low frequency sets, and 13 letters for each hand. FIG. 31 shows that configuration XLIII has a 10-column maximum, ascending alphabet, within low, high and middle frequency sets, and 13 letters for each hand. FIG. 32 shows that configuration XLIV has a 10-column maximum, descending alphabet, within low, high and middle frequency sets, and 13 letters for each hand.

Figures are not provided for four configurations of the final layout. In these configurations the low frequency set of letters is always on the center row. Configuration XLV has a 10-column maximum, 13 letters for each hand, ascending alphabet within high, low and middle frequency sets. Configuration XLVI has a 10-column maximum, 13 letters for each hand, descending alphabet within high, low and middle frequency sets. Configuration XLVII has a 10-column maximum, 13 letters for each hand, ascending alphabet within middle, low and high frequency sets. Configuration XLVIII has a 10-column maximum, 13 letters for each hand, descending alphabet within middle, low and high frequency sets.

As set forth above, the Keyboard Configuration System provides reliable and predictable means by which efficient keyboards may be achieved for written languages having phonetic alphabets. Although the English language is used as an example, it is contemplated that the Keyboard Configuration System is as readily applicable to any other phonetic alphabet. A machine-implemented process may readily determine a preferred keyboard or sets of keyboards by implementing the present System. Languages other than those using phonetic alphabets may be susceptible to the present System with keyboards arising that are frequency-biased according to a standard or other linear progression akin to alphabetization.

An example of an additional variation of the present invention pertains to the centerline in Keyboard Configuration System FIGS. 1–32. The centerline is indicated by two arrows separating the left hand and right hand activity. In prior art FIGS. 33–34 the split between left hand and right hand would normally fall midway along the 10 keys of the bottom row. Keyboard Configuration System solutions with a maximum of 9 columns are most susceptible to a possible sideways realignment of the centerline.

Another example of an additional variation of the present invention pertains to those columns in Keyboard Configuration System FIGS. 1–32 that are filled with less than 3 letters. FIGS. 29–30 depict letters C, W, and Y on the top row. Letter C leads letter D, and letters W and Y follow letter U; If letters C, W, and Y are repositioned downward to the center row, then two different situations occur. Letters W and Y follow letter T, maintaining the appropriate ascending or descending sequence. However, letter C is adjacent to letter A, disrupting the appropriate ascending or descending sequence. This anomaly is due to the existing demerit-related backward progression from letter B to letter C. It should be noted that the vertical repositioning of letters within a column does not change (increase) the demerit tallies.

Additional developments in the Keyboard Configuration System have led to further consideration of other languages and keyboard applications, among other things, which use and apply the general principles and specific applications indicated above.

Three additional appendices are provided herewith setting forth additional useful embodiments of the present invention heretofore not known.

The Continuation Appendix contains numerical equivalent tables arising from an expansion of available key positions for each row with there being considered ten (10) key positions instead of nine (9). These new cases have been analyzed, resulting in the identification of 3 new competitive keyboard solutions. These cases are expanded into 36 new configurations. The most useful configurations are illustrated in 24 new figures, namely FIGS. 35–58.

The Abridged Supplemental Appendix contains only a sample of many numerical equivalent tables that were analyzed arising from additional probability distributions for English and several foreign languages. No new competitive keyboard solutions are identified.

The PDA Rotation Appendix contains alphabet letter tables that were analyzed regarding a thumb-based keyboard implementation, resulting in the identification of 1 new competitive keyboard solution. This case is expanded into 8 new configurations. All of these configurations are illustrated in 8 new figures, namely FIGS. 59–66.

The Continuation Appendix includes a Continuation Appendix Index and numerical equivalent tables. The Continuation Appendix expands the scope of the initial 480 (96×5) cases by an additional 120 (24×5) cases by increasing the degree of freedom in which rows can relatively be positioned.

The initial cases in the Appendix were constructed within the degrees of freedom available to a maximum set length. The maximum was usually 10 letters. However, the maximum was only 9 letters for strings of 8, 9, 9 or 9, 8, 9 or 9, 9, 8 letters. Consequently, the degree of freedom was only 2 (2×1×1) for these three strings. Therefore, only 2 shifts were available for evaluating displacements of rows of letters where the longest string only had 9 letters.

The expansion to a maximum 10-letter range for these cases, beyond the boundary of the prior maximum set length, increases the degree of freedom to 12 (3×2×2), resulting in 10 new shift configurations. Two of the 10 new shifts result in duplicate solutions (shifts 1 and 2), so only 8 additional shifts are cited (shift 3 through shift 10). The "Continuation Appendix Index" displays the new case numbers for each of the affected strings. A letter suffix (A through H) is applied to existing case numbers, in order to identify shifts (3 through 10).

The 120 additional cases are calculated from 8 shifts (from above) times 3 strings (rows) times 5 probability distributions (per authors). Actually, only 106 cases are included in the numerical equivalent tables portion of this appendix because cases 153A and 432A are the same as prior cases. The 24 additional cases per probability distribution are calculated from 8 shifts times 3 strings. A total of 120 cases per probability distribution is calculated from 96 prior cases plus the 24 additional cases. Each numerical equivalent table of this appendix has a line for case number, followed by constant nomenclature "of 120" on the same line. This is an upgrade from "of 96" associated with the initial 480 cases.

Cases are evaluated both for backward movement and for excess forward movement. Case numbers 051E, 332F and 451F are competitive with 4 demerits each. These three cases were cited only for backward movement.

Case 051E has a one column move between letters B and C, a one column move between letters K and L, and a two column move between letters T and U. These three backward moves are indicated by arrows in FIGS. 35 through 42.

Case 332F has a one column move between letters B and C, a one column move between letters M and N, and a two column move between letters T and U. These three backward moves are indicated by arrows in FIGS. 43 through 50.

Case 451F has a one column move between letters M and N, a one column move between letters P and Q, a one column move between letters T and U, and a one column move between letters U and V. These four backward moves are indicated by arrows in FIGS. 51 through 58.

The Gaines (Meaker) source provides frequency percentages that are used to develop subtotals for Case 051E. The high frequency row of the A-side has a 39.87% subtotal. The middle frequency row of the A-side has a 15.41% subtotal. The low frequency row of the A-side has a 3.85% subtotal. The high frequency row of the Z-side has a 30.15% subtotal. The middle frequency row of the Z-side has a 7.42% subtotal. The low frequency row of the Z-side has a 3.30% subtotal. The A-side grand total is 59.13%. The Z-side grand total is 40.87%. The high frequency grand total is 70.02%. The middle frequency grand total is 22.83%. The low frequency grand total is 7.15%. These five grand totals are rounded and displayed in FIGS. 35 through 42.

Case 332F is quite similar to Case 051E. Letter H moves from high frequency to middle frequency, all within the A-side. Letter M moves from A-side to Z-side, all within middle frequency. Letters P and Y are exchanged, respectively, from middle and low frequency, all within the Z-side. The Smith source provides no frequency percentages. The Gaines (Meaker) source is used to develop grand totals for Case 332F. The A-side grand total is 56.88%. The Z-side grand total is 43.12%. The high frequency grand total is 64.88%.

The middle frequency grand total is 27.56%. The low frequency grand total is 7.56%. These five grand totals are rounded and displayed in FIGS. 43 through 50. A sixth total also shows that 97% of usage falls within eight centered columns.

Case 451F is quite similar to Case 332F. Letter D moves from middle frequency to high frequency, all within the A-side. Letters P and W are exchanged, respectively, from low and middle frequency, all within the Z-side. The Milliken source provides frequency percentages, which had not been used directly, because no prior Milliken cases were competitive. The Gaines (Meaker) source is used to develop grand totals for Case 451F. The A-side grand total is also 56.88%. The Z-side grand total is also 43.12%. The high frequency grand total is 68.53%. The middle frequency grand total is 24.17%. The low frequency grand total is 7.30%. These five grand totals are rounded and displayed in FIGS. 51 through 58.

Figures are provided for eight configurations of the layout arising from Case 051E as FIGS. 35–42. In these figures, the high frequency row is either adjacent the middle frequency row by being directly above or directly below the middle frequency row. FIG. 35 shows that configuration IL has a 10-column range, ascending alphabet, within low, high and middle frequency sets, and 14 or 12 letters per hand. FIG. 36 shows that configuration L has a 10-column range, descending alphabet, within low, high and middle frequency sets, and 14 or 12 letters per hand. FIG. 37 shows that configuration LI has a 10-column range, ascending alphabet, within low, middle, and high frequency sets, and 14 or 12 letters per hand. FIG. 38 shows that configuration LII has a 10-column range, descending alphabet, within low, middle and high frequency sets; and 14 or 12 letters per hand.

FIG. 39 shows that configuration LIII has a 10-column range, ascending alphabet, within high, middle and low frequency sets, and 14 or 12 letters per hand. FIG. 40 shows that configuration LIV has a 10-column range, descending alphabet, within high, middle and low frequency sets, and 14 or 12 letters per hand. FIG. 41 shows that configuration LV has a 10-column range, ascending alphabet, within middle, high and low frequency sets, and 14 or 12 letters per hand. FIG. 42 shows that configuration LVI has a 10-column range, descending alphabet, within middle, high and low frequency sets, and 14 or 12 letters per hand.

Figures are not provided for four configurations of the layout arising from Case 051E. In these configurations, the low frequency set of letters is always on the center row. Configuration LVII has a 10-column range, ascending alphabet, within high, low and middle frequency sets, and 14 or 12 letters per hand. Configuration LVIII has a 10-column range, descending alphabet, within high, low and middle frequency sets, and 14 or 12 letters per hand. Configuration LIX has a 10-column range, ascending alphabet, within middle, low and high frequency sets, and 14 or 12 letters per hand. Configuration LX has a 10-column range, descending alphabet, within middle, low and high frequency sets, and 14 or 12 letters per hand.

Figure 44:
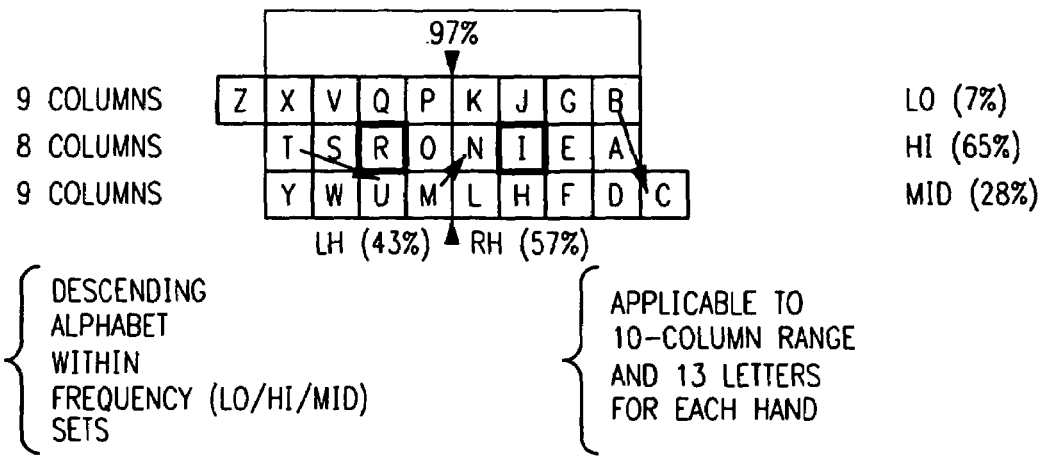
Figure 45:
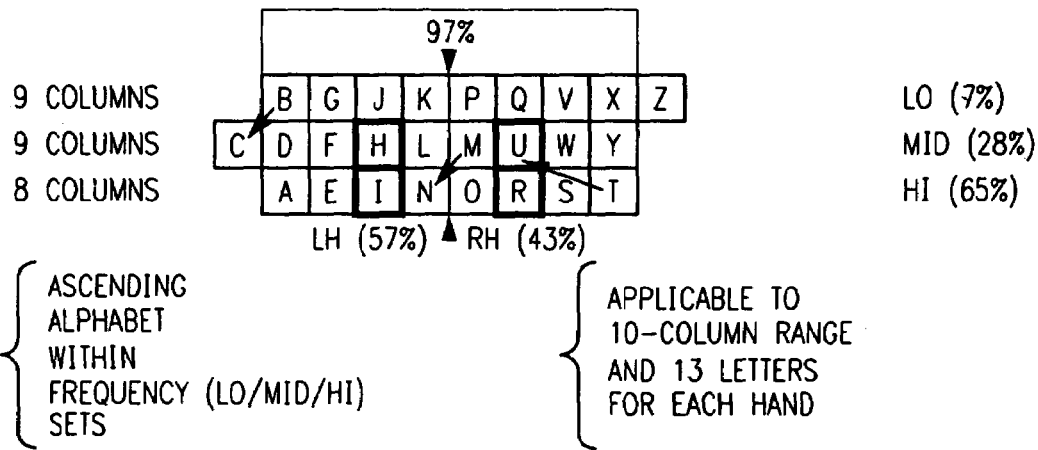
Figure 46:
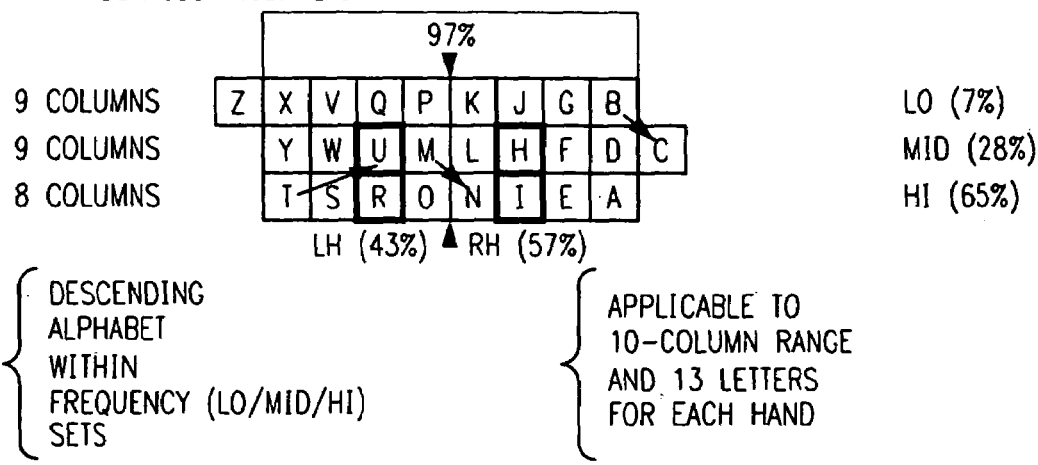

Figures are provided for eight configurations of the layout arising from Case 332F as FIGS. 43–50. In these figures, the high frequency row is either adjacent the middle frequency row by being directly above or directly below the middle frequency row. FIG. 43 shows that configuration LXI has a 10-column range, ascending alphabet, within low, high and middle frequency sets, and 13 letters for each hand. FIG. 44 shows that configuration LXII has a 10-column range, descending alphabet, within low, high and middle frequency sets, and 13 letters for each hand. FIG. 45 shows that configuration LXIII has a 10-column range, ascending alphabet, within low, middle and high frequency sets, and 13 letters for each hand. FIG. 46 shows that configuration LXIV has a 10-column range, descending alphabet, within low, middle and high frequency sets, and 13 letters for each hand.

Figure 47:
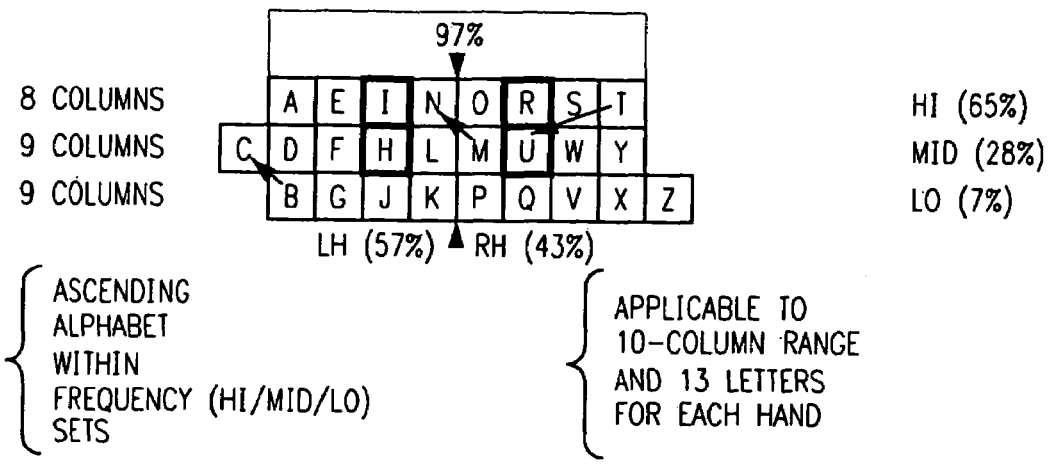
Figure 48:
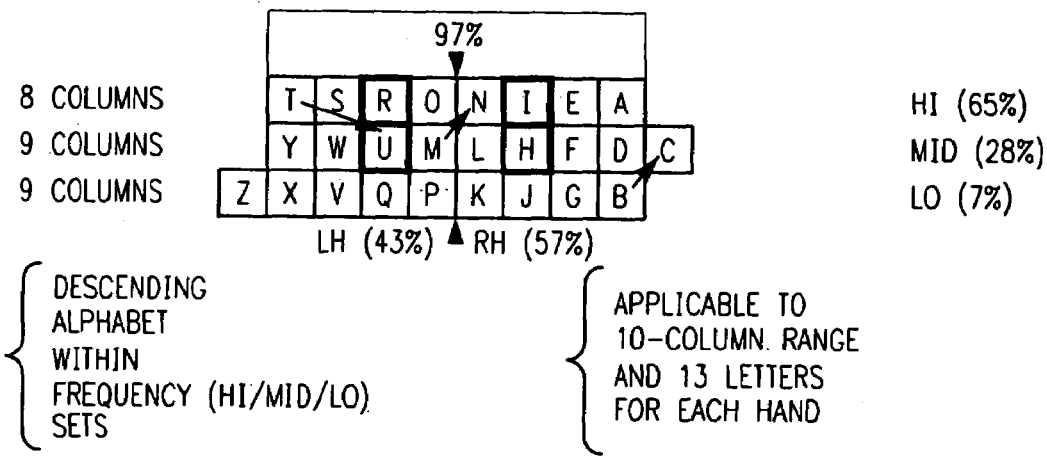
Figure 49:
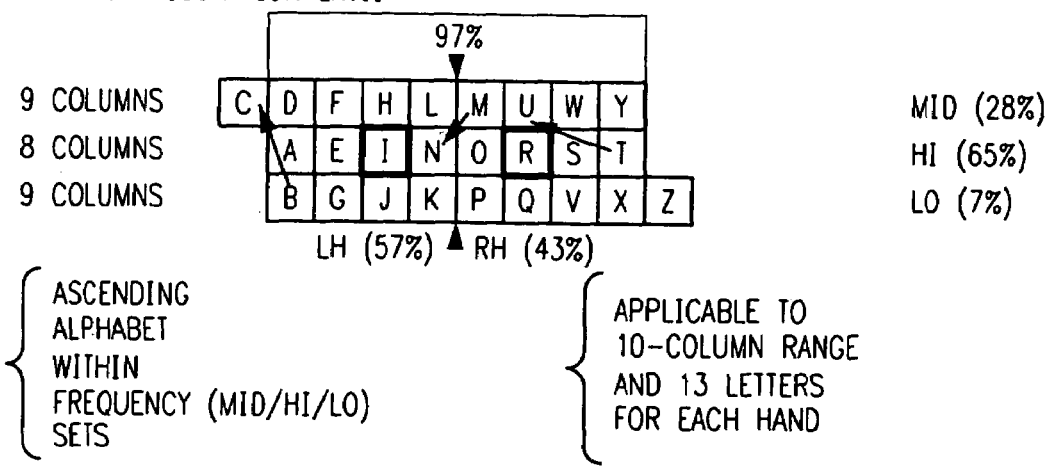
Figure 50:
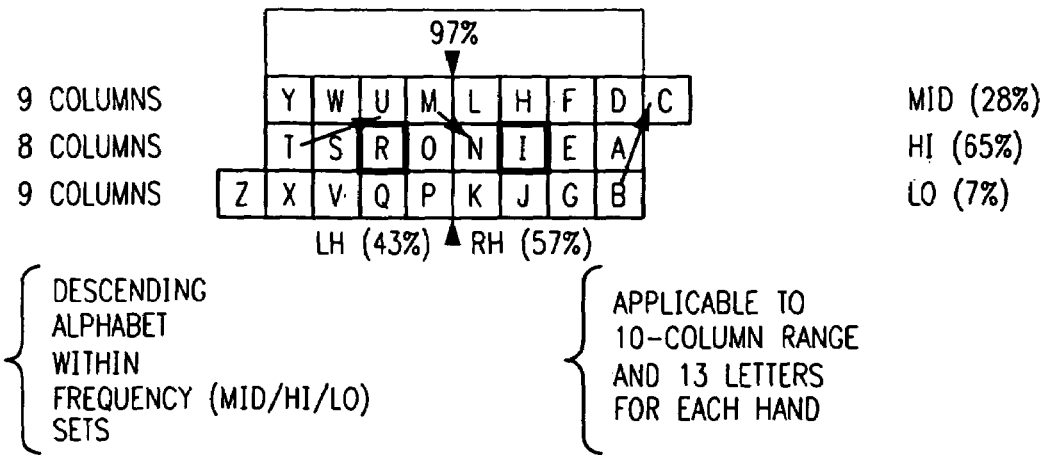

FIG. 47 shows that configuration LXV has a 10-column range, ascending alphabet, within high, middle and low frequency sets, and 13 letters for each hand. FIG. 48 shows that configuration LXVI has a 10-column range, descending alphabet, within high, middle and low frequency sets, and 13 letters for each hand. FIG. 49 shows that configuration LXVII has a 10-column range, ascending alphabet, within middle, high and low frequency sets, and 13 letters for each hand. FIG. 50 shows that configuration LXVIII has a 10-column range, descending alphabet, within middle, high and low frequency sets, and 13 letters for each hand.

Figures are not provided for four configurations of the layout arising from Case 332F. In these configurations the low frequency set of letters is always on the center row. Configuration LXIX has a 10-column range, ascending alphabet, within high, low and middle frequency sets, and 13 letters for each hand. Configuration LXX has a 10-column range, descending alphabet, within high, low and middle frequency sets, and 13 letters for each hand. Configuration LXXI has a 10-column range, ascending alphabet, within middle, low and high frequency sets, and 13 letters for each hand. Configuration LXXII has a 10-column range, descending alphabet, within middle, low and high frequency sets, and 13 letters for each hand.

Figure 51:
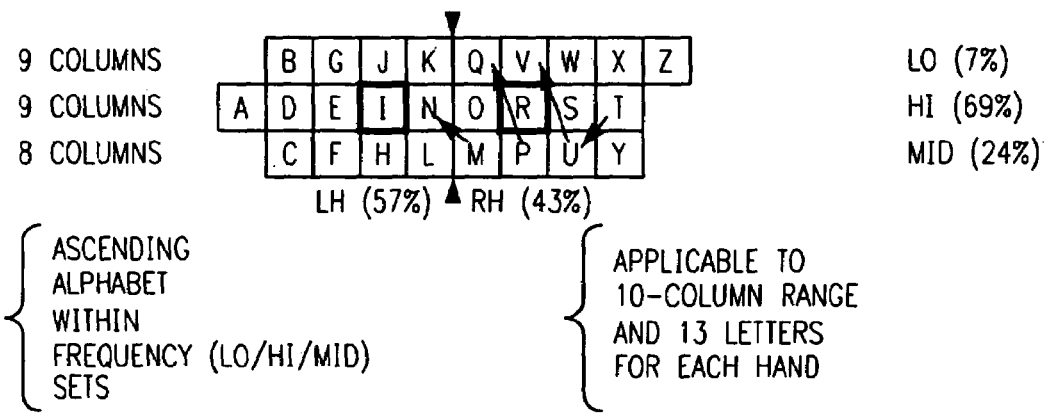
Figure 52:
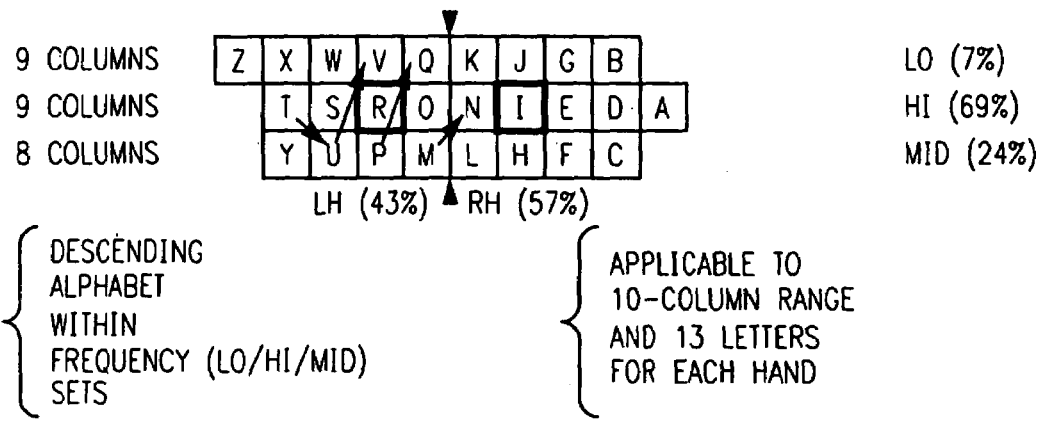

Figures are provided for eight configurations of the layout arising from Case 451F as FIGS. 51–58. In these figures, the high frequency row is either adjacent the middle frequency row by being directly above or directly below the middle frequency row. FIG. 51 shows that configuration LXXIII has a 10-column range, ascending alphabet, within low, high and middle frequency sets, and 13 letters for each hand. FIG. 52 shows that configuration LXXIV has a 10-column range, descending alphabet, within low, high and middle frequency sets, and 13 letters for each hand. FIG. 53 shows that configuration LXXV has a 10-column range, ascending alphabet, within low, middle and high frequency sets, and 13 letters for each hand. FIG. 54 shows that configuration LXXVI has a 10-column range, descending alphabet, within low, middle and high frequency sets, and 13 letters for each hand.

FIG. 55 shows that configuration LXXVII has a 10-column range, ascending alphabet, within high, middle and low frequency sets, and 13 letters for each hand. FIG. 56 shows that configuration LXXVIII has a 10-column range, descending alphabet, within high, middle and low frequency sets, and 13 letters for each hand. FIG. 57 shows that configuration LXXIX has a 10-column range, ascending alphabet, within middle, high and low frequency sets, and 13 letters for each hand. FIG. 58 shows that configuration LXXX has a 10-column range, descending alphabet, within middle, high and low frequency sets, and 13 letters for each hand.

Figures are not provided for four configurations of the layout arising from Case 451F. In these configurations, the low frequency set of letters is always on the center row. Configuration LXXXI has a 10-column range, ascending alphabet, within high, low and middle frequency sets, and 13 letters for each hand. Configuration LXXXII has a 10-column range, descending alphabet, within high, low and middle frequency sets, and 13 letters for each hand. Configuration LXXXIII has a 10-column range, ascending alphabet, within middle, low and high frequency sets, and 13 letters for each hand. Configuration LXXXIV has a 10-column range, descending alphabet, within middle, low and high frequency sets, and 13 letters for each hand.

The Abridged Supplemental Appendix includes an Abridged Supplemental Appendix Index and numerical equivalent tables. The Abridged Supplemental Appendix expands the scope of 600 (120×5) cases by an additional 720 (120×6) cases by analyzing additional frequency distributions for English and several other languages.

The prior cases were constructed from 5 different probability distributions for the English language. The additional cases are constructed from 1 more probability distribution for English and 5 probability distributions covering German, French, Italian, Spanish and Portuguese. The book Cryptanalysis by H. F. Gaines lists single-letter frequencies for the 6 new probability distributions. The new English frequencies are attributed to M. E. Ohaver.

The first 120 of the 720 cases used the English (Gaines/Ohaver) frequency order: E, T, O, A, N, I, R, S, H, D, L, C, F, U, M, P, Y, W, G, B, V, K, X, J, Q, Z.

The second 120 of the 720 cases used the German frequency order: E, N, I, R, S, T, A, D, U, H, G, O, L, B, M, C, F, W, Z, K, V, P, J, Q, X, Y. Other German sources resolved tied (or equal) percentages for the T, A, D sequence and the H, G sequence.

The third 120 of the 720 cases used the French frequency order: E, A, I, S, T, N, R, U, L, O, D, M, P, C, V, Q, G, B, F, J, H, Z, X, Y, K, W.

The fourth 120 of the 720 cases used the Italian frequency order: E, A, I, O, N, L, R, T, S, C, D, P, U, M, V, G, H, F, B, Q, Z, J, K, W, X, Y.

The fifth 120 of the 720 cases used the Spanish frequency order: E, A, O, S, N, R, I, L, D, U, C, T, M, P, B, H, Q, G, V, Y, J, F, Z, X, K, W. Other Spanish sources resolved tied (or equal) percentages for the R, I sequence.

The sixth 120 of the 720 cases used the Portuguese frequency order: A, E, O, R, S, I, N, D, T, M, U, C, L, P, Q, V, G, F, H, B, J, Z, X, K, W, Y. Other Portuguese sources resolved tied (or equal) percentages for the T, M sequence and the G, F sequence.

Only 11 of the additional 720 cases have numerical equivalent tables included in the Abridged Supplemental Appendix. Each of the 11 case numbers are cited in the Abridged Supplemental Appendix Index document, which is categorized by language. The English, German and French case numbers are numeric, indicating that best results were obtained by analyzing 10-column maximum or 9-column maximum set lengths. The Spanish and Portuguese case numbers are alphanumeric, indicating that best results were obtained by analyzing 9-column maximum set lengths shifting within a 10-column range. The Italian case numbers are both numeric and alphanumeric, indicating that best results were obtained from both methods of analysis.

Altogether, the yield cited in the Abridged Supplemental Appendix Index does not identify any new keyboard configuration solutions that are markedly better than those already achieved. The German, French, Italian, Spanish and Portuguese best cases are all rated with high demerit tallies of 5 each. The English best case numbers 553 and 596, with competitive demerit tallies of 4 and 3, respectively, are but repetitions of previously discovered keyboard configuration solutions. The results of case number 553 are identical to those of case numbers 053 and 153. The results of case number 596 are identical to those of case numbers 196 and 296 and 396.

Due to the poor yield from these additional 720 cases, the 7 (4 plus 3) keyboard configuration solutions developed from the first 600 (480 plus 120) cases are perhaps now more valuable.

The PDA Rotation Appendix includes an Application/Approach Outline, a PDA Rotation Appendix Index, and alphabet letter tables. The purpose of this PDA Rotation Appendix is to expand the scope of configuration solutions beyond those in which keyboard letters are activated by 8 fingers. PDA (Personal Digital Assistant) applications require efficient configuration solutions to support activation of keyboard letters by 2 thumbs. Additionally and accordingly, such thumb-based engagement is better addressed on a column-wise basis than on a row-wise basis. The thumbs generally operate more easily a PDA keyboard in a vertical manner suggesting columns while a row-wise basis is more difficult for a thumb-based keyboard.

Alternatively, the angular displacement of an articulating thumb plus the linear displacement of the flexing thumb may provide a generally fan-like, triangle-like, or partial planar torus-like shape. Arcs of transit made by the thumb may serve to define important groupings of letters for frequency and alphabetical sequencing purposes in conjunction with radial articulation of the thumb.

All 7 prior keyboard configuration solutions emphasized frequency distribution by row, and so the integrity of alphabetical sequence was maintained within each row. PDA configuration solutions need to emphasize frequency distribution by column, and so the integrity of alphabetical sequence is maintained within each column.

If PDA set lengths (the letter columns) are limited to a 3-letter maximum before alphabetical sequencing, there is an unfortunate bias in favor of one of the two (left, right) sides. If the individual 3-letter sets are sequentially numbered from one (1), all of the odd numbered sets naturally have higher frequency letters, to the disadvantage of even numbered sets. One answer is to use a 6-letter maximum for PDA set lengths (the letter columns) before alphabetical sequencing. Upon determination of the five six-letter frequency lists, the table is bisected (horizontally, for vertical lists) across all the frequency lists to split each one into two three-letter lists (except the last one). The two new 3×5 matrices (or, rather, 3×4 matrices plus the two-remaining letters) can then be considered as arranged side by side with the highest frequency lists adjacent to one another. The degree of frequency for the flanking lists then diminishes as travel is made from the center of the resulting 10×3 matrix (8×3 matrix+2 additional letters) of keys. This provides a keyboard configuration with the high-frequency letters closest to the keyboard center and proximate a relaxed and/or default positions for the thumbs. Letters of decreasing frequency are then placed away from the convenient center of the keyboard to provide a thumb-based PDA keyboard designed for efficient use by the thumbs. As indicated above, there is a direct relationship between convenience and frequency for this keyboard and its method of construction.

As shown in the PDA Rotation Appendix, the splitting of the 5×6 table can be achieved by choosing an appropriate axis of rotation and pivoting, for example, the lower half of the table about that axis.

The imposition of 6-letter set lengths implies that 5 frequency lists (or columns) are adequate for analyzing the PDA application, as 30 (5×6) cell matrix can handle 26 letters. The 3 traditional (high, middle, low) frequency lists are supplemented by 2 new (denominated herein as high/middle, middle/low) frequency lists. The familiar techniques for measuring backward movement and excess forward movement are still valid, despite the changed dimensions of the cell matrix. The only difference in results is the assignment of demerits for backward row movement and excess forward row movement where before such demerits were previously associated with column-based movements. Note should be taken that such demerits are assessed prior to the rotation (as per the PDA Rotation Appendix) between the two three-row matrices.

Appropriate sorting/shifting of letters within each of 5 frequency lists increases the likelihood of equitably distributing letters between the right side and the left side of a keyboard as set forth below. Best results in a keyboard, with 13 letters for each hand, are letters A–M on the A-side and letters N–Z on the Z-side. Fortuitously, these exact results are found in the PDA solution and all variations of that solution illustrated in FIGS. 59–66.

The PDA solutions in FIGS. 59–62 are denominated herein as "basic" solutions as they are the solutions that generally initially arise from the rotation of the optimized lists. FIGS. 63–66 are denominated at "uniform" solutions as the alphabet goes uniformly in a top to bottom, or vice-versa, direction. The basic solution is alphabetized upwardly on one side and downwardly on the other and is distinguishable from the uniform solutions on this criteria.

2 strings (see below) may be defined for the PDA application, because letters are packed into the higher frequency lists. Degrees of freedom are found only in the lower frequency lists. The first string is: 1–6, 7–12, 13–18, 19–24 and 25–26. This string has 5 degrees of freedom, all in the low frequency list. A shift 3 of 5 was chosen in order to symmetrically align letters between the third and fourth lines of the one short list. The second string is: 1–6, 7–12, 13–18, 19–22 and 23–26. This string has 3 degrees of freedom in both the middle/low and low frequency lists, for a total of 9 (3×3) degrees of freedom. A shift 5 of 9 was chosen, in order to symmetrically align letters between the second and fifth lines of the two short lists.

These 2 PDA strings, each with one appropriate shift, were analyzed across 11 probability distributions: English (Kahn), English (Gaines/Meaker), English (Pratt), English (Smith), English (Milliken), English (Gaines/Ohaver), German, French, Italian, Spanish and Portuguese. The measured results are displayed in the PDA Rotation Appendix Index. The scores show the number of demerits followed by the number of movements that contributed to the demerit tally. The 2/2 score for the English (Kahn) probability distribution indicates 2 demerits and 2 movement events. Therefore, each event contributed only 1 demerit. The movements from letter O to P and from letter U to V were each backward by only 1 row.

The PDA alphabet letter tables show the precise measurement of demerits/events for all 22 (11×2) strings. The initial score was 10/7 demerits/events for the English (Kahn) string with the shift 3 of 5. This one string was followed up with more evaluations, because of potential improvement from exchanging two letters in the order of Kahn's rare frequency group: J, K, Q, X, Z. Kahn's identical half percent frequency for letters K and X was a prerequisite for an equal exchange. An interim 4/3 score demonstrated a reduction of 4 events and 6 associated demerits. The repositioning of letter Z from symmetrical alignment on the fourth line of the short low frequency list achieved a further reduction of one event and 2 associated demerits. The final 2/2 score was achieved at the price of a temporary loss of symmetry. Remarkably, the symmetry is restored by subsequent steps in the PDA application process.

The PDA Application/Approach Outline shows that the evolution from one 30 (3×10) cell matrix to another 30 (5×6) cell matrix precedes the actual PDA-rotation dynamics. The PDA-rotation is executed only upon the optimized matrix carrying the 2/2 demerits/events score.

The 7 prior keyboard configuration solutions were analyzed or generated by a very linear process. The straight line of letters in each of 3 frequency lists were loaded directly into a straight line of keys in corresponding rows. Furthermore, the rows of keys were parallel to other rows. This contrasts with the loading of PDA configuration solutions by a non-linear process. The straight line of letters in each of 5 frequency lists are split in half before being transformed (as by relation) into 2 straight lines of keys in 2 corresponding columns. The columns of keys are parallel to other columns.

The high frequency list loads, or obtains, columns 5 and 6. The high/middle frequency list loads columns 4 and 7. The middle frequency list loads columns 3 and 8. The middle/low frequency list loads columns 2 and 9. The low frequency list loads columns 1 and 10. The PDA-rotation swings a half size 15 (5×3) cell matrix about an axis, so that high frequency letters are folded side-by-side in columns 5 and 6.

This first PDA configuration solution puts the A-side letters in ascending sequence within column from bottom to top rows. The Z-side letters are in ascending sequence within column from top to bottom rows. The A-side and Z-side letters are tied together within row exactly as noted above. This solution is the basis of 4 PDA configurations and figures.

The second PDA configuration solution puts the A-side and Z-side letters in ascending sequence within column from top to bottom rows. The A-side and Z-side letters are again tied together within row exactly as noted above. This different solution is the basis of 4 more PDA configurations and figures. This solution also restores lost symmetry by placing letters K and Z on the same row.

Percentage totals by side are developed, using values from the English (Kahn) probability distribution. The 53% and 47% totals, respectively, for A-side and Z-side keys are close to 50%. These percentages are valid for the 2 PDA configuration solutions.

Percentage totals by columns are developed, also using values from the English (Kahn) probability distribution. A 52% total covers 2 columns (5 and 6). An 81% total covers 4 columns (4 through 7). A 94% total covers 6 columns (3 through 8). A 99% total covers 8 columns (2 through 9). A 100% total covers 10 columns (1 through 10). These percentages are valid for the 2 PDA configuration solutions.

The percentage totals developed as a byproduct of the PDA-rotation application have a familiar bell shaped characteristic. This has implications beyond PDA, as follows:

A 2-thumb method gives PDA 100% coverage.

A 2-finger hunt-and-peck method gives keyboards 100% coverage.

An 8-finger touch-typing method gives keyboards 81% coverage by index fingers, 13% coverage by middle fingers, 5% coverage by ring fingers and 1% coverage by little fingers.

A 4-finger compromise method gives keyboards 81% coverage by index fingers and 19% coverage by middle fingers.

An 8-finger compromise method gives keyboards 52% coverage by index fingers, 29% coverage by middle fingers, 13% coverage by ring fingers and 6% coverage by little fingers.

A 1-stylus method gives keyboards 100% coverage.

The bell shaped characteristic might favor any method selected by PDA and/or keyboard operators.

Figures are provided for four configurations of the layout arising from the PDA-rotation case as FIGS. 59–62. In these figures, the letters in the columns are in alphabetical sequence. On the A-side, the A, E, I sequence, the D, H, L sequence, the C, F, M sequence, the B, G, J sequence, and the space, space, K sequence are all in same ascending or descending sequence. On the Z-side, the N, O, T sequence, the R, S, U sequence, the P, W, Y sequence, the Q, V, X sequence, and the space, space, Z sequence are all in the same descending or ascending sequence. However, the A-side and the Z-side are always in the opposite sequence for these four configurations. The positioning of letters K and Z on two different rows for these four configurations indicate that a 10-column range is characteristic.

Figure 59:
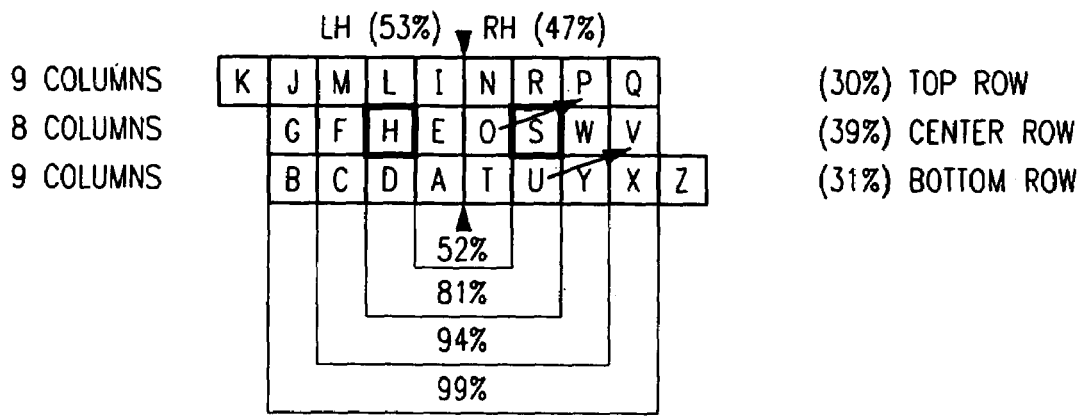
FIGS. 59–66 are eight configurations arising from the PDA solution of the PDA Rotation Appendix.
Figure 60:
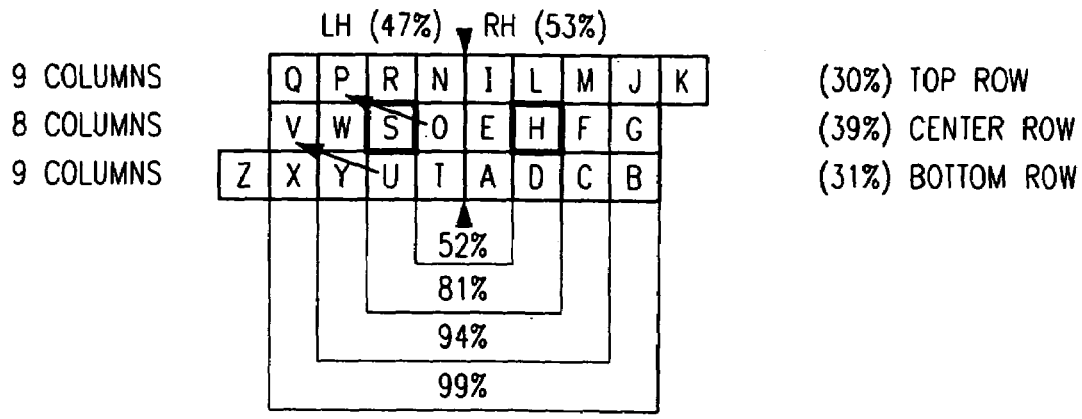
Figure 61:
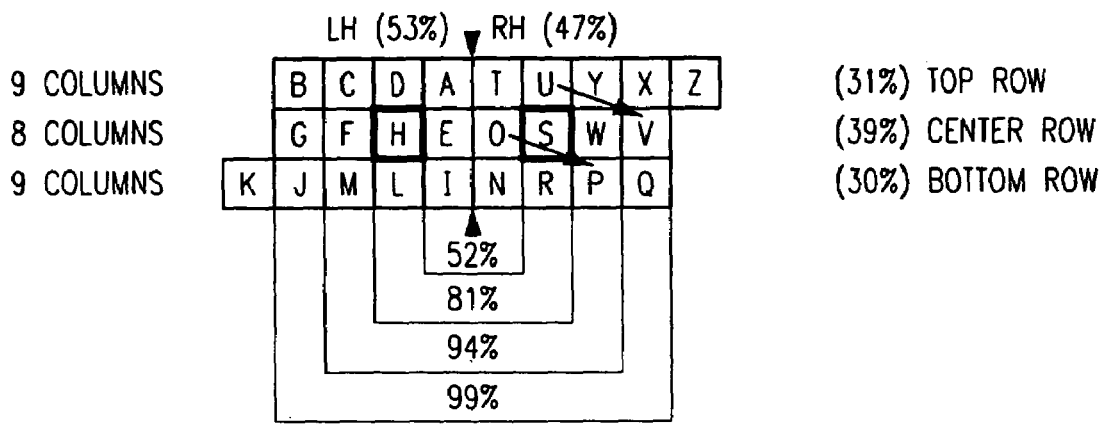
Figure 62:
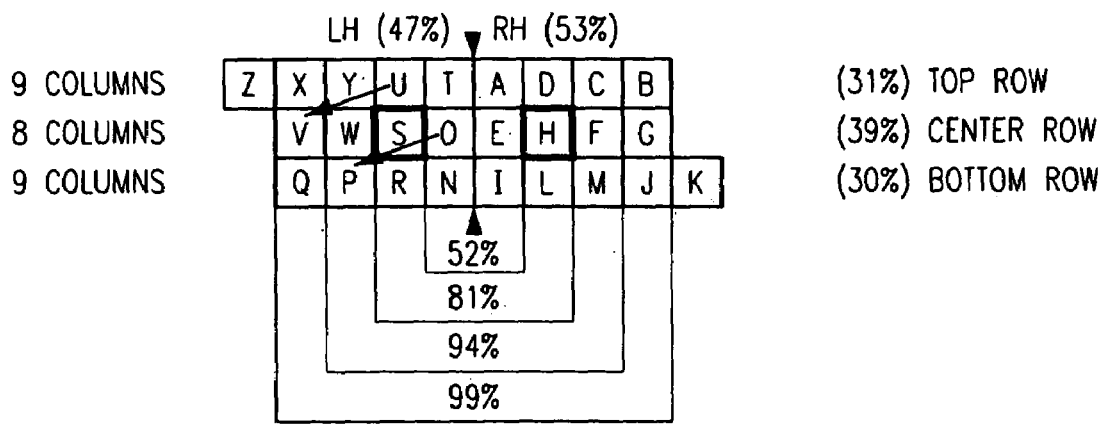

FIG. 59 shows that configuration LXXXV has a 10-column range, 13 letters for each hand, and format of the basic PDA solution. FIG. 60 shows that configuration LXXXVI has a 10-column range, 13 letters for each hand, and mirror image format of the basic PDA solution. FIG. 61 shows that configuration LXXXVII has a 10-column range, 13 letters for each hand, and format with top/bottom rows exchanged in the basic PDA solution. FIG. 62 shows that configuration LXXXVIII has a 10-column range, 13 letters for each hand, and mirror image format with top/bottom rows exchanged in the basic PDA solution.

Figures are provided for four configurations of a revised layout arising from the PDA-rotation case as FIGS. 63–66. In these figures the letters in the columns are in alphabetical sequence. The A, E, I sequence, the D, H, L sequence, the C, F, M sequence, the B, G, J sequence, the space, space, K sequence, the N, O, T sequence, the R, S, U sequence, the P, W, Y sequence, the Q, V, X sequence and the space, space, Z sequence are all in the same ascending or descending sequence. The A-side and the Z-side are always in the same sequence for these four configurations. The positioning of letters K and Z on the same row for these four configurations means that a characteristic 10-column range might have achieved an upgrade to a 10-column maximum status.

Figure 63:
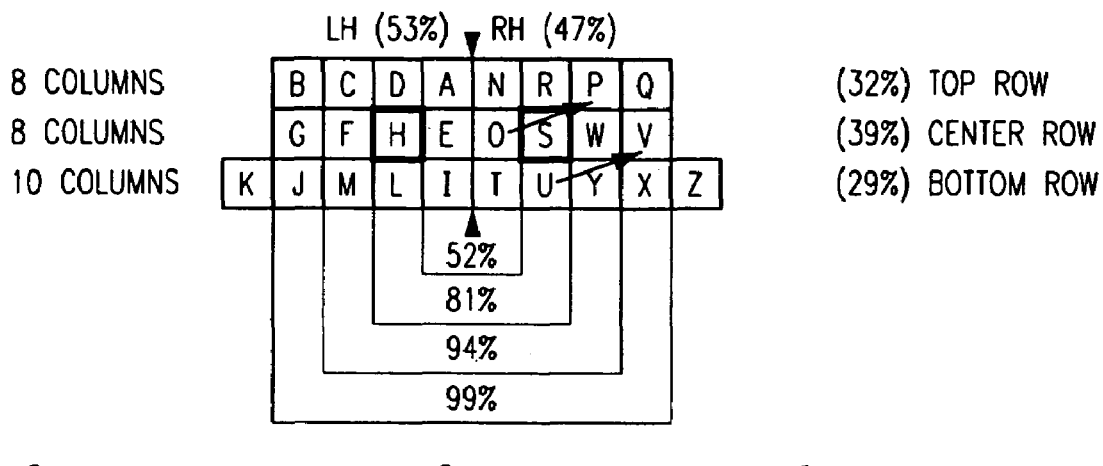
Figure 64:
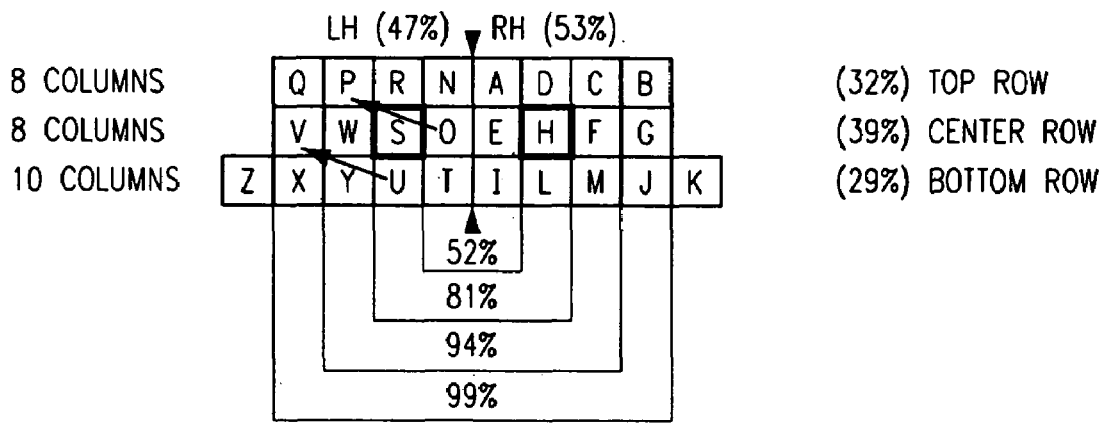
Figure 65:
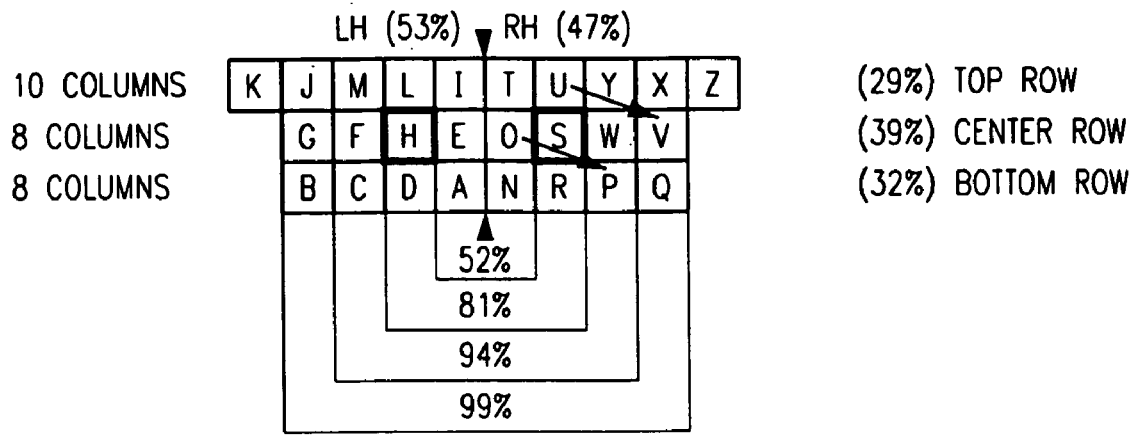
Figure 66:
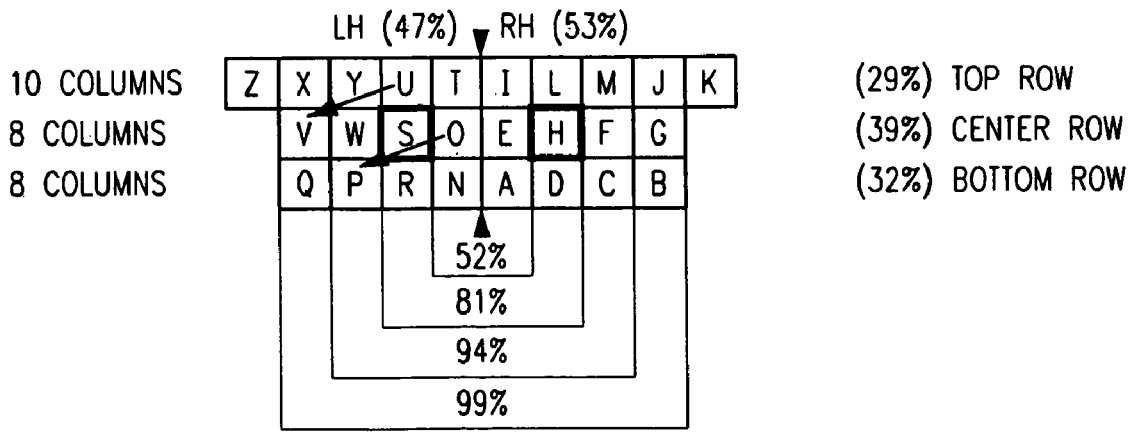

FIG. 63 shows that configuration LXXXIX has a 10-column range, 13 letters for each hand, and format with A-side top/bottom rows exchanged in the basic PDA solution. FIG. 64 shows that configuration XC has a 10-column range, 13 letters for each hand, and mirror image format with A-side top/bottom rows exchanged in the basic PDA solution. FIG. 65 shows that configuration XCI has a 10-column range, 13 letters for each hand, and format with Z-side top/bottom rows exchanged in the basic PDA solution. FIG. 66 shows that configuration XCII has a 10-column range, 13 letters for each hand, and mirror image format with Z-side top/bottom rows exchanged in the basic PDA solution.

With an enhanced PDA keyboard as set forth herein, PDA users are able to access more quickly those keys of greater use by frequency of use. Additionally, although such a keyboard departs dramatically from QWERTY and/or Dvorak configuration, the muscle memory associated with such a thumb-based keyboard is unlikely to interfere with the muscle memory of the fingers (arising, most probably, via touch typing). As a result, little interference between finger-based and thumb-based keyboards is foreseen while the adoption of the thumb-based optimized PDA keyboard may provide significant user advantages in typing and entering data, including SMS (short message service) for cell phones, etc.

Configuration solutions for PDA's (Personal Digital Assistants) may be developed by a fully automatic, or automated, process. This may be accomplished by separating (for example) the alphabet into two groups, the letters A–M and the letters N–Z. The English (Kahn) frequency distribution is used for demonstration purposes. However, other frequency distributions may also be used. For each letter, the alphabetic order number is cited.

| Letter/Number | | Letter/Number | | Letter/Number | |
|---|---|---|---|---|---|
| E | 05 | D | 04 | G | 07 |
| T | 20 | L | 12 | B | 02 |
| A | 01 | U | 21 | V | 22 |
| O | 15 | C | 03 | J | 10 |
| N | 14 | M | 13 | K | 11 |
| I | 09 | P | 16 | Q | 17 |
| R | 18 | F | 06 | X | 24 |
| S | 19 | Y | 25 | Z | 26 |
| H | 08 | W | 23 | | |

For letters A–M, the frequency distribution is expressed by alphabetic order number, as follows: 05, 01, 09, 08, 04, 12, 03, 13, 06, 07, 02, 10, and 11. This set of numbers is divided into subsets, not to exceed three numbers, as follows: 05, 01, and 09; then 08, 04, and 12; then 03, 13, and 06; then 07, 02, and 10; and then 11. Each subset is sorted by alphabetic order number, as follows: 01, 05, and 09; then 04, 08, and 12; then 03, 06, and 13; then 02, 07, and 10; and then 11.

For letters N–Z, the frequency distribution is expressed by alphabetic order number, as follows: 20, 15, 14, 18, 19, 21, 16, 25, 23, 22, 17, 24, and 26. This set of numbers is divided into subsets, not to exceed three numbers, as follows: 20, 15, and 14; then 18, 19, and 21; then 16, 25, and 23; then 22, 17, and 24; and then 26. Each subset is sorted by alphabetic order number, as follows: 14, 15, and 20; then 18, 19, and 21; then 16, 23, and 25; then 17, 22, and 24; and then 26.

For minimum-fingers configuration of PDA's there is a direct relationship between sorted subsets and keyboard rows/columns.

| Alphabet Numbers | Keyboard Columns | Keyboard Rows |
|---|---|---|
| 01, 05, 09 | 05 | Top, Home, Bottom |
| 04, 08, 12 | 04 | Top, Home, Bottom |
| 03, 06, 13 | 03 | Top, Home, Bottom |
| 02, 07, 10 | 02 | Top, Home, Bottom |
| 11 | 01 | Bottom |
| 14, 15, 20 | 06 | Top, Home, Bottom |
| 18, 19, 21 | 07 | Top, Home, Bottom |
| 16, 23, 25 | 08 | Top, Home, Bottom |
| 17, 22, 24 | 09 | Top, Home, Bottom |
| 26 | 10 | Bottom |

The top row sequence for columns 2–9 is 02, 03, 04, 01, 14, 18, 16, and 17, which are the alphabet order numbers for letters B, C, D, A, N, R, P, and Q. The home row sequence for columns 2–9 is 07, 06, 08, 05, 15, 19, 23, and 22, which are the alphabet order numbers for letters G, F, H, E, O, S, W, and V. The bottom row sequence for columns 1–10 is 11, 10, 13, 12, 09, 20, 21, 25, 24, and 26, which are the alphabet order numbers for letters K, J, M, L, I, T, U, Y, X, and Z.

These results are exactly the same as letters illustrated in FIG. 63 (Configuration LXXXIX), a PDA solution. The accuracy of this fully automatic process for PDA's is thereby demonstrated.

In review, to achieve the configuration of FIG. 63, the alphabet is first split into first and second alphabetical halves, then divided into frequency-ordered triplets. The first set of triplets for the first half of the alphabet occupies one side of the keyboard and the other set of triplets, the other side. These triplets are then assigned to a keyboard layout on an inside-out basis with the most frequently used triplets for each alphabet half occupying facing center columns of the keyboard. The thumbs then have easy access to the most-used letters at the center of the keyboard and the user readily knows that the keyboard is ordered in an alphabetically-derived manner to make it easy to find the keys.

For dominant-fingers (such as index and/or middle fingers) configurations of keyboards, there is another direct relationship between sorted subsets and keyboard rows/columns.

| Alphabet Numbers | Keyboard Columns | Keyboard Rows |
|---|---|---|
| 01, 05, 09 | 03, 04, 05 | Home |
| 04, 08, 12 | 03, 04, 05 | Top |
| 03, 06, 13 | 03, 04, 05 | Bottom |
| 02, 07, 10 | 02 | Top, Home, Bottom |

-continued

| Alphabet Numbers | Keyboard Columns | Keyboard Rows |
|---|---|---|
| 11 | 01 | Bottom |
| 14, 15, 20 | 06, 07, 08 | Home |
| 18, 19, 21 | 06, 07, 08 | Top |
| 16, 23, 25 | 06, 07, 08 | Bottom |
| 17, 22, 24 | 09 | Top, Home, Bottom |
| 26 | 10 | Bottom |

The top row sequence for columns 2–9 is 02, 04, 08, 12, 18, 19, 21, and 17, which are the alphabet order numbers for letters B, D, H, L, R, S, U, and Q. The home row sequence for columns 2–9 is 07, 01, 05, 09, 14, 15, 20, and 22, which are the alphabet order numbers for letters G, A, E, I, N, O, T, and V. The bottom row sequence for columns 1–10 is 11, 10, 03, 06, 13, 16, 23, 25, 24, and 26, which are the alphabet order numbers for letters K, J, C, F, M, P, W, Y, X, and Z.

Figure 67:
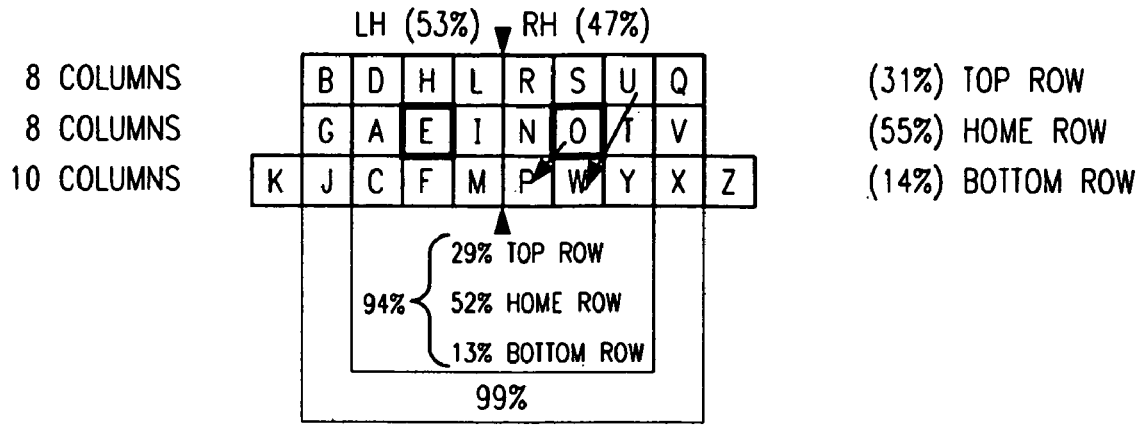
FIGS. 67 and 68 show keyboard configurations arising from dominant-fingers configurations.

These results are illustrated in FIG. 67 (Configuration XCIII). Two backward moves by column are indicated by arrows within the horizontal sector. No backward moves by row are indicated within the vertical sectors. No demerits are assigned to moves between horizontal/vertical sectors.

This configuration is achieved by taking the triplets established above for PDA's and using them for, as an example, index and/or middle fingers. As a result, the six (6) highest use triplets are arranged in rows (instead of columns) on opposing sides of the keyboard centerline.

What were formerly the two high use columns of FIG. 63 (A, E, I and N, O, T of columns 5 and 6, respectively) are transformed into a single middle row spanning columns 3–8 of the home row of FIG. 67. Columns 4 and 7 of FIG. 63 have become the majority of the top row of FIG. 67 while columns 3 and 8 of FIG. 63 have become the majority of the bottom row of FIG. 67. Columns 1, 2, 9, and 10 of FIG. 67 are the same as FIG. 63. In this way, the majority of most frequently used keys are more readily available for a dominant finger, such as the index and/or middle finger, making typing faster and easier.

Dominant-fingers configuration of Russian keyboards may be developed by this fully automatic process. This is accomplished by separating the alphabet into two groups, the Cyrillic letters A–M and the other Cyrillic letters. The Russian (Princeton) frequency distribution is used for demonstration. For each letter, the alphabetic order number is cited.

| Letter/Number | | Letter/Number | | Letter/Number | |
|---|---|---|---|---|---|
| О | 16 | М | 14 | й | 11 |
| Е | 06 | Д | 05 | Х | 23 |
| А | 01 | П | 17 | Ж | 08 |
| И | 10 | У | 21 | Ш | 26 |
| Н | 15 | Я | 33 | ю | 32 |
| Т | 20 | Ы | 29 | ц | 24 |
| С | 19 | З | 09 | щ | 27 |
| Р | 18 | Б | 02 | э | 31 |
| В | 03 | Г | 04 | ъ | 28 |
| Л | 13 | Ч | 25 | Ф | 22 |
| К | 12 | Ь | 30 | Ё | 07 |

For Cyrillic letters A–M, the frequency distribution is expressed by alphabetic order number, as follows: 06, 01, 10, 03, 13, 12, 14, 05, 09, 02, 04, 11, 08, and 07. This set of numbers is divided into subsets, not to exceed three numbers, as follows: 06, 01, and 10; then 03, 13, and 12; then 14, 05, and 09; then 02, 04, and 11; then 08 and 07. Each subset is sorted by alphabetic order number, as follows: 01, 06, and 10; then 03, 12, and 13; then 05, 09, and 14; then 02, 04, and 11; then 07 and 08.

For Cyrillic letters not in the A–M range, the frequency distribution is expressed by alphabetic order number, as follows: 16, 15, 20, 19, 18, 17, 21, 33, 29, 25, 30, 23, 26, 32, 24, 27, 31, 28, and 22. This set of numbers is divided into subsets, not to exceed three numbers, as follows: 16, 15, and 20; then 19, 18, and 17; then 21, 33, and 29; then 25, 30, and 23; then 26, 32, and 24; then 27 and 31; then 28; then 22. Each subset is sorted by alphabetic order number, as follows: 15, 16, and 20; then 17, 18, and 19; then 21, 29, and 33; then 23, 25, and 30; then 24, 26, and 32; then 27 and 31; then 28; then 22.

For dominant-fingers configuration of Russian keyboards, there is this direct relationship between sorted subsets and keyboard rows/columns.

| Alphabet Numbers | Keyboard Columns | Keyboard Rows |
|---|---|---|
| 01, 06, 10 | 03, 04, 05 | Home |
| 03, 12, 13 | 03, 04, 05 | Top |
| 05, 09, 14 | 03, 04, 05 | Bottom |
| 02, 04, 11 | 02 | Top, Home, Bottom |
| 07, 08 | 01 | Top, Home |
| 15, 16, 20 | 06, 07, 08 | Home |
| 17, 18, 19 | 06, 07, 08 | Top |
| 21, 29, 33 | 06, 07, 08 | Bottom |
| 23, 25, 30 | 09 | Top, Home, Bottom |
| 24, 26, 32 | 10 | Top, Home, Bottom |
| 27, 31 | 11 | Top, Home |
| 28 | 12 | Top |
| 22 | 01 | Bottom |

The top row sequence for columns 1–12 is 07, 02, 03, 12, 13, 17, 18, 19, 23, 24, 27, and 28, which are the alphabet order numbers for Cyrillic letters Ё, Б, В, К, Л, П, Р, С, Х, ц, Щ, and Ъ. The home row sequence for columns 1–11 is 08, 04, 01, 06, 10, 15, 16, 20, 25, 26, and 31, which are the alphabet order numbers for Cyrillic letters Ж, Г, А, Е, И, Н, О, Т, Ч, Ш, and Э. The bottom row sequence for columns 1–10 is 22, 11, 05, 09, 14, 21, 29, 33, 30, and 32, which are the alphabet order numbers for Cyrillic letters Ф, й, Д, З, М, У, Ы, Я, Ь, and Ю.

Figure 68:
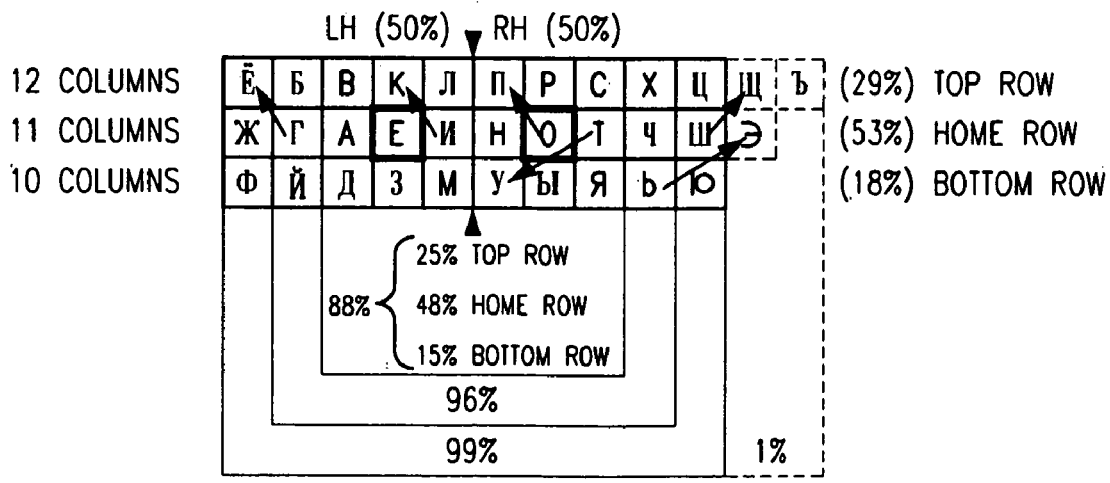

These Russian language results are illustrated in FIG. 68 (Configuration XCIV). Three backward moves by column are indicated by arrows within the horizontal sector. Three backward moves by row are indicated by arrows within the vertical sectors. No demerits are assigned to moves between horizontal/vertical sectors.

While the present invention has been described with regards to particular embodiments, it is recognized that additional variations of the present invention may be devised without departing from the inventive concept.

What is claimed is:

1. A keyboard, comprising:
   a first sequence consecutively and in order comprising letters B, D, H, L, R, S, U, and Q;
   a second sequence consecutively and in order comprising letters G, A, E, I, N, O, T, and V; and
   a third sequence consecutively and in order comprising letters K, J, C, F, M, P, W, Y, X, and Z.

2. A keyboard as set forth in claim 1, further comprising:
said first, second, and third sequences each being a separate row.

3. A keyboard, comprising:
a first sequence consecutively and in order comprising letters Ё, Б, В, К, Л, П, Р, С, Х, Ц, Щ, and Ъ;
a second sequence consecutively and in order comprising letters Ж, Г, А, Е, И, Н, О, Т, Ч, Ш, and Э; and
a third sequence consecutively and in order comprising letters Ф, й, Д, З, М, У, Ы, Я, Ь, and Ю.

4. A keyboard as set forth in claim 3, further comprising:
said first, second, and third sequences each being a separate row.

\* \* \* \* \*